(12) United States Patent
Tellado et al.

(10) Patent No.: US 9,332,455 B2
(45) Date of Patent: *May 3, 2016

(54) SCHEDULING A USER EQUIPMENT TRANSMISSION MODE TO ASSIST UPLINK INTERFERENCE CHARACTERIZATION

(71) Applicant: Headwater Partners II LLC, Redwood Shores, CA (US)

(72) Inventors: Jose Tellado, Mountain View, CA (US); Gregory G. Raleigh, Woodside, CA (US)

(73) Assignee: Headwater Partners II LLC, Tyler, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/053,582

(22) Filed: Oct. 14, 2013

(65) Prior Publication Data

US 2014/0105048 A1  Apr. 17, 2014

Related U.S. Application Data

(60) Provisional application No. 61/714,166, filed on Oct. 15, 2012.

(51) Int. Cl.
*H04W 72/08* (2009.01)
*H04W 24/10* (2009.01)
*H04W 84/04* (2009.01)

(52) U.S. Cl.
CPC ............ *H04W 24/10* (2013.01); *H04W 84/045* (2013.01)

(58) Field of Classification Search
CPC ............................ H04W 24/10; H04W 84/045
See application file for complete search history.

(56) References Cited

U.S. PATENT DOCUMENTS

| | | |
|---|---|---|
| 6,295,285 B1 | 9/2001 | Whitehead |
| 6,687,503 B1 | 2/2004 | Porter et al. |
| 6,947,748 B2 | 9/2005 | Li et al. |
| 7,280,814 B2 | 10/2007 | Austin et al. |
| 7,321,571 B2 | 1/2008 | Schnack et al. |
| 7,567,543 B2 | 7/2009 | Cao et al. |
| 7,593,729 B2 | 9/2009 | Barak et al. |
| 7,688,835 B2 | 3/2010 | Kotzin et al. |
| 7,756,482 B2 | 7/2010 | Lin et al. |
| 7,818,018 B2 | 10/2010 | Nanda et al. |
| 7,853,264 B1 | 12/2010 | Oh |
| 7,917,149 B2 | 3/2011 | Chen et al. |
| 7,962,145 B2 | 6/2011 | Gale et al. |

(Continued)

OTHER PUBLICATIONS

NICTA: A Review of Uplink interference in two tiered networks; 2010.*
"Performance of Uplink Fractional Power Control in UTRAN LTE", May 2008, VTC, Castellanos, C. U. et al.
"Performance of Decentralized Interference Coordination in the LTE Uplink", Sep. 2009, VTC, Ellenbeck, J. et al.

(Continued)

*Primary Examiner* — Jay P Patel
(74) *Attorney, Agent, or Firm* — Brian R. Short

(57) ABSTRACT

Systems, methods, and apparatuses for scheduling a user equipment transmission mode to assist uplink interference characterization are provided. One method includes a first base station (BS) wirelessly communicating with a first plurality of user equipment (UE), selecting a second BS associated with the first BS, the second BS wirelessly communicating with a second plurality of UE, selecting a UE from the second plurality of UE, scheduling the selected UE to transmit according to a transmission mode during a scheduled transmission, and characterizing, by the first BS, interference of the selected UE at the first BS during the scheduled transmission.

36 Claims, 22 Drawing Sheets

(56) References Cited

U.S. PATENT DOCUMENTS

| | | |
|---|---|---|
| 8,009,562 B2 | 8/2011 | Rayment et al. |
| 8,098,590 B2 | 1/2012 | Catovic et al. |
| 8,103,280 B2 | 1/2012 | Austin et al. |
| 8,135,397 B1 | 3/2012 | Lall et al. |
| 8,155,659 B2 | 4/2012 | Kazmi et al. |
| 2002/0077151 A1 | 6/2002 | Matthews et al. |
| 2007/0110005 A1 | 5/2007 | Jin et al. |
| 2007/0133427 A1 | 6/2007 | Taylor et al. |
| 2008/0248822 A1 | 10/2008 | Jarvinen et al. |
| 2009/0047971 A1 | 2/2009 | Fu |
| 2009/0059851 A1 | 3/2009 | Weil et al. |
| 2009/0092059 A1 | 4/2009 | Fu |
| 2009/0103492 A1 | 4/2009 | Altshuller et al. |
| 2009/0180428 A1 | 7/2009 | Viswanath |
| 2009/0196174 A1 | 8/2009 | Ji |
| 2009/0203310 A1 | 8/2009 | Lozano et al. |
| 2009/0257380 A1 | 10/2009 | Meier |
| 2009/0280819 A1 | 11/2009 | Brisebois et al. |
| 2009/0310527 A1 | 12/2009 | Rao et al. |
| 2009/0316585 A1 | 12/2009 | Srinivasan et al. |
| 2009/0323621 A1 | 12/2009 | Touboul et al. |
| 2010/0040000 A1* | 2/2010 | Jang et al. .................. 370/329 |
| 2010/0099428 A1 | 4/2010 | Bhushan et al. |
| 2010/0136998 A1 | 6/2010 | Lott et al. |
| 2010/0182906 A1 | 7/2010 | Cheng et al. |
| 2010/0238845 A1 | 9/2010 | Love et al. |
| 2010/0261482 A1 | 10/2010 | Guey |
| 2010/0261493 A1 | 10/2010 | Guey et al. |
| 2010/0317355 A1 | 12/2010 | Zangi et al. |
| 2010/0322171 A1 | 12/2010 | Dekorsy et al. |
| 2010/0329134 A1 | 12/2010 | Doppler et al. |
| 2011/0003598 A1 | 1/2011 | Ma et al. |
| 2011/0058479 A1 | 3/2011 | Chowdhury |
| 2011/0086610 A1 | 4/2011 | Baldwin et al. |
| 2011/0103296 A1 | 5/2011 | Ji et al. |
| 2011/0222506 A1 | 9/2011 | Szymanksi |
| 2011/0243060 A1 | 10/2011 | Mildh et al. |
| 2011/0256861 A1 | 10/2011 | Yoo et al. |
| 2011/0275378 A1 | 11/2011 | Kwon et al. |
| 2011/0310865 A1 | 12/2011 | Kennedy et al. |
| 2011/0317742 A1* | 12/2011 | Kawahatsu ............ H04L 1/0003 375/132 |
| 2012/0014333 A1 | 1/2012 | Ji et al. |
| 2012/0063383 A1 | 3/2012 | Barbieri et al. |
| 2012/0077511 A1* | 3/2012 | Shin ........................ H04B 7/022 455/452.1 |
| 2012/0120888 A1* | 5/2012 | Miao et al. .................. 370/329 |
| 2012/0127941 A1 | 5/2012 | Li et al. |
| 2012/0164950 A1 | 6/2012 | Nentwig |
| 2012/0202542 A1 | 8/2012 | Dimou et al. |
| 2013/0034070 A1 | 2/2013 | Seo et al. |
| 2013/0053054 A1 | 2/2013 | Lovitt et al. |
| 2013/0084907 A1* | 4/2013 | Shen ..................... H04W 72/082 455/501 |
| 2013/0142055 A1 | 6/2013 | Bao et al. |
| 2013/0182583 A1* | 7/2013 | Siomina et al. .............. 370/252 |
| 2013/0194982 A1* | 8/2013 | Fwu ....................... H04L 5/1469 370/280 |
| 2013/0260712 A1* | 10/2013 | Deb et al. .................. 455/406 |
| 2013/0308470 A1 | 11/2013 | Bevan et al. |
| 2013/0322322 A1 | 12/2013 | Redana et al. |
| 2013/0322392 A1* | 12/2013 | Abe ........................ H04L 5/00 370/329 |
| 2013/0343291 A1* | 12/2013 | Gao ..................... H04W 52/244 370/329 |
| 2014/0066117 A1 | 3/2014 | Egner et al. |
| 2014/0079016 A1 | 3/2014 | Dai et al. |
| 2015/0004986 A1* | 1/2015 | Khan ..................... H04W 48/02 455/444 |

OTHER PUBLICATIONS

"Downlink Scheduling for Multiclass Traffic in LTE", Nov. 2009, EURASIP Journal on Wireless Commun and Networking, Sadiq, B. et al.

"Relays in HSPA+: Power Control and Mobility", Dec. 2011, GLOBECOM, Hunzinger, J. F. et al.

"Cell Association and Interference Coordination in Heterogeneous LTE-A Cellular Networks", Dec. 2010, IEEE Journal on Selected Areas in Communications, Madan, R. et al.

"Enhanced Inter-cell Interference Coordination for Heterogeneous Networks in LTE-Advanced: A Survey", Dec. 2011, Lindbom, L. et al.

"Intercell Interference Coordination in OFDMA Networks and in the 3GPP Long Term Evolution System", Aug. 2009, Journal of Communications, Fodor, G. et al.

"A Survey of Scheduling and interference mitigation in LTE", May 2010, Journal of Electrical and Computer Engineering, Kwan, R. et al.

"Belief Propagation Methods for Intercell Interference Coordination in Femtocell Networks", Apr. 2012, IEEE Journal on Selected Areas in Communications, Rangan, S. et al.

"On Interference Coordination in Metropolitan Area Relay Networks", circa 2008, Doppler, K. et al.

"LTE: The Evolution of Mobile Broadband", Apr. 2009, IEEE Communications Magazine, Astely, D. et al.

"Using Carrier Ethernet to Backhaul LTE", Feb. 2011, Infonetics Research White Paper, Howard, M.

"Relay networks specific resource management features", May 2011, Advanced Radio Interface Technologies for 4G Systems, Braun, V. et al.

"Flexible interference control-concepts", Oct. 2011, Advanced Radio Interface Technologies for 4G Systems, Berberana, I. et al.

"Relay configurations", Jul. 2011, Advanced Radio Interface Technologies for 4G Systems, Aronsson, D. et al.

"Capacity Benefits of Relays with In-band Backhauling in Cellular Networks", 2008, ICC Proceedings, Balachandran, K. et al.

"Interference Mitigation Using Coordinated Backhaul Timing Allocation for LTE-Advanced Relay Systems", Jun. 2011, ICC Proceedings, Yuda, Y. et al.

"Centralized Scheduling for Joint Transmission Coordinated Multi-Point in LTE-Advanced", 2010, International ITG Workshop on Smart Antennas, Brueck, S. et al.

"Effect of Relaying on Coverage in 3GPP LTE-Advanced", Apr. 2009, VTC, Beniero, T. et al.

"Analysis of 3GPP LTE-Advanced Cell Spectral Efficiency", Sep. 2010, PIMRC, Bultmann, D. et al.

"Application of Coordinated Beam Selection in Heterogeneous LTE-Advanced Networks", Nov. 2011, ISWCS, Giese, J. et al.

Notification of Transmittal of the International Search Report and Written Opinion of the International Searching Authority, or the Declaration, International Application No. PCT/US2013/065096, Feb. 10, 2014.

Pantech & Curitel: "Discussion on access/backhaul link bandwidth allocation in LTE-A Relay Network", 3GPP Draft; R1-091909, 3rd Generation Partnership Project (3GPP), Mobile Competence Centre; 650, Route Des Lucioldes; F-06921 Sophia-Antipolis Cedex; France, San Francisco, USA, May 2, 2009.

Samsung: "Resource Partitioning via Bandwidth Reduction for Co-channel Deployments", 3GPP Draft; R1-104628 Non-CA Based Control ICIC-Final, 3rd Generation Partnership Project (3GPP), Mobile Competence Centre; 650, Route Des Lucioldes; F-06921 Sophia-Antipolis Cedex; France, vol. RAN WG1, no. Madrid, Spain; Aug. 23, 2010, Aug. 18, 2010.

* cited by examiner

SCHEDULING A USER EQUIPMENT TRANSMISSION MODE TO ASSIST UPLINK INTERFERENCE CHARACTERIZATION

RELATED APPLICATIONS

This patent application claims priority to provisional patent application Ser. No. 61/714,166, filed Oct. 15, 2012, which is herein incorporated by reference.

FIELD OF THE INVENTION

The described embodiments relate to communications. More specifically, the described embodiments relate to scheduling a user equipment transmission mode to assist uplink interference characterization.

BACKGROUND

In some wireless system deployments the base stations reuse the frequency channels assigned to user equipment very frequently in space (also called aggressive frequency reuse). In some cases the same frequency may be scheduled to a plurality of user equipment for transmission and neighboring base stations may need to decode the desired signal within the composite signal from the plurality of user equipment on the same time/frequency resources, often resulting in high interference levels or low signal-to-interference ratios at the base station receiver. In scenarios where the interference is a significant impairment for the link quality between the base station and a user equipment, improved understanding of the interference (for example the one or more dominating sources, the statistics, the time/frequency/spatial distribution vs. transmission mode) could assist in assigning transmit frequency channels to user equipment, scheduling uplink resource blocks to user equipment, adapting the user equipment transmission mode, etc. Therefore it is desirable to have improved systems and methods for characterizing interference at a base station based on scheduling a transmission mode of a plurality of user equipment.

SUMMARY

An embodiment includes a method for determining interference of a wireless system. The method includes a first base station (BS) wirelessly communicating with a first plurality of user equipment (UE), selecting a second BS associated with the first BS, the second BS wirelessly communicating with a second plurality of UE, selecting a UE from the second plurality of UE, scheduling the selected UE to transmit according to a transmission mode during a scheduled transmission, and characterizing, by the first BS, interference of the selected UE at the first BS during the scheduled transmission.

An embodiment includes a wireless system. The wireless system includes a first base station (BS), the first BS operative to wirelessly communicate with a first plurality of user equipment (UE), one or more controllers operative to select a second BS associated with first BS, the second BS operative to wirelessly communicate with a second plurality of UE, one or more controllers operative to select a UE from the second plurality of UE, one or more controllers operative to schedule the selected UE to transmit according to a transmission mode during a scheduled transmission, and the first BS operative to characterize interference at the scheduled transmission.

Other embodiments are directed to systems, apparatuses, and computer readable media associated with methods described herein.

Reference to the remaining portions of the specification, including the drawings and claims, will realize other features and advantages of the described embodiments. Further features and advantages of the described embodiments, as well as the structure and operation of various embodiments of the described embodiments, are described in detail below with respect to the accompanying drawings. In the drawings, like reference numbers can indicate identical or functionally similar elements.

DETAILED DESCRIPTION

Figure 1:
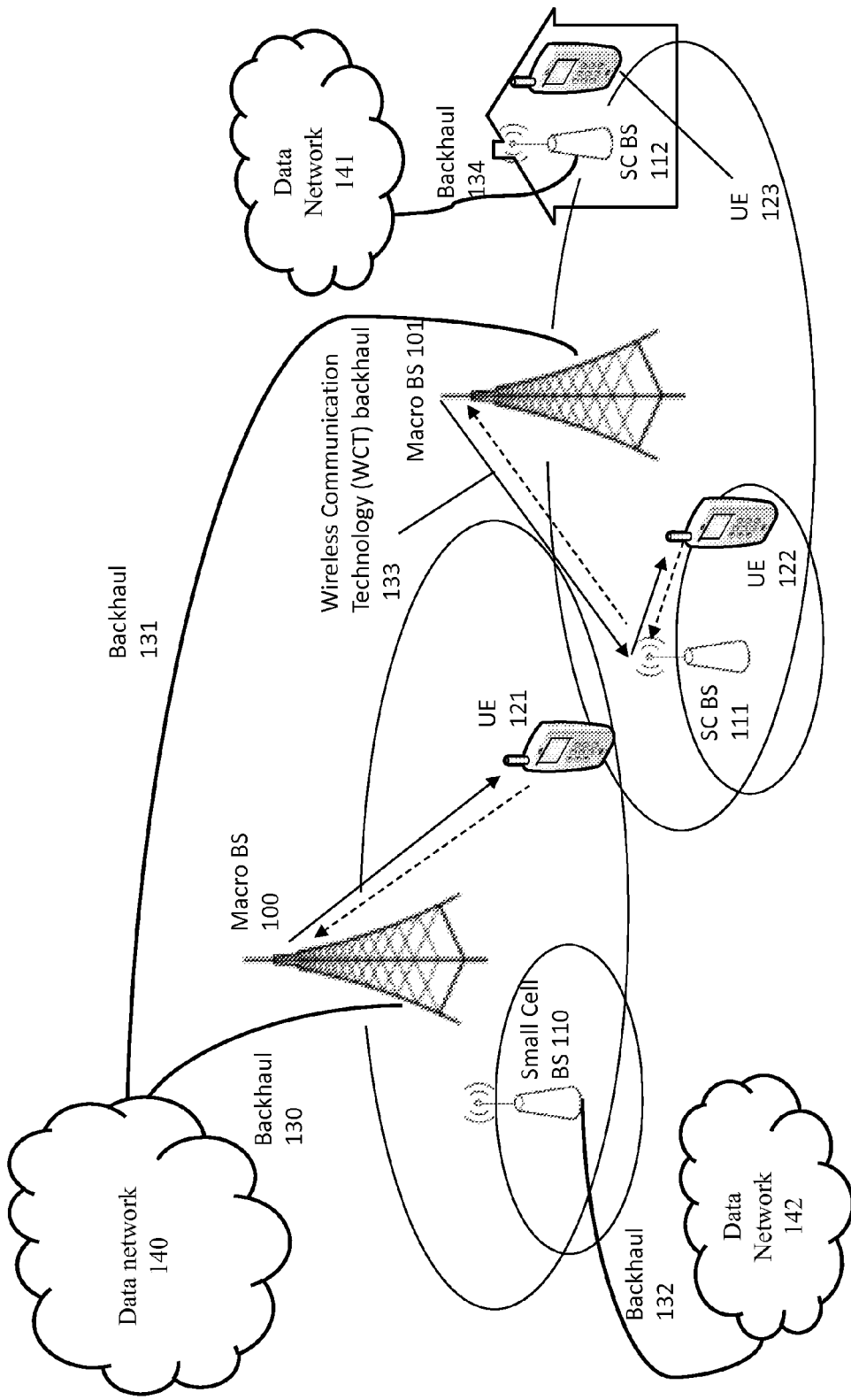
FIG. 1 shows a wireless communication system, according to an embodiment.

FIG. 1 shows a wireless communication system, according to an embodiment. The system includes a plurality of base stations (BSs) 100, 101, 110, 111, 112. In at least some embodiments the system includes a homogeneous system, wherein the BSs are of the same type (or alternatively classification or tier, etc.). In at least some embodiments the system includes a plurality of BSs types, such as Macro BSs 100, 101 and small cell (SC) BSs 110, 111, 112. In at least some embodiments Macro BSs 100, 101 have a larger coverage area or cell size, or transmit larger power, or have higher performance antenna systems, etc. than the small cell BSs 110, 111, 112. In at least some embodiments the small cell BSs are alternatively called microcell, picocell, relay node, or femtocell BS. In at least some embodiments the small cell BSs are located indoors (inside an enterprise, commercial building, home), such as small cell BS 112.

For at least one embodiment the BS includes a traditional BS, wherein a large portion of the radio access network (RAN) functionality, such as radio frequency (RF), analog and digital baseband and scheduling are co-located. For at least one embodiment at least a portion of the BS functionality is implemented at a second location. For at least one embodiment the BS includes distributed processing elements, such as one or more of remote radio heads (RRH), remote radio units (RRU) or distributed antenna systems (DAS). For at least one embodiment scheduling, resource allocation or baseband processing associated with one or more BS are aggregated at a second location, for example a cloud BS or cloud RAN.

In at least some embodiments the plurality of BSs wirelessly communicate with a plurality of user equipment (UE) device, such as UE device 121 (wirelessly communicating with BS 100), UE device 122 (wirelessly communicating with BS 111), UE device 123 (wirelessly communicating with BS 112). The wireless communication access traffic (or data or data payload) associated with UE devices 121, 122, 123 may be associated with one or more data networks 140, 141, 142 (for example a carrier network, or a company network, or the internet, or a core network). The wireless communication access traffic may include downlink (originating from the data network 140, 141, 142) or uplink (originating from the UE devices 121, 122, 123) or both downlink (DL) and uplink (UL) traffic. For at least one embodiment the wireless communication access traffic (or the backhaul traffic) include data associated (for example originating from or terminating at) with the UE device or control information associated with the wireless communication system (for example the X2 interface from the 4G or LTE wireless communication technology). Examples of control information associated with the wireless communicating system includes link performance (for example information associated with received signal quality, path loss, channel between desired BS and one or more UE device or backhaul UE (bUE) device, SNR, interference, interference sources, etc.), traffic/data (for example information associated with QoS, packet delay, traffic loading, jitter, queue states or sizes, PER, etc.).

In at least some embodiments the wireless communication access traffic is communicated to a data network 140, 141, 142, through a backhaul communication technology, such as backhaul 130, 131, 132, 133, 134. The backhaul communication technology may include one or more of a fiber communication technology, a microwave link, a T1/E1, a cable or DSL communication technology or an alternative inband or out of band wireless (for example WiMAX or WiFi) communication technology. In at least some embodiments the backhaul requirements for a BS include parameters associated with the BS or a plurality of UE devices associated with the BS. In at least some embodiments BS 100 may include a large coverage area, and a high density plurality of UE devices and include 2G/3G/4G wireless communication technology. For example BS 100 aggregate access traffic may be large and may require a Backhaul 130 with large bandwidth (for example a fiber communication technology or a microwave communication technology). In at least some embodiments BS 100 includes a small coverage area (for example a home), and a small number of UE devices and include 4G wireless communication technology. For example BS 100 aggregate access traffic may be small and may require a Backhaul 130 with small bandwidth (for example a DSL communication technology or a cable modem communication technology). In at least some embodiments the backhaul requirements associated with a BS includes one or more of a latency, a bandwidth, a PER (packet error rate), a packet jitter, a cost, a data cap, etc. In at least some embodiments the access traffic associated with the plurality of UE devices associated with a BS includes a plurality of backhaul requirements. For example a first UE device may be streaming video, which may require large bandwidth, but relaxed latency and PER requirements. For example a second UE device may be performing VoIP, which may require low latency, and small bandwidth. In at least some embodiments the backhaul associated with a BS (for example one or more of BS 100, 101, 110, 111, 112) may not satisfy the access traffic requirements of the plurality of UE devices associated with the BS. In at least some embodiments a BS may not have access to so-called traditional backhaul (such as T1/E1, microwave, fiber) or traditional backhaul installation time or installation costs are too high.

Figure 2:
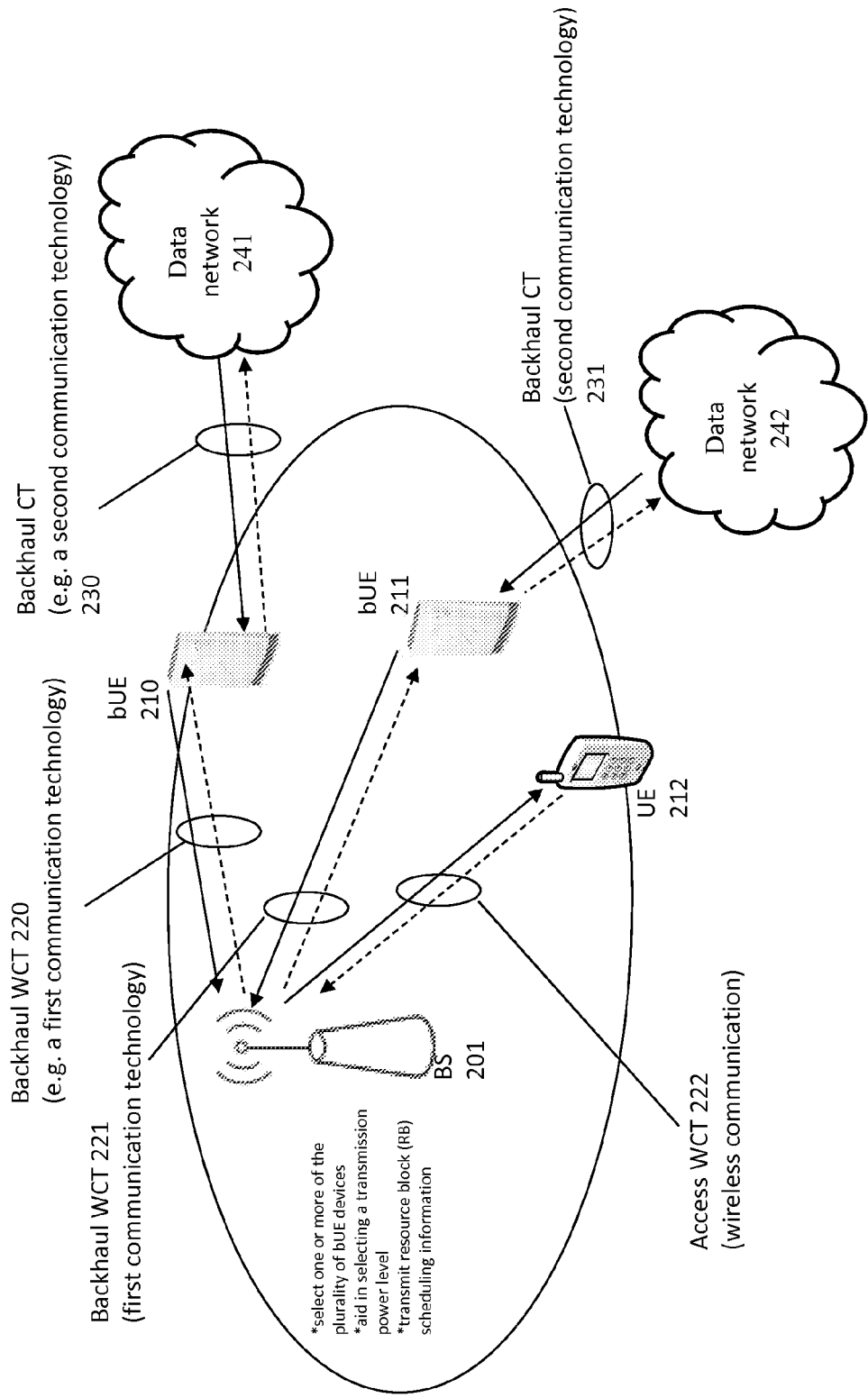
FIG. 2 shows a backhaul system, according to an embodiment.

FIG. 2 shows an embodiment of a backhaul system, according to an embodiment. The system includes a base station (BS) 201 and a plurality of backhaul user equipment (bUE) devices (such as bUE devices 210, 211), each of the plurality of bUE devices 210, 211 operable to wirelessly communicate with the BS (201) through at least a first communication technology (for example wireless communication technologies (WCT) 220, 221 and 222), and the plurality of bUE devices 210, 211 each operable to communicate with at least one data network (such as data networks 241, 242) through at least a second communication technology (for example backhaul communication technologies (CT) 230 and 231). For an embodiment, the BS (201) is operative to wirelessly communicate (for example wireless communication technologies (WCT) 222) with one or more user equipment (UE) devices (such as, UE device 212), and network connect the one or more UE devices (such as, UE device 212) to the at least one data network (241, 242) through one or more of the plurality of bUE devices 210, 211, select one or more of the plurality of bUE devices 210, 211 for backhaul (BH) traffic, wherein the BH traffic includes access traffic associated with the one or more UE devices (such as, UE device 212), aid in selecting a transmission power level of at least one of the plurality of bUE devices 210, 211, or at least one of the one or more UE devices (such as, UE device 212), and transmit resource block (RB) scheduling information for the BH traffic of at least one of the plurality of bUE devices 210, 211 and the access traffic of at least one of the one or more UE devices (such as, UE device 212).

It is to be understood that while FIG. 2 only shows a single UE device 212, embodiments include the BS 201 wirelessly communicating with any number of UE devices. Further, while FIG. 2 only shows two bUE devices 210, 211, embodiments includes any number of bUE devices operable to wirelessly communicate with the BS 201. Further, while FIG. 2 depicts the BS 201 operable to perform several steps, it is to be understood that embodiments include the operational steps being performed or aided by other devices. For example, the steps of selecting one or more of the plurality of bUE devices 210, 211 for backhaul (BH) traffic, and selecting a transmission power level of at least one of the plurality of bUE devices 210, 211 can alternatively be wholly or partially performed somewhere else, such as, at a base station controller or in the cloud (for example at a cloud RAN or at a cloud BS).

In at least some embodiments the access traffic associated with UE device 212 (or a plurality of UE devices) includes a plurality of applications (for example streaming video, VoIP, browsing, gaming, etc.), each of which may include one or more plurality of access traffic requirements (for example delay QoS, best effort, foreground, background, DL, UL, etc.) and may map into a set of backhaul requirements for selecting the bUE device. For example UE device 212 may need to upload (access traffic UL) a large file in the background. For this example a first bUE device may include a high bandwidth and high PER backhaul WCT link on the DL (for example a 4G/LTE link limited by bursty interference from aggressive frequency reuse) and a second bUE device may include a low bandwidth and low PER WCT link on the DL (for example a 3G link limited by low SNR). For this example the access traffic requirements are better matched (or alternatively mapped or satisfied) by the first bUE device. For example UE device 212 application may include a VoIP (typically with low bandwidth, symmetrical DL/UL, low latency access traffic requirements). For this example a first bUE device may include a high bandwidth, high latency and high jitter backhaul CT to a VoIP gateway (for example over a cable modem to a cable operator to a VoIP gateway) and a second bUE device may include a low bandwidth, low latency and low jitter CT link (for example a T1 to a core network). For this example the VoIP access traffic requirements are better matched (or alternatively mapped or satisfied) by the second bUE device.

For at least one embodiment the bUE device 210 wirelessly communicates with the BS 201 on the same wireless technology (for example 4G or LTE) as the UE device 212 wirelessly communicates with the BS 201 but on a different channel or carrier. For at least one embodiment the bUE device 210 wirelessly communicates with the BS 201 on the first wireless technology (for example 4G/LTE) as the UE device 212 wirelessly communicates with the BS 201 on a second wireless technology (for example 3G/HSPA).

Exemplary embodiments of the BS 201 include a cellular BS, a 3G NodeB, a 4G Long Term Evolution (LTE) eNodeB. It is to be understood that this is not an exhaustive list.

For at least some embodiments, the plurality of bUE devices 210, 211 wirelessly communicate with the BS 201 over one or more of wireless communication technologies, wherein the one or more wireless communication technologies include at least one of WiFi, WiMax, 3G, 4G, LTE, Orthogonal frequency division multiple access (OFDMA), Wideband code division multiple access (WCDMA).

For at least some embodiments, the one or more UE devices (such as, UE device 212) wirelessly communicate with the BS 201 over one or more of wireless communication technologies, wherein the one or more wireless communication technologies include at least one of WiFi, WiMax, 3G, 4G, LTE, OFDMA, WCDMA.

For an embodiment, the one or more UE devices (such as, UE device 212) wirelessly communicate with the BS 201 and the plurality of bUE devices 210, 211 wirelessly communicate with the BS 201 utilizing a same wireless communication technology. Further, for at least one embodiment, the one or more UE devices (such as, UE device 212) wirelessly communicate with the BS 201, and the plurality of bUE devices 210, 211 wirelessly communicate with the BS 201 utilizing the same wireless communication technology and a shared one or more frequency channels.

For at least some embodiments, at least one of the one or more UE devices (such as, UE device 212) or at least one of the plurality of bUE devices 210, 211 includes one or more of a fixed client terminal, mobile terminal, a user terminal, an access terminal, a consumer premises equipment.

For various embodiments, at least one of the one or more UE devices (such as, UE device 212) or at least one of the plurality of bUE devices 210, 211 includes one or more of a cellular phone, a smart phone, a notebook, a laptop, a tablet, a PC.

For at least one embodiment, at least one of the plurality bUE devices 210, 211, is at least one of associated with or a part of a small cell BS, wherein the small cell BS includes client side modem functionality. More specifically, for at least one embodiment the small cell BS includes one or more of a microcell, a picocell, a relay node, a femtocell. For at least one embodiment a small cell BS (for example one or more of a microcell, a picocell, a relay node, femtocell) includes client side modem functionality (for example a subset of a UE device or bUE device functionality). For at least one embodiment the small cell BS includes a backhaul CT to one or more data networks. For these embodiments a small cell BS with client side modem functionality could function as a bUE device. For at least one embodiment each of the first BS and the small cell BS including bUE device functionality include backhaul CT and the access traffic associated with the first BS could be communicated over the WCT through the small cell BS including bUE device functionality. For at least one embodiment each of the first BS and the small cell BS including bUE device functionality include backhaul CT and the access traffic associated with the small cell BS including bUE device functionality could be communicated over the WCT through the first BS. For at least one embodiment each of the first BS and the small cell BS including bUE device functionality include backhaul CT and the access traffic associated with the small cell BS including bUE device functionality is communicated over the first BS backhaul CT or the small cell BS backhaul CT based on first parameters of the first BS backhaul CT or second parameters of the small cell BS backhaul CT. For at least one embodiment the first parameters or second parameters include one or more of bandwidth, latency, PER, jitter, QoS, cost, sponsoring, rebates. At least some embodiments of both FIG. 2 and FIG. 3 utilize these embodiments.

For at least one embodiment, the at least one data network (such as, data networks 241, 242) includes one or more of a wide area network, mobile core, core network, a company network, carrier network, broadband network, internet. For at least one embodiment accessing a data service (for example video streaming, cloud back-up, software update) over one or more data networks and one or more backhaul CT includes a common operator with improved control of parameters (for example latency, bandwidth, PER). This is typically the case for wireless service providers with carrier class backhaul CT (for example fiber CT, microwave CT, T1/E1) to mobile core or core networks. For at least one embodiment accessing a data service (for example video streaming, cloud back-up, software update) over one or more data networks and one or more backhaul CT includes a plurality of operators with a plurality of control of parameters (for example latency, bandwidth, PER). This is typically the case for femtocell backhaul CT over a CT and data network operated by a DSL or cable modem service provider.

For at least one embodiment, the second communication technology includes one or more of broadband internet connectivity, wired communication technology, T1, E1, digital subscriber line (DSL), Data Over Cable Service Interface Specification (DOCSIS), cable modem, wireless communication technology, WiFi, WiMax, point to point (P2P) or point to multi-point (P2 mP) microwave, fiber communication technology, 3G, 4G. For example the access or backhaul WCT may be one of 2G or 3G WCT and the backhaul CT may be a 4G WCT). For at least one embodiment the bUE device may be a UE device (for example a smartphone or tablet or notebook) with one or more of 2G, 3G, 4G cellular access WCT and one or more of WiFi, Bluetooth, USB, Ethernet backhaul CT. For at least one embodiment the one or more of WiFi, Bluetooth, USB, Ethernet backhaul CT may be configured to connect to one or more of a WiFi access point, or a Ethernet LAN over a Bluetooth or a USB or Ethernet modem. Clearly many other permutations or combinations of one or more WCT and one or more backhaul CT are possible. For at least one embodiment the bUE device is a dedicated (or alternatively called a specialized or custom) device to improve the performance of the backhaul WCT link or backhaul CT link or the connection (for example by performing one or more of the following functions: collecting additional information, mapping, bridging, routing, network connecting, controlling) between the backhaul WCT and the backhaul CT. For example the dedicated bUE device may improve the backhaul WCT by improving hardware or software capability (for example increased transmit power, lower receiver noise figure, additional transmit or receiver antennas, higher antenna gain, improved link performance statistics gathering and exchange), by improving the installation or deployment of the bUE device for better signal quality parameters (lower path loss, lower interference, etc.), by deploying the dedicated bUE device at a location with favorable backhaul CT parameters (for example at closer to a cable or DSL head-end for improved data communication performance) or by improving the connection between the backhaul WCT and the backhaul CT (for example by improved packet processing, protocol conversion, header conversion, PER monitoring, ARQ handling, QoS mapping, etc.).

For at least one embodiment, the BS 201 is further operative to obtain one or more first parameters associated with the wireless communication between one or more of the plurality of bUE devices 210, 211 and the BS 201. Specifically, for at least one embodiment, the selection of the one or more of the plurality of bUE devices 210, 211 for the BH traffic is based on the first parameters. At least some embodiments of both FIG. 2 and FIG. 3 implement these embodiments.

In at least some embodiments selecting the bUE device (such as, one of bUE device 210, 211) is based on a bUE device backhaul wireless communication technology (WCT) between the plurality of bUE devices 210, 211 and the BS 201. For example bUE device 210 may include a WCT 220 with large bandwidth (exemplary first parameter) (for example 4G or LTE) and bUE device 211 may include a WCT 221 with low PER (exemplary first parameter) (for example 2G/3G). For this example bUE device 210 may be better suited for a streaming video application and bUE device 211 may be better suited for a VoIP or gaming application. For example bUE device 210 may include a WCT 220 with a high SNR (exemplary first parameter) and bursty interference (exemplary first parameter) (for example 4G/LTE with aggressive frequency reuse resulting in high average throughput and high PER and frequent retransmissions) and bUE device 211 may include a WCT 221 with low average and low variance CQI (channel quality information) (exemplary first parameter). For this example bUE device 210 may be better suited for video streaming and bUE device 211 may be better suited for VoIP application. In at least some embodiments the bUE device 210 may include a WCT 220 with low interference footprint (for example by using directional antennas or low transmission power which results in lower interference to other surrounding WCT links) (exemplary first parameter), which could make it more desirable for selection. In at least some embodiments a WCT 220 DL (shown as a dashed arrow) parameters are more desirable than the WCT 221 DL parameters and an UL access traffic (WCT 222) associated with UE 212 is network connected through bUE device 210. In at least some embodiments a WCT 220 UL (shown as a solid arrow) parameters are less desirable than the WCT 221 UL parameters and DL access traffic (WCT 222) associated with UE 212 is network connected through bUE device 211. For example WCT parameters relevant for selecting a bUE device based on bUE WCT include one or more of a link quality, link quality statistics, link quality variation, path loss, fading, shadowing, Signal to Noise Ratio (SNR), Signal to Interference and Noise Ratio (SINR), Packet Error Rate (PER), received interference, interference generated to other devices, Channel Quality Indicator (CQI), Channel State Information (CSI), Modulation and Coding Scheme (MCS), Precoding Matrix Indicator (PMI), rank indicator (RI), single user or multiuser Multiple Input Multiple Output (SU-MIMO or MU-MIMO) information.

For at least one embodiment, the BS 201 is further operative to obtain one or more second parameters associated with the at least one data network (such as, data networks 241, 242) through at least the second communication technology. More specifically, for at least one embodiment, the selection of the one or more of the plurality of bUE devices 210, 211 for the BH traffic is based on the one or more second parameters. A non-exhaustive list of exemplary second parameters includes one or more of a link quality, bandwidth, throughput, cost, latency, jitter, QoS, PER.

In at least some embodiments selecting the bUE device is based on a bUE device backhaul CT parameter (second parameter associated with second communication technology) between the plurality of bUE devices 210, 211 and one or more data networks. For example bUE device 210 may include a backhaul CT 230 with large bandwidth (exemplary second parameter) (for example cable modem) and bUE device 211 may include a backhaul CT 231 with low latency (exemplary second parameter) (for example T1). For this example bUE device 210 may be better suited for a streaming video application and bUE device 211 may be better suited for a VoIP or gaming application. For example bUE device 210 may include a backhaul CT 230 with a monthly data cap (exemplary second parameter) (for example cable modem)

and bUE device 211 may include a backhaul CT 231 with unlimited data usage (exemplary second parameter) and high latency (exemplary second parameter) (for example a home DSL). For this example bUE device 210 may be better suited for VoIP or gaming and bUE device 211 may be better suited for background data (for example software updates or local content preloading) application.

For at least one embodiment, the access traffic associated with the one or more UE devices (such as, UE device 212) is classified into two or more data flows based on a data flow parameter and the selection of the one or more plurality of bUE devices 210, 211 for the BH traffic is based in part on the data flow parameter. More specifically, for at least one embodiment, the data flow parameter includes one or more of a data flow bandwidth, latency, Quality of Service (QoS), PER, UE device state, application, user state, cost, sponsoring, data plan. For at least one embodiment a UE device has a plurality of applications using communication resources over the access WCT and at least two data communications associated with the plurality of active applications have a common a data flow parameter within a tolerance threshold. For example a first data communication may be associated with a gaming application with maximum latency of requirement parameter 5 ms and a second data communication may be associated with a VoIP application with maximum latency requirement of 10 ms and the classification is all data flow with latency requirements below 10 ms. For at least one embodiment the data flow classification includes a plurality of parameters, for example bandwidth and latency, or bandwidth and cost, or QoS and cost. For at least one embodiment the plurality of applications includes a plurality of UE devices. For example a first data communication associated with a first application associated with a first UE device may be aggregated with a second data communication associated with a second application associated with a second UE device when they first and second data communications based on a data flow parameter (for example the data flow parameter requirements are within a threshold tolerance).

Figure 3:
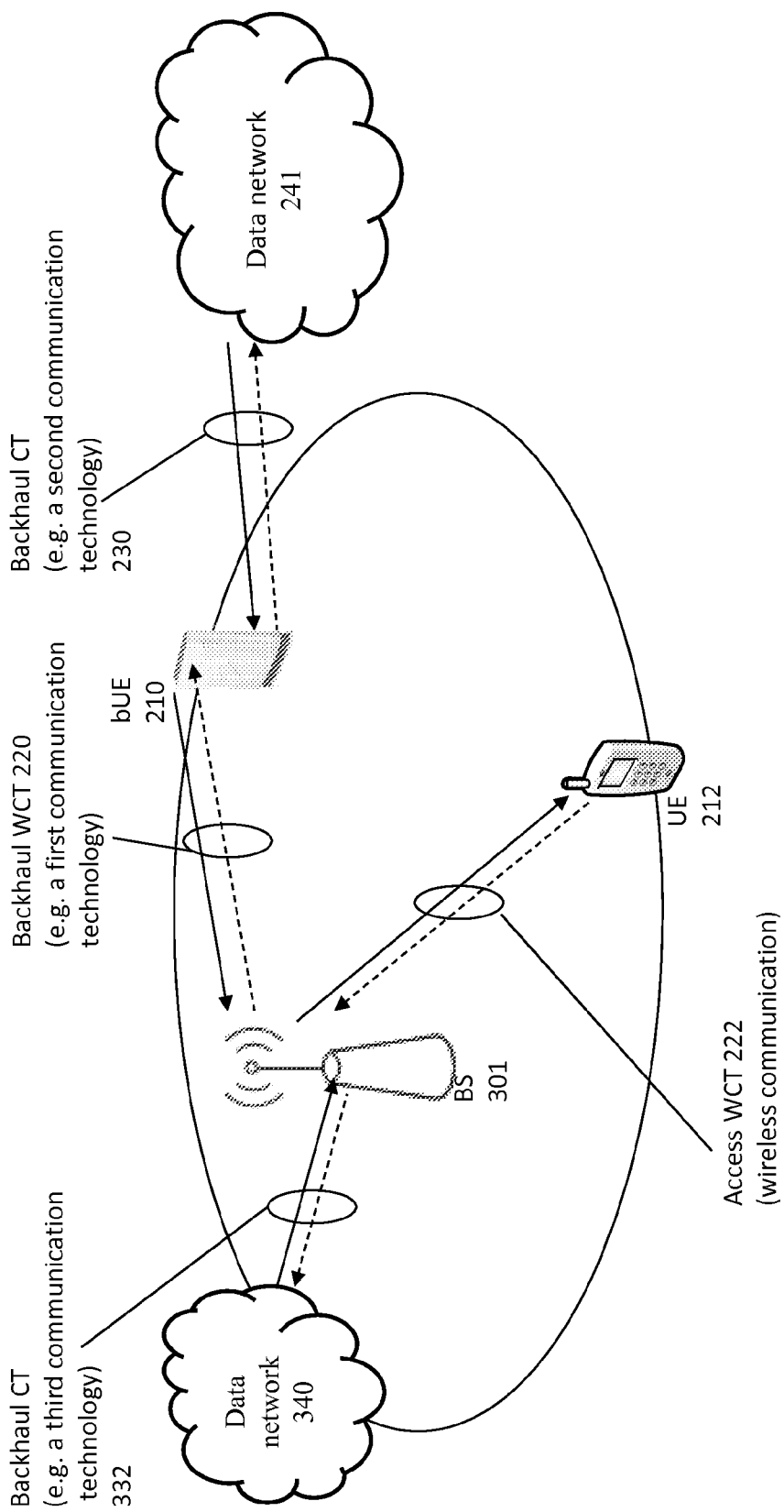
FIG. 3 shows another backhaul system, according to an embodiment.

FIG. 3 shows an embodiment of the backhaul system wherein a BS 301 is further operable to communicate with at least one data network (such as, data network 340) over at least a third communication technology (for example Backhaul CT 332). For at least some embodiments, the BS 301 is further operative to select the third communication technology for BH traffic, wherein the BH traffic of the third communication technology including access traffic from the one or more UE devices (such as, UE device 212).

An exemplary, non-exhaustive list of technology that can be utilized as the third communication technology include one or more of wired communication technology, T1, E1, DSL, DOCSIS, cable modem, wireless communication technology, WiFi, WiMax, P2P or P2 mP microwave, fiber communication technology.

For at least some embodiments, the BS is further operative to obtain one or more third parameters associated with the at least one data network through at least the third communication technology 332. An exemplary, non-exhaustive list of parameters that can be utilized as the one or more third parameters includes one or more of a link quality, bandwidth, throughput, cost, latency, jitter, QoS, PER. For at least one embodiment, the third communication technology for BH traffic includes a carrier grade communication technology. For at least one embodiment, the BH traffic of the third communication technology includes legacy access traffic. For at least one embodiment the BH traffic of the third communication technology 332 includes legacy access traffic, wherein the legacy access traffic includes one or more of 2G access WCT traffic, 2G+3G access WCT traffic, low latency access WCT traffic. For at least one embodiment the BH traffic of the third communication technology includes low bandwidth or low latency access traffic, wherein the access traffic includes one or more of 2G access traffic, 2G+3G access traffic, access traffic associated with voice or gamming applications or real time applications.

In at least some embodiments the BS 301 includes traditional backhaul (for example carrier grade or narrowband—such as a small number of T1 or E1) that is insufficient to satisfy the access traffic demands of the plurality of UE (such as, UE 212). For example a BS 301 that is upgraded from 3G WCT to 3G+4G WCT may not have sufficient bandwidth to support the additional services or applications. For example the BS 301 may include a small number of T1 (for example based on legacy 2G or 3G requirements) that may be able to support latency or jitter or PER requirements (for example for a 2G or 3G cellular service) but may not be able to support the bandwidth requirement of additional 4G services. For example a BS 301 may have been dimensioned for a small number of UE devices or UE devices with lower access traffic capability but over the deployment lifetime a growth in the number of UE devices or additional enhanced access traffic generating capability UE device (for example smartphones or tablets) or additional services or applications on existing UE device may require additional demands on backhaul. In at least some embodiments the BS 301 requires a bUE device 210 to network connect at least a portion of the access traffic (for example additional access traffic from new UE, services or higher bandwidth WCT) to a data network over a bUE device and selecting between the traditional backhaul 332 and the bUE device 210 backhaul. In at least some embodiments the bUE device backhaul is used as an interim solution. In at least some embodiments the bUE device backhaul is used as an interim solution until additional traditional backhaul is available (for example while upgrading a BS backhaul from one or more of T1 to microwave or fiber communication technology). For example a BS deployment with 2G or 2G+3G WCT may be been equipped with a small number of T1/E1, wherein the small number of T1/E1 is sufficient to satisfy an initial or legacy access traffic parameters/requirement (for example bandwidth and latency). For at least one embodiment additional backhaul CT performance (bandwidth, capacity, latency, etc.) is required (for example to include additional UE devices, additional services, additional UE device with enhanced requirements/capabilities, additional WCT—such as 4G) may be required at a later time, wherein the additional backhaul CT performance is achieved with assistance of one or more bUE device 210. For at least one embodiment the additional backhaul CT performance is achieved with assistance of one or more bUE device 210 as in interim solution. For at least one embodiment the interim solution is used until the BS backhaul is upgraded (for example from a small number of T1/E1 to a fiber CT—which may take several years to deploy/install). At least some embodiments of both FIG. 2 and FIG. 3 can implement these embodiments.

For at least one embodiment, the BS 201 (or 301) operative to aid in selecting the transmission power level of at least one of the plurality of bUE devices 210, 211, or the one or more UE devices (such as, UE device 212) is assisted by a signal transmitted by the BS 201 (or 310). More specifically, or at least one embodiment, the assisting by the signal transmitted by the BS 201 (or 310) includes one or more of a control message from the BS 201 (or 310), or a reference signal transmitted by the BS 201 (or 310). At least some embodiments of both FIG. 2 and FIG. 3 can implement these embodiments. For at least one embodiment the reference signal transmitted by the BS 201 (or 310) includes one or more of a pilot, a synchronization sequence, a reference symbol, a training sequence, a data symbol, wherein one or more of the plurality of bUE devices or at least one of the one or more UE devices may use to estimate a received signal strength and/or derive a transmission path loss from which the transmission power level may be selected (or alternatively estimated, derived, or refined). For at least one embodiment the BS 201 (or 310) estimates a received signal strength (for example based on one or more of a pilot, a synchronization sequence, a reference symbol, a training sequence, a data symbol) from at least one of the plurality of bUE devices or at least one of the one or more UE devices and/or derives a transmission path loss from which a desired transmission power level for at least one of the bUE device or UE device may be selected. For at least one embodiment, information associated with the particular bUE device or UE device desired transmission power may be communicated to the particular bUE device or UE device over a control message from the BS 201 (or 310).

For at least one embodiment, a resource block (RB) includes a partition of a carrier or frequency channel for the wirelessly communicating. More specifically, for at least one embodiment, the partition includes one or more of a unit of time, a unit of frequency, a code. For an embodiment, the partition includes one or more of a time slot, a frequency band, a time-frequency allocation, a time-code allocation, a time-frequency-code allocation. At least some embodiments of both FIG. 2 and FIG. 3 can implement these embodiments.

For at least one embodiment, the wireless communication between the plurality of bUE devices 210, 211 and the BS 201 is enhanced relative to the wireless communication between the BS 201 and at least one of the one or more UE devices (such as, UE device 212), wherein the enhanced wireless communication includes one or more of better antenna gain, more antennas, outdoor installation, better processing power, better transmit or receive analog or digital performance, lower transmit power, higher or outdoor installation, improved link parameters, improved number of antennas. For at least one embodiment the bUE devices are selected from the one or more UE devices based on enhanced (or alternatively higher performance or favorable) WCT parameters. For example the bUE device may be selected from the population of one or more UE devices based on better path loss (less path loss), higher MCS, lower PER. For at least one embodiment the bUE device may be a dedicated device with hardware or software functionality that results in better WCT parameters. For at least one embodiment the dedicated bUE device have better antennas (for example higher gain or more antennas), higher transmission power or lower receiver sensitivity or are installed at favorable locations relative to the BS 201 (for example lower shadowing or higher K-factor channels). At least some embodiments of both FIG. 2 and FIG. 3 can implement these embodiments.

At least one embodiment further includes classifying and prioritizing the BH traffic based on the access traffic (for example access traffic is classified based on QoS parameters of the access traffic data or control payload and this information is mapped onto associated BH traffic), and wherein the RB scheduling information for the BH traffic is based on the BH traffic prioritization. At least one embodiment further includes classifying and prioritizing the access traffic, wherein the RB scheduling information for the access traffic and the BH traffic is based on the access traffic prioritization and BH traffic prioritization. For example a DL scheduler may assign RBs to DL access traffic for a first UE device and DL backhaul traffic for a bUE device which includes UL access traffic from a second UE (or the first UE) to be sent over the bUE device backhaul CT. For this example the DL scheduler RB assignments may be based on the first UE DL access traffic classification and the DL backhaul traffic which is associated with second UE (or first UE) UL access traffic. For at least one embodiment, classifying the BH traffic includes best effort access traffic having a lower priority than classified access traffic having a delay QoS below a threshold. At least some embodiments of both FIG. 2 and FIG. 3 can implement these embodiments.

In at least some embodiments the access traffic associated with a plurality of UE (such as, UE 212) is classified (for example based on delay QoS, best effort, DL, UL, foreground, background). In at least some embodiments the classified access traffic is aggregated (for example across a plurality of UE (such as, UE 212)). In at least some embodiments the classified aggregated traffic is assigned into queues prior to assigning of resource blocks for BH traffic of at least one of the plurality of bUE devices. For example the VoIP access traffic from the plurality of UE (such as, UE 212) could be assigned to one VoIP queue and based on the plurality of bUE WCT or CT parameters this queue may be carried by a selected bUE device.

For at least one embodiment, a bUE device selection of one or more of the plurality of bUE devices 210, 211 is based on one or more first parameters of the wireless communication between the bUE device and the BS 201 or one or more second parameters of associated with at least one data network through at least the second communication technology. For example bUE devices 210, 211 may be selected from a larger pool of available bUE devices for providing backhaul traffic functionality or alternatively bUE devices 210, 211 may have been deployed at desirable locations based on favorable WCT parameters (for example near a BS or with favorably channel parameters—for example one or more of low loss, low interference, etc.) or backhaul CT parameters (for example near a fiber CT with high bandwidth and low latency or near a microwave CT with line of sight—LOS). More specifically, for at least one embodiment, the bUE device deployment selection includes one or more of selecting a bUE device deployment configuration, selecting a bUE device type, selecting a bUE device configuration, selecting a bUE device installation positioning, selecting a bUE device site. More specifically, for at least one embodiment, the first parameter of the bUE device selection is based on a joint first parameter between at least two of the plurality of bUE devices 210, 211. More specifically, for at least one embodiment, the joint first parameter enables joint or simultaneous wireless communication on a shared resource block (RB) of at least two of the plurality of bUE devices 210, 211. For a more specific embodiment, the joint or simultaneous wireless communication includes one or more of multi user (MU)-MIMO, successive interference cancelling (SIC), multilevel constellation and/or modulation. For at least one embodiment the BS (for example 201 or 301) includes a plurality of antennas (for example for transmission or reception) and in combination with the at least two of the plurality of bUE devices generate a matrix wireless communication channel between the BS and the at least two of the plurality of bUE devices. For this embodiment the matrix channel may support at least two simultaneous transmissions over the same RB based on a channel parameter. For at least one embodiment the channel parameter includes a channel matrix rank. For at least one embodiment the channel parameter includes a plurality of singular values (or alternatively eigenvalues or eigen-directions or some other property of the matrix channel that may assists in quantifying a number of simultaneous transmissions). For at least one embodiment the channel parameter includes a parameter greater than a threshold (for example the number of singular values above a threshold—for example singular values that are at least 2 times larger than the background one or more of noise or interference or distortion). For at least one embodiment the plurality of bUE devices (for example 210, 211) are selected based channel matrix parameters between one or more subsets of the plurality of bUE devices (for example at least a minimum number of subsets of size 2 of bUE devices selected from the plurality of bUE devices including channel matrix of rank 2 when combined with a BS with at least 2 antennas or at least a minimum number of subsets of size 3 of bUE devices having rank 3 when combined with a BS with at least 3 antennas). For at least one embodiment the matrix channel parameter includes information associated with one or more of multi user (MU)-MIMO, successive interference cancelling (SIC), multilevel constellation and/or modulation. For at least one embodiment at least one of the plurality of bUE devices are selected to enable simultaneous wireless communication between the BS with the at least one bUE device and at least one UE of the plurality of UE.

In at least some embodiments one or more of the plurality of UE devices (such as, UE device 212), in addition to a first CT for communication with the BS 201, include a second CT (for example 3G WCT combined with 4G WCT or cellular WCT combined WiFi CT or cellular WCT combined with Bluetooth or USB or Ethernet CT, etc.) and based on the parameters associated with the second CT, one of the one or more UE device may be operated (or alternatively selected or converted or chosen for consideration) to a bUE device (for example provisioned or dynamically). In at least some embodiments the bUE devices are dedicated (for example a specialized bUE device) for network connecting access traffic over backhaul. In at least some embodiments the dedicated bUE device includes improved WCT parameters (for example higher antenna gain, higher transmit power, lower received noise figure) relative to a majority of the plurality of UE devices. In at least some embodiments the bUE devices are deployed under favorable conditions (for example installed at a higher location, or lower mobility/fixed, pointed in the direction of improved link quality, installed at a location with lower shadowing or lower path loss, etc.) relative to a majority of the plurality of UE device. In at least some embodiments better bUE device deployment improves the efficiency of the backhaul WCT link (for example more efficient modulation and coding scheme (MCS)) or lower interference to other links. At least some embodiments of both FIG. 2 and FIG. 3 can implement these embodiments.

Figure 4:
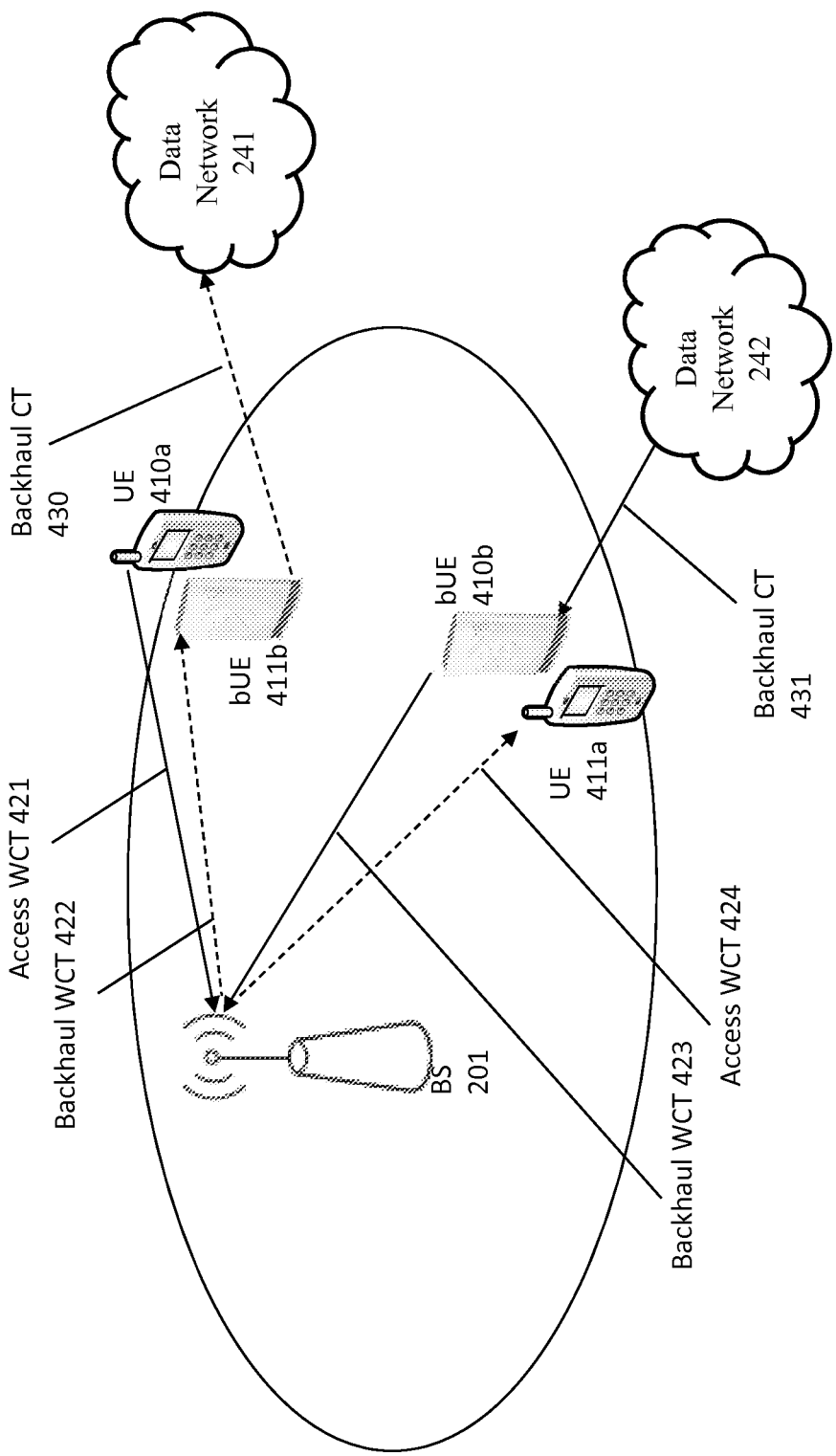
FIG. 4 shows another backhaul system, according to an embodiment.

FIG. 4 shows another embodiment of a backhaul system. For this embodiment, the plurality of bUE devices (such as, bUE devices 410b, 411b) are selected such that at least one of the one or more UE devices (such as, UE devices 410a, 411a) has an associated bUE device, thereby enabling joint or simultaneous wireless communication (for example backhaul wireless communication technologies (WCT) 422 and 423 and access wireless communication technologies (WCT) 421 and 424) over one or more shared resource blocks (RB). For at least one embodiment, the joint wireless communication over the one or more shared RB includes joint wireless communication utilizing one or more of communication separable in space, multilevel constellation, transmitter precoding or receiver separation. For at least some embodiments, the at least one of the plurality of bUE devices 410b, 411b includes a plurality of transmit antennas, wherein the at least one bUE device includes more transmit antennas than the one or more UE devices 410a, 411a the at least one bUE device is associated with, or at least one of the plurality of bUE devices includes a plurality of receive antennas, wherein the at least one bUE device includes more receive antennas than the one or more UE devices the at least one bUE device is associated with. At least some embodiments of both FIG. 2 and FIG. 3 can implement these embodiments.

In at least some embodiments an access WCT (for example 421 and 424) and a BH WCT (for example 422 and 423) may be operated simultaneously for improved usage of the WCT resources (for example improved spectral efficiency, lower interference, joint RB utilization). For example space division multiple access (SDMA), beamforming (BF), multiple input multiple output (MIMO), successive interference cancelling (SIC), transmit precoding (TP), dirty paper coding (DPC) may be enabled between a BS and at least two clients (for example a bUE device and a UE or two bUE devices or two UE devices) over a shared resource (for example a shared time-frequency resource block). In at least some embodiments an UL RB may be shared between access WCT 421 link and backhaul WCT 423 link (for example using multiuser-MIMO or BF or SIC). For at least one embodiment the BS (for example 201 or 301) includes a plurality of antennas (for example for transmission or reception) and in combination with the at least one of the plurality of bUE devices (for example bUE device 410b) and one of the plurality of UE (for example UE 410a) generate a matrix wireless communication channel between the BS and the at least two of the plurality of bUE devices (for example based on access WCT 421 link and backhaul WCT 423 link). For this embodiment the matrix channel may support at least two simultaneous transmissions over the same RB based on a channel parameter. For at least one embodiment the channel parameter includes a channel matrix rank. For at least one embodiment the channel parameter includes a plurality of singular values (or alternatively eigenvalues or eigen-directions or some other property of the matrix channel that may assists in quantifying a number of simultaneous transmissions). For at least one embodiment the channel parameter includes a parameter greater than a threshold (for example the number of singular values above a threshold—for example singular values that are at least 2 times larger than the background one or more of noise or interference or distortion). For at least one embodiment the plurality of bUE devices (for example bUE devices 410b, 411b) are selected based channel matrix parameters between one or more subsets of the plurality of bUE devices combined with one or more of the plurality of UE devices (for example at least a minimum number of subsets of size 2 of a bUE device selected from the plurality of bUE devices combined with a UE device including channel matrix of rank 2 when communicating with a BS with at least 2 antennas). For at least one embodiment the matrix channel parameter includes information associated with one or more of multi user (MU)-MIMO, successive interference cancelling (SIC), multilevel constellation and/or modulation. For at least one embodiment at least one of the plurality of bUE devices are selected to enable simultaneous wireless communication between the BS with the at least one bUE device and at least one UE of the plurality of UE. In at least some embodiments the backhaul WCT 423 link has better parameters than the WCT 421 link over shared resource and a lower transmit power is transmitted from bUE device 410b than UE device 410a. In at least some embodiments a DL RB may be shared between access WCT 424 link and backhaul WCT 422 link. In at least some embodiments the backhaul WCT 424 link has better parameters (for example bUE device 411b has additional antennas or additional receiver processing for shared signal separation) than the WCT 422 link over the shared resource and a lower receiver complexity is required from UE 411*a*. In at least some embodiments improved BH WCT of bUE device is based on one or more of additional transmit or receive antennas, higher antenna gain, better deployment, bUE device selection, lower transmit power enabled deployment of backhaul with small degradation in WCT efficiency relative to a traditional backhaul. At least some embodiments of both FIG. 2 and FIG. 3 can implement these embodiments.

For at least some embodiments, the BS 201 (or alternatively BS 301) is one of a plurality of BSs, wherein the plurality of BSs are each assigned one or more frequency channels based on a soft frequency reuse (SFR) scheme with at least a low transmit power level and a high transmit power level, and wherein at least one of the plurality of bUE devices are assigned a resource block (RB) at the low transmit power level. For at least some embodiments, the BS 201 (or alternatively BS 301) is one of a plurality of BSs, wherein the plurality of BSs are each assigned one or more frequency channels based on a soft frequency reuse (SFR) scheme with at least a low transmit power level and a high transmit power level, and wherein a majority (for example greater than 50%) of the plurality of bUE devices are assigned a resource block (RB) at the low transmit power level. For at least some embodiments, the BS 201 is one of a plurality of BSs, wherein the plurality of BSs are each assigned one or more frequency channels based on a fractional frequency reuse (FFR) scheme with at least a first frequency reuse scheme and a second frequency reuse scheme, the first frequency reuse scheme including a higher frequency reuse (or alternatively higher frequency efficiency usage) than the second frequency reuse scheme and wherein at least one of the plurality of bUE devices 210, 211 are assigned a resource block (RB) having the first frequency reuse or at least one of the one or more UE devices are assigned a resource block (RB) having a second frequency reuse. For at least some embodiments, the BS 201 is one of a plurality of BSs, wherein the plurality of BSs are each assigned one or more frequency channels based on a fractional frequency reuse (FFR) scheme with at least a first frequency reuse scheme and a second frequency reuse scheme, the first frequency reuse scheme including a higher frequency reuse (or alternatively higher frequency efficiency usage) than the second frequency reuse scheme and wherein a majority (for example greater than 50%) of the plurality of bUE devices (for example 210, 211) are assigned a resource block (RB) having the first frequency reuse or at least one of the one or more UE devices are assigned a resource block (RB) having a second frequency reuse. For at least one embodiment the bUE devices are one or more of selected (for example from a plurality of UE) or provisioned (for example a transmit power setting) or deployed (for example based on a frequency reuse plan) or installed (for example an installation height or pointing angle) to enable a majority of bUE devices to be assigned a RB at the low transmit power level of a SFR and/or first frequency reuse (higher efficiency) of a FFR. At least some embodiments of both FIG. 2 and FIG. 3 can implement these embodiments.

For at least some embodiments, a first bUE device of the plurality of bUE devices 210, 211 is assigned a wireless communication uplink (UL) resource block (RB) for BH traffic and a second bUE device of the plurality of bUE devices is assigned a downlink (DL) RB for BH traffic. For at least one embodiment a first bUE device includes a backhaul CT with desirable DL parameters (for example wide bandwidth—for example VSDL) for an application on a UE device requiring DL access and a second bUE device includes a backhaul CT with desirable UL parameters (for example low latency—for example carrier T1) for an application requiring UL access (for example a real-time video download—DL—with ACKs—UL). For at least one embodiment a first bUE device of the plurality of bUE devices 210, 211 is assigned a wireless communication uplink (UL) resource block (RB) for BH traffic and a second bUE device of the plurality of bUE devices is assigned a downlink (DL) RB for BH traffic to enable joint or simultaneous transmission (for example shared RB) between the first bUE device and a first UE device in the UL and between the second bUE device and a second UE device in the DL. For at least one embodiment a first bUE device of the plurality of bUE devices 210, 211 is assigned a wireless communication uplink (UL) resource block (RB) for BH traffic and a second bUE device of the plurality of bUE devices is assigned a downlink (DL) RB for BH traffic to assist in balancing wireless communication resources (for example RB) between the access WCT and backhaul WCT usage of the wireless communication resources.

For at least some embodiments, at least a first bUE device of the plurality of bUE devices 210, 211 transmits or receives access traffic associated with the first bUE device. For at least one embodiment the first bUE device (for example 210) communicates self-generated access traffic over the backhaul CT (for example 230). For at least one embodiment the first bUE device (for example 210) communicates self-generated access traffic over the WCT (for example 220) through the BS (for example BS 201). For at least one embodiment the first bUE device (for example 210) communicates self-generated access traffic over the backhaul CT (for example 230) or over the WCT (for example 220) through the BS (for example BS 201) based on an access traffic parameter (for example latency or bandwidth).

For at least some embodiments, a first bUE device is dynamically added to or deleted from the plurality of bUE devices 210, 211 based on one or more first parameters associated with the wireless communication between the first bUE device and the BS 201 or one or more second parameters associated with the at least one data network through at least the second communication technology associated with the first bUE device. For at least one embodiment a particular bUE device is dynamically added to the plurality of bUE devices 210, 211 based on one or more first parameters associated with the wireless communication between the first bUE device and the BS 201 relative to a threshold (for example a particular bUE device could be added to the plurality of bUE devices when the SNIR exceeds a threshold, or a MCS exceeds a threshold, or a link quality variation is below a threshold). For at least one embodiment a particular bUE device is dynamically deleted from the plurality of bUE devices 210, 211 based on one or more first parameters associated with the wireless communication between the first bUE device and the BS 201 relative to a threshold (for example a particular bUE device could be deleted from the plurality of bUE devices when the SNIR drops below a threshold, or a transmit power exceeds a threshold, or a PER is above a threshold). At least some embodiments of both FIG. 2 and FIG. 3 can implement these embodiments.

For at least some embodiments, the BS 201 is further operative to select at least a first bUE device of the plurality of bUE devices 210, 211 for backhaul (BH) traffic, wherein the BH traffic includes access traffic from a second bUE device of the plurality of bUE devices 210, 211.

For at least some embodiments, a first bUE device of the plurality of bUE devices 210, 211 is assigned a first channel, and a second bUE device of the plurality of bUE devices 210, 211 is assigned a second channel. For at least one embodiment one of the plurality of UE devices access WCT is assigned to the first or second channel. For at least one embodiment one of the plurality of UE devices access WCT is assigned to the first or third channel.

For at least some embodiments, the selection of the one or more of the bUE devices 210, 211 is based on evaluating, obtaining and/or classifying a characteristic or parameter of the access, payload, communication, or data flow of the at least one UE device (such as, UE device 212) and the BS 201. At least some embodiments of both FIG. 2 and FIG. 3 can implement these embodiments.

Figure 5:
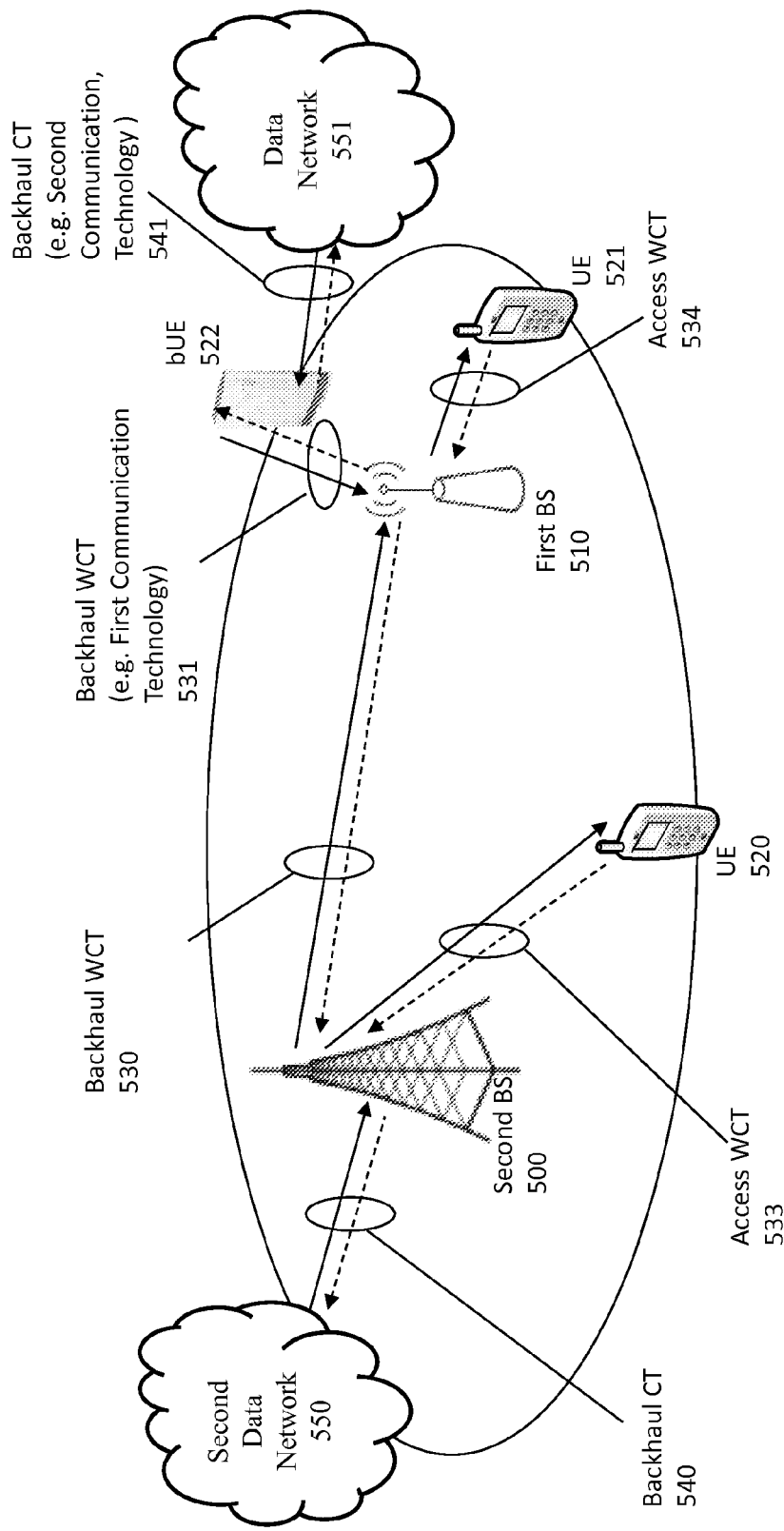
FIG. 5 shows another backhaul system, according to an embodiment.

FIG. 5 shows another backhaul system, according to an embodiment. For this embodiment, the system includes a first base station (BS) 510, one or more backhaul user equipment (bUE) devices (such as, bUE device 522), the one or more bUE devices 522 operable to wirelessly communicate with the first BS 510 through at least a first communication technology (for example wireless communication technology (WCT) 531), and the one or more bUE devices 522 operable to communicate with at least one data network (such as, data network 551) through at least a second communication technology (for example backhaul communication technology (CT) 541), and a second base station (BS) 500 operable to wirelessly communicate (for example through backhaul WCT 530) with the first BS 510, the second BS 500 further operable to communicate with a second data network (such as, data network 550 through backhaul CT 540). For this embodiment, the first BS 510 is operative to wirelessly communicate (for example access WCT 534) with one or more user equipment (UE) devices (such as, UE device 521), and network connect the one or more UE devices 521 to the at least one data network 551 or the second data network 550 through at least one of the one or more bUE devices 522 or the second BS 500, select at least one of the one or more bUE devices 522 or the second BS 500 for backhaul (BH) traffic, wherein the BH traffic includes access traffic from the one or more UE devices 521, aid in selecting the transmission power level of at least one of the one or more bUE devices 522, or at least one of the one or more UE devices 521, and transmit resource block (RB) scheduling information for the BH traffic transmission of at least one of the one or more bUE devices 522 and the access traffic of at least one of the one or more UE devices 521. An exemplary second UE device 520 is shown connected to the second BS 500 through access WCT 533. In at least some embodiments, the second BS 500 shares wireless communication resources (for example one or more frequency bands or one or more frequency channels or one or more resource blocks) between the backhaul WCT 530 and the access WCT 533 for access traffic associated with UE device 520.

In at least some embodiment the first BS 510 assigns at least a portion of the access traffic to be communicated over the BH WCT 530 connection between the first BS and the second BS. In at least some embodiment, the first BS includes a Relay Node. In at least some embodiments, the first BS 510 may communicate all of the access traffic associated with the first BS's associated UE (for example UE device 521) through backhaul WCT 530. In at least some embodiments, BH WCT 530 includes a scarce or shared or expensive wireless resource (such as 3G/4G wireless spectrum) or generates interference to other BS or UE device (for example access WCT 533 or access WCT 534). In at least some embodiments, the access traffic associated with one of the one or more UE device associated with first BS 510 (for example UE device 521) includes a plurality of services or applications with one or more backhaul requirements (for example one or more of latency, bandwidth, QoS, PER, cost, a data usage cap, etc.). In at least some embodiments, at least one of the one or more backhaul requirements of a service or application generating access traffic exceed the backhaul parameters of BH WCT 530 (for example cost or bandwidth). In at least some embodiments, one or more of the backhaul parameters of BH WCT 530 exceed the requirements of services or applications of the one or more UE device (for example UE device services or applications may include background data or best effort data). In at least some embodiments, it may be desirable to add (for example deploy a bUE device or select and/or reconfigure a particular UE device from the one or more UE device) a bUE device and selecting between the BH WCT 530 associated with BS 500 and BH WCT 531 associated with the bUE device 522 for backhauling access traffic from UE device 521. For example BH WCT 531 may include one or more of a first cost, a first latency, first interference, first bandwidth to a data network 551, and the BH WCT 530 to second data network 550 over BH CT 540 may include one or more of a second cost, a second latency, second interference, second bandwidth to a data network 551. In at least some embodiments, the first cost of BH WCT 531 is lower than a second cost of BH WCT 530 and services or applications requiring low cost are communicated over BH WCT 531 (for example streaming video). In at least some embodiments, the first latency of BH WCT 531 is higher than a second latency of BH WCT 530 and services or applications requiring low latency are communicated over BH WCT 530 (for example VoIP).

In at least some embodiments, the BH CT 540 to data network 550 is a carrier core network (for example carrier class), but is low bandwidth or expensive (for example a few T1). In at least some embodiments, the BH to data network 551 through bUE device 522 is over a consumer grade (for example DSL or cable modem) network. In at least some embodiments, latency sensitive access traffic is carried over BH WCT 530. In at least some embodiments, BH WCT 531 through bUE device 522 is selected based on one or more of peak traffic events or to communicate overflow traffic or offload traffic or best effort traffic or background access traffic.

For at least some embodiments the first BS 510 includes one or more of a cellular BS or a Relay Node (RN).

For at least some embodiments the one or more bUE devices (such as, bUE device 522) wirelessly communicate with the first BS 510 over one or more of wireless communication technologies (WCT 531), wherein the one or more wireless communication technologies include at least one of WiFi, WiMax, 3G, 4G, LTE, Orthogonal frequency division multiple access (OFDMA), Wideband code division multiple access (WCDMA).

For at least some embodiments the one or more UE devices (such as, UE device 521) wirelessly communicate (WCT 534) with the first BS 510 over one or more of wireless communication technologies, wherein the one or more wireless communication technologies include at least one of WiFi, WiMax, 3G, 4G, LTE, OFDMA, WCDMA.

For at least some embodiments the one or more UE devices (such as, UE device 521) wirelessly communicate with the first BS 510 and the one or more bUE devices (such as, bUE device 522) wirelessly communicate with the first BS 510 utilizing a same wireless communication technology (that is, WCT 531 and WCT 534 are the same). More specifically, for at least some embodiments the one or more UE devices (such as, UE device 521) wirelessly communicate with the first BS 510, and the one or more bUE devices (such as, bUE device 522) wirelessly communicate with the first BS 510 utilizing the same wireless communication technology and a shared one or more frequency channels.

For at least some embodiments the at least one of the one or more UE devices (such as, UE device 521) or at least one of the one or more bUE devices (such as, bUE device 522) includes one or more of a fixed client terminal, mobile terminal, a user terminal, an access terminal, a consumer premises equipment. For at least some embodiments the at least one of the one or more UE devices or at least one of the one or more bUE devices (such as, bUE device 522) includes one or more of a cellular phone, a smart phone, a notebook, a laptop, a tablet, or a PC.

For at least some embodiments the at least one of the one or more bUE devices (such as, bUE device 522) is at least one of associated with or a part of a small cell BS, wherein the small cell BS includes client side modem functionality. More specifically, for at least some embodiments the small cell BS includes one or more of a microcell, a picocell, a relay node, a femtocell.

For at least some embodiments the at least one data network includes one or more of a wide area network, mobile core, core network, a company network, carrier network, broadband network, internet.

For at least some embodiments the second communication technology includes one or more of broadband internet connectivity, wired communication technology, T1, E1, digital subscriber line (DSL), Data Over Cable Service Interface Specification (DOCSIS), cable modem, wireless communication technology, WiFi, WiMax, 4G, point to point (P2P) or point to multi-point (P2 mP) microwave, fiber communication technology (for example 4G carrying 3G/2G).

For at least some embodiments the first BS 510 is further operative to obtain one or more first parameters associated with the wireless communication (such as, WCT 531) between at least one of the one or more bUE devices (such as, bUE device 522) and the first BS 510. More specifically, for at least some embodiments the selection of the at least one of the one or more bUE devices (such as, bUE device 522) for the BH traffic is based on the one or more first parameters. For at least some embodiments the one or more first parameters includes one or more of a link quality, link quality statistics, link quality variation, path loss, fading, shadowing, Signal to Noise Ratio (SNR), Signal to Interference and Noise Ratio (SINR), Packet Error Rate (PER), received interference, interference generated to other devices, Channel Quality Indicator (CQI), Channel State Information (CSI), Modulation and Coding Scheme (MCS), Precoding Matrix Indicator (PMI), rank indicator (RI), single user or multiuser Multiple Input Multiple Output (SU-MIMO or MU-MIMO) information.

For at least some embodiments the first BS 510 is further operative to obtain one or more second parameters associated with the at least one data network (such as data network 510 through at least the second communication technology. More specifically, for at least some embodiments the selection of the at least one of the one or more bUE devices (such as, bUE device 522) for the BH traffic is based on the one or more second parameters. An exemplary, non-exhaustive list of second parameters includes one or more of a link quality, bandwidth, throughput, cost, latency, jitter, QoS, PER.

For at least some embodiments the access traffic associated with the one or more UE devices (such as, UE device 521) is classified into two or more data flows based on a data flow parameter and the selection of at least one of the one or more bUE devices (such as, bUE device 522) for the BH traffic is based in part on the data flow parameter. For at least some embodiments the data flow parameter includes one or more of a data flow bandwidth, latency, Quality of Service (QoS), PER, UE device state, application, user state, cost, sponsoring, data plan.

For at least some embodiments the first BS 510 operative to aid in selecting the transmission power level of at least one of the one or more bUE devices (such as, bUE device 522), or the one or more UE devices (such as, UE device 521) is assisted by a signal transmitted by the first BS 510. For at least some embodiments the assisting by the signal transmitted by the first BS 510 includes one or more of a control message from the first BS 510, or a reference signal transmitted by the first BS 510.

For at least some embodiments a resource block includes a partition of a carrier or frequency channel for the wirelessly communicating. For at least some embodiments the partition includes one or more of a unit of time, a unit of frequency, or a code. For at least one other embodiment, the partition includes one or more of a time slot, a frequency band, a time-frequency allocation, a time-code allocation, a time-frequency-code allocation.

For at least some embodiments the wireless communication between the one or more bUE devices (such as, bUE device 522) and the first BS 510 is enhanced relative to the wireless communication between the first BS 510 and at least one of the one or more UE devices (such as, UE device 521), wherein the enhanced wireless communication includes one or more of better antenna gain, more antennas, outdoor installation, better processing power, better transmit or receive analog or digital performance, lower transmit power, higher or outdoor installation, improved link parameters, improved number of antennas.

At least some embodiments further include classifying and prioritizing the BH traffic based on the access traffic, and wherein the RB scheduling information for the BH traffic is based on the BH traffic prioritization. At least some embodiments further include classifying and prioritizing the access traffic, wherein the RB scheduling information for the access traffic and the BH traffic is based on the access traffic prioritization and BH traffic prioritization. More specifically, at least some embodiments include classifying the BH traffic including best effort access traffic having a lower priority than classified access traffic having a delay QoS below a threshold.

At least some embodiments further includes selecting the one or more bUE devices (such as, bUE device 522) such that at least one of the one or more UE devices (such as, UE device 521) has an associated bUE device, thereby enabling joint or simultaneous wireless communication over one or more shared resource blocks (RB). At least some embodiments further includes selecting the one or more bUE devices (such as, bUE device 522) such that a majority of the one or more UE devices (such as, UE device 521) has an associated bUE device, thereby enabling joint or simultaneous wireless communication over one or more shared resource blocks (RB). For at least some embodiments, the joint wireless communication over the one or more shared RB includes joint wireless communication utilizing one or more of communication separable in space, multilevel constellation, transmitter precoding or receiver separation. For at least some embodiments the at least one of the one or more bUE devices (such as, bUE device 522) includes a plurality of transmit antennas, wherein the at least one bUE device includes more transmit antennas than the one or more UE devices (such as, UE device 521). For at least some embodiments, the at least one of the one or more bUE devices (such as, bUE device 522) includes a plurality of transmit antennas, wherein the at least one bUE device includes more transmit antennas than the majority (for example 50% or more) of the one or more UE devices (such as, UE device 521). For at least some embodiments a majority (for example 50% or more) of the one or more bUE devices (such as, bUE device 522) includes a plurality of transmit antennas, wherein the majority of the one or more bUE device includes more transmit antennas than the majority (for example 50% or more) of the one or more UE devices (such as, UE device 521). For at least some embodiments the at least one of the one or more bUE devices (such as, bUE device 522) includes a plurality of receiver antennas, wherein the at least one bUE device includes more receiver antennas than the one or more UE devices (such as, UE device 521). For at least some embodiments the at least one of the one or more bUE devices (such as, bUE device 522) includes a plurality of receiver antennas, wherein the at least one bUE device includes more receiver antennas than the majority (for example 50% or more) of the one or more UE devices (such as, UE device 521). For at least some embodiments a majority (for example 50% or more) of the one or more bUE devices (such as, bUE device 522) includes a plurality of receiver antennas, wherein the majority of the one or more bUE device includes more receiver antennas than the majority (for example 50% or more) of the one or more UE devices (such as, UE device 521).

In at least one embodiment, the at least one bUE device is associated with at least one of the one or more UE devices (such as, UE device 521) includes a plurality of transmit (or alternatively receive) antennas, wherein the at least one bUE device includes more transmit (or alternatively receive) antennas than the one or more UE devices (such as, UE device 521) the at least one bUE device is associated with.

For at least some embodiments the first BS 510 is one of a plurality of BSs, wherein the plurality of BSs are each assigned one or more frequency channels based on a soft frequency reuse (SFR) scheme with at least a low transmit power level and a high transmit power level, and wherein at least one of the one or more bUE devices (such as, bUE device 522) are assigned a resource block (RB) at the low transmit power level. For at least some embodiments the first BS 510 is one of a plurality of BSs, wherein the plurality of BSs are each assigned one or more frequency channels based on a soft frequency reuse (SFR) scheme with at least a low transmit power level and a high transmit power level, and wherein at least a majority (for example 50% or more) the one or more bUE devices (such as, bUE device 522) are assigned a resource block (RB) at the low transmit power level.

For at least some embodiments the first BS 510 is one of a plurality of BSs, wherein the plurality of BSs are each assigned one or more frequency channels based on a fractional frequency reuse (FFR) scheme and wherein at least one of the one or more bUE devices (such as, bUE device 522) are assigned a resource block (RB) having a higher frequency reuse than a resource block (RB) assigned to the one or more UE devices (such as, UE device 521). For at least some embodiments the first BS 510 is one of a plurality of BSs, wherein the plurality of BSs are each assigned one or more frequency channels based on a fractional frequency reuse (FFR) scheme and wherein at least a majority (for example 50% or more) of the one or more bUE devices (such as, bUE device 522) are assigned a resource block (RB) having a higher frequency reuse than a resource block (RB) assigned to the one or more UE devices (such as, UE device 521).

For at least one embodiment, the one of more bUE devices includes a plurality of bUE devices, and wherein a first bUE device of the plurality of bUE devices is assigned a wireless communication uplink (UL) resource block (RB) for BH traffic and a second bUE device of the plurality of bUE devices assigned a downlink (DL) RB for BH traffic.

For at least one embodiment, at least a first bUE device of the one or more bUE devices (such as, bUE device 522) transmits or receives access traffic associated with the first bUE device (for example self-generated access traffic form services or applications associated with the bUE device). For at least one embodiment a first bUE device is dynamically added to or deleted from the one or more bUE devices (such as, bUE device 522) based on one or more first parameters associated with the wireless communication between the first bUE device and the first BS 510 or one or more second parameters associated with the at least one data network through at least the second communication technology associated with the first bUE device.

For at least one embodiment, the first BS 510 is further operative to select at least a first bUE device of the one or more bUE devices (such as, bUE device 522) for backhaul (BH) traffic, wherein the BH traffic includes access traffic from at least a second bUE device of the one or more bUE devices (such as, bUE device 522).

Figure 6:
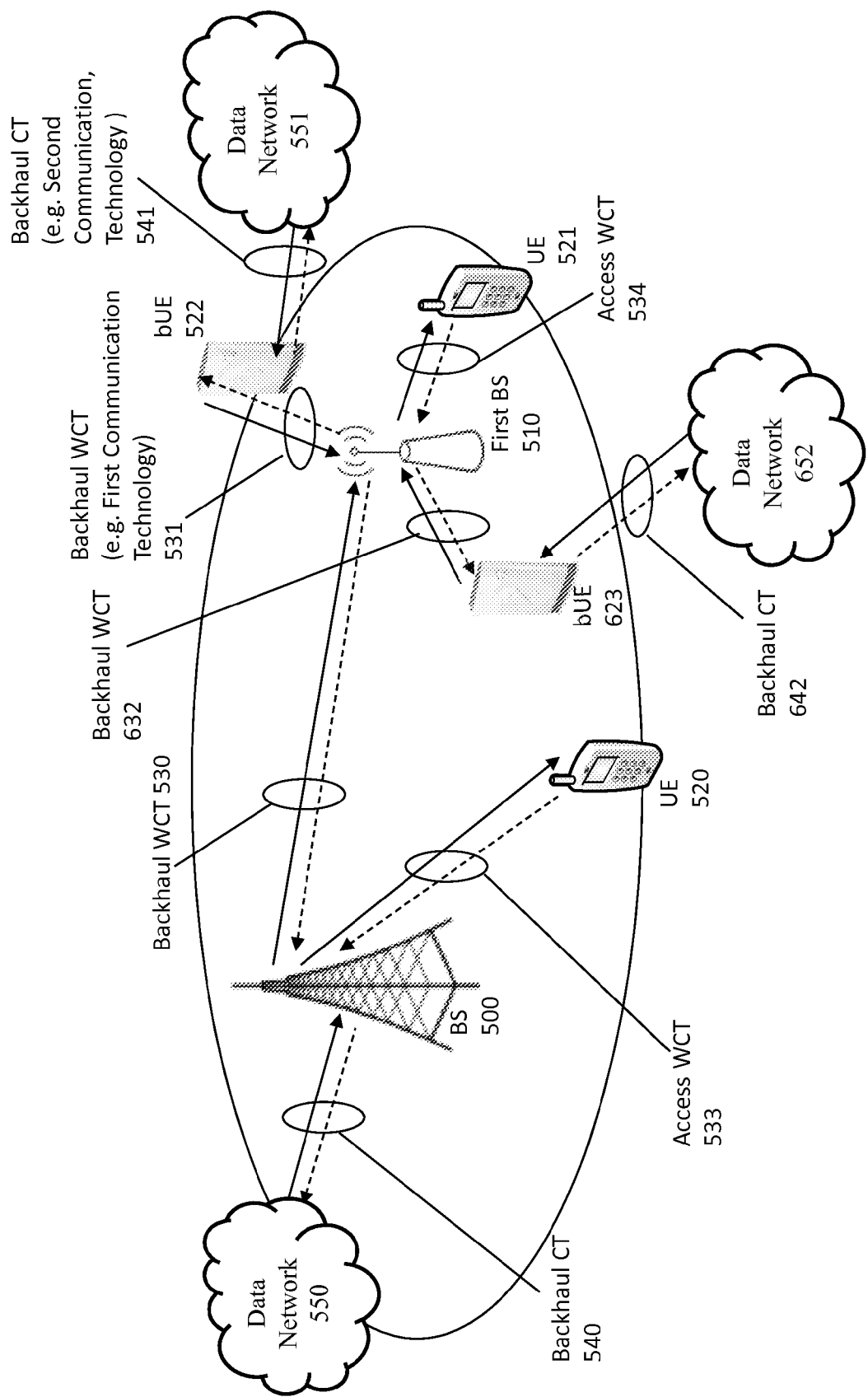
FIG. 6 shows another backhaul system, according to an embodiment.

FIG. 6 shows another backhaul system, according to an embodiment. This embodiment further includes multiple bUE devices 522, 623, wherein a first bUE device 522 operable to communicate with at least one data network (such as, data network 551) through at least a second communication technology (such as backhaul CT 541), and second bUE device 623 is operable to communicate with at least one data network (such as, data network 652) through, for example, backhaul CT 642. At least some embodiments of both FIG. 2 and FIG. 4 (which include a plurality of bUE devices) may be utilized for the embodiments related (or alternatively associated with or in conjunction with or jointly with or to enhance) to FIG. 6.

For at least some embodiments, the selecting at least one of the one or more bUE devices (such as, bUE devices 522, 623) is based on one or more first parameters associated with the wireless communication between the one or more bUE devices (such as, bUE devices 522, 623) and the first BS 510 or one or more second parameters associated with one or more first data network through at least one or more second communication technology. For at least one embodiment, the selection at least one of the one or more bUE devices (such as, bUE devices 522, 623) includes one or more of selecting a deployment, selecting a type, selecting a configuration, selecting an installation, selecting a site. For at least one embodiment, the one of more bUE devices (such as, bUE devices 522, 623) includes a plurality of bUE devices (such as, bUE devices 522, 623), and wherein the first parameter of the bUE device selection is based on a joint first parameter between at least two of the plurality of bUE devices (such as, bUE devices 522, 623). For at least one embodiment the joint first parameter enables joint or simultaneous wireless communication on a shared resource block (RB) of at least two of the plurality of bUE devices (such as, bUE devices 522, 623). For at least one embodiment the joint or simultaneous wireless communication includes one or more of multi user (MU)-MIMO, successive interference cancelling (SIC), multilevel constellation/modulation.

In at least one embodiment, the backhaul system in FIG. 5 is improved as shown in the backhaul system FIG. 6 by including an additional bUE device (for example bUE device 623). For example access traffic associated with UE device 521 could be selected between backhauling paths BH WCT 530, BH WCT 531 and BH WCT 632 based on one or more of the WCT parameters (for example spectrum efficiency, throughput, PER, received or generated interference, channel variation, mobility, handoff) or the one or more BH CT parameters (for example latency, bandwidth, PER, jitter) of BH CT (such as 540, 541, 642), associated with one or more data networks (such as 550, 551, 652). In at least some embodiments, the one or more data networks 550, 551, 652 may be the same network. In at least some embodiments, two out of the 3 networks 550, 551, 652 may be the same network. In at least some embodiments, the one or more data networks 550, 551, 652 may be the same or different networks. In at least some embodiments, selecting a backhaul path between a plurality of bUE devices enables (or improves) sharing (or joint or simultaneously) of WCT resources between the bUE device and the UE device (SDMA, BF, MU-MIMO, SIC). In at least some embodiments, backhaul selecting between a plurality of bUE devices enables higher spectrum utilization (higher MCS utilization, better frequency reuse, improved FFR, improved SFR, lower interference, lower transmit power).

Figure 7A:
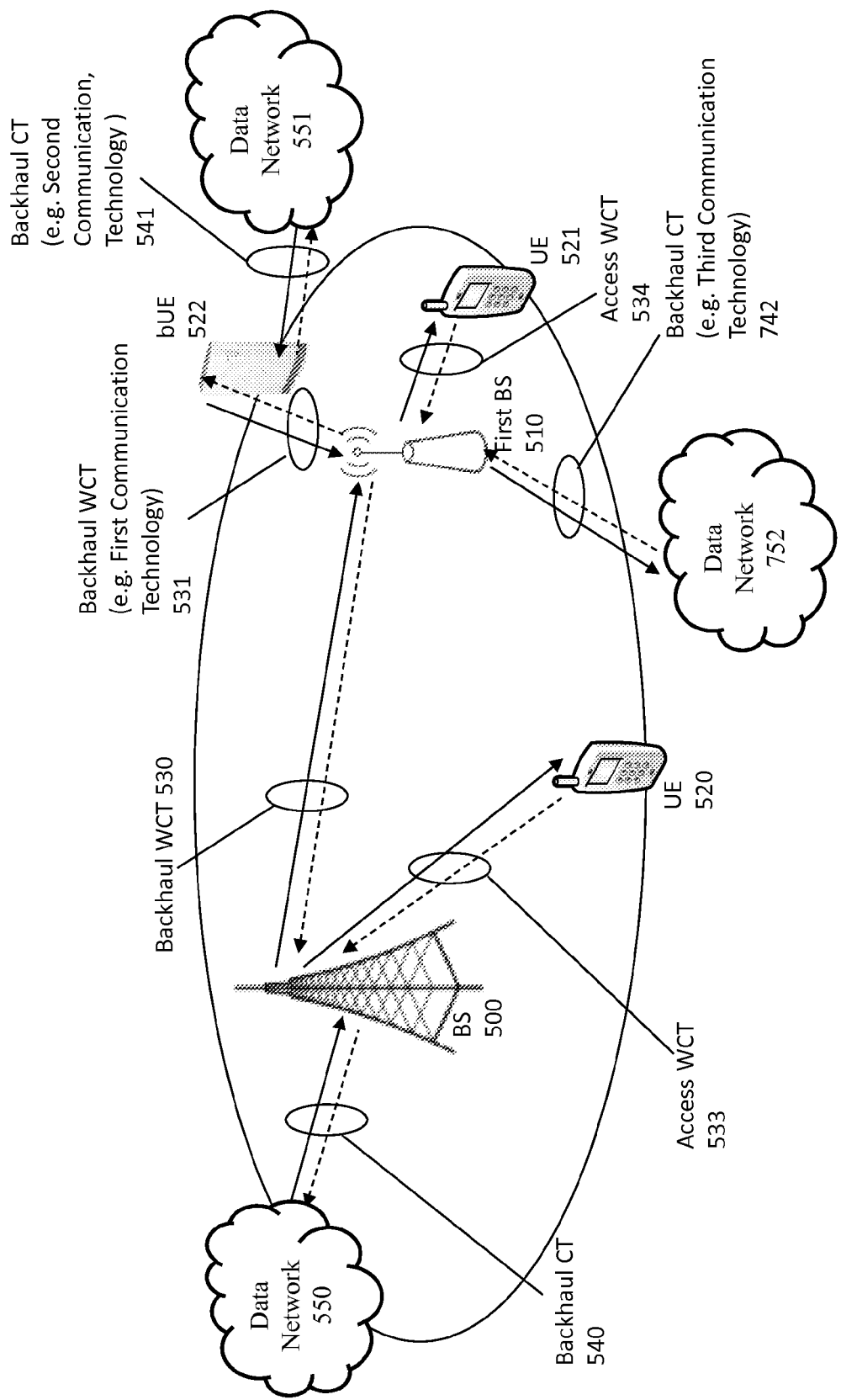
FIG. 7a shows another backhaul system, according to an embodiment.

FIG. 7a shows another backhaul system, according to an embodiment. For this embodiment, the first BS 510 is further operable to communicate with at least a third data network (such as, data network 752) over at least a third communication technology (backhaul CT 742). For at least some embodiments, the third communication technology includes one or more wired communication technology, T1, E1, DSL, DOCSIS, cable modem, wireless communication technology, WiFi, WiMax, P2P or P2 mP microwave, fiber communication technology. For an embodiment, the first BS 510 is further operative to select the third communication technology for BH traffic, wherein the BH traffic of the third communication technology including access traffic from the one or more UE devices 521. For an embodiment, the first BS 510 is further operative to obtain one or more third parameters associated with the at least one data network (such as, data network 752) through at least the third communication technology. For at least some embodiments, the one or more third parameters include one or more of a link quality, bandwidth, throughput, cost, latency, jitter, QoS, PER.

For at least some embodiments, the third communication technology for BH traffic includes a carrier grade communication technology (for example, fiber CT, T1, wireless microwave). For at least some embodiments, the BH traffic of the third communication technology includes legacy access traffic.

Figure 7B:
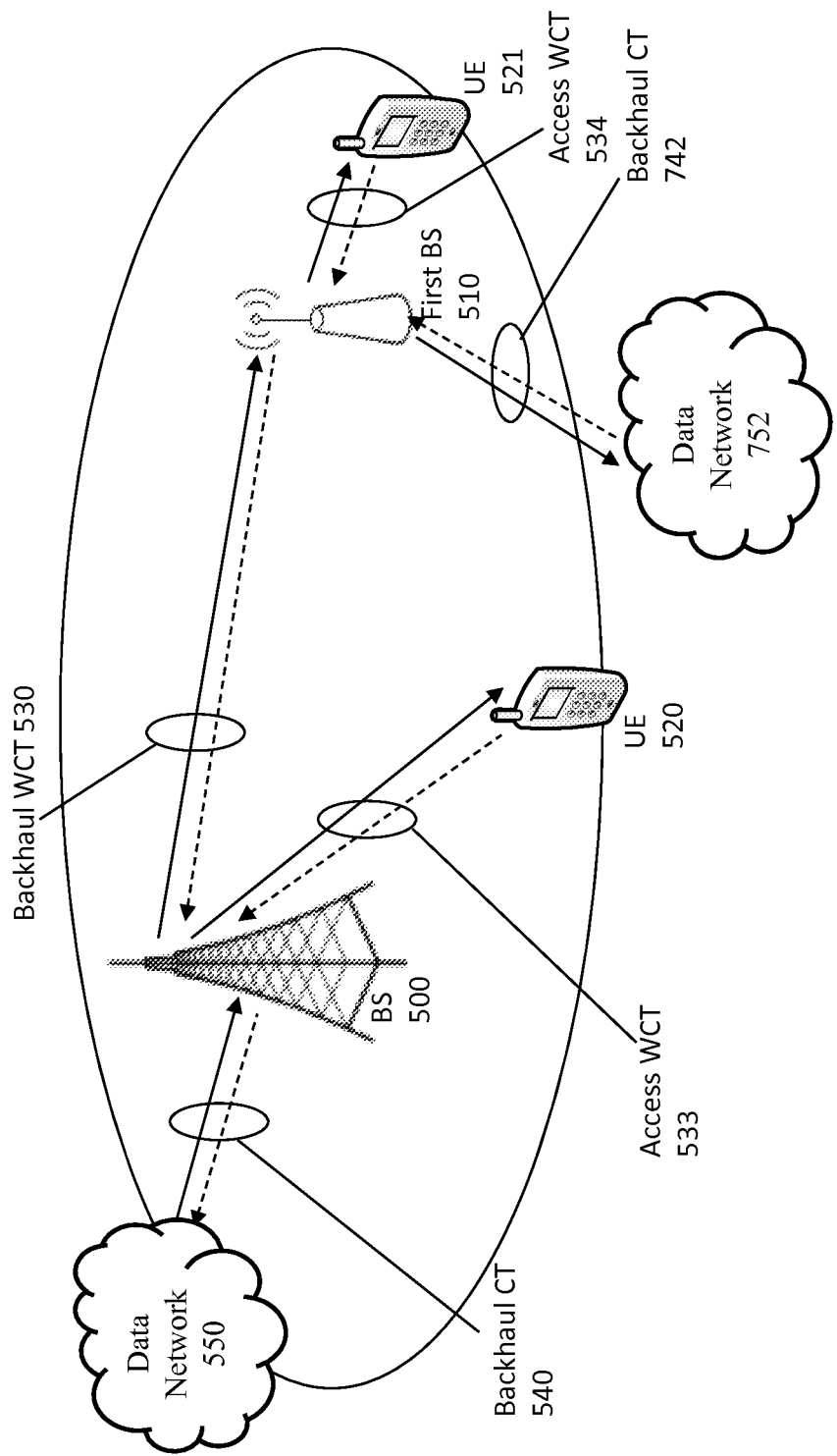
FIG. 7b shows another backhaul system, according to an embodiment.

FIG. 7b shows another backhaul system, according to an embodiment. It is to be noted that the embodiment as shown does not include any bUE devices. This system includes a first base station (BS) 510. A second base station (BS) 500 is operable to wirelessly communicate with the first BS 510. The second BS 500 is further operable to communicate with a second data network 550. Further, the first BS 510 is operative communicate with at least a third data network over at least a third communication, to wirelessly communicate with one or more user equipment (UE) devices (such as, UE device 521), and network connect the one or more UE devices (such as, UE device 521), to at least the third data network 752 or to the second data network 550 through the second BS, select at least one of the third data network over at least a third communication technology or the second data network through the second BS for backhaul (BH) traffic, wherein the BH traffic includes access traffic from the one or more UE devices, aid in selecting the transmission power level of at least one of the one or more UE devices, and transmit resource block (RB) scheduling information for the BH traffic transmission of at least one of the second BS for BH traffic and the access traffic of at least one of the one or more UE devices.

As previously noted, FIG. 7a shows another backhaul system, according to an embodiment. BS 510 may include BH CT to a data network 752. For example BH CT 742 may include one or more carrier class T1/E1 which provides one or more of low bandwidth, low latency, high cost and legacy data communications. In at least some embodiments, BS 510 also includes BH WCT 530 and BH WCT 531. In at least some embodiments, BH CT 742 has lowest latency followed by BH WCT 530 and then BH WCT 531. In at least some embodiments, BH WCT 531 has highest bandwidth, followed by BH WCT 530 and then BH CT 742. Based on the last two sentences access traffic associated to low latency low bandwidth services or applications (such as VoIP or gaming) may be assigned to BH CT 742, access traffic associated to best effort and large bandwidth services or applications (such as video streaming, software download, file sharing, cloud backup) may be assigned to BH WCT 531. In at least some embodiments, one of the BH paths 530, 531, 752 may have BH parameters associated with DL or UL direction that may favor a first BH path for DL access traffic and a second BH path for UL access traffic. For example DSL CT may be asymmetric and favor DL access traffic. For example the access DL WCT resources may be oversubscribed relative to UL WCT resources favoring selection of BH WCT UL.

As previously noted, FIG. 7b shows another backhaul system, according to an embodiment. In at least some embodiments, BS 510 may include BH CT 742 to a data network 752. For example BH CT 742 may include one or more carrier class T1/E1 which provide one or more of low bandwidth and/or low latency and/or high cost. In at least some embodiments, BS 510 may also include BH WCT 530. In at least some embodiments, BH CT 742 has lower latency than BH WCT 530. In at least some embodiments, BH WCT 530 has higher bandwidth than BH CT 742. Based on the last two prior parameters access traffic associated to low latency and/or low bandwidth services or applications (such as VoIP or gaming) may be assigned to BH CT 742, access traffic associated to best effort and/or large bandwidth services or applications (such as video streaming, software download, file sharing, cloud backup) may be assigned to BH CT 530. In at least some embodiments, one of the BH paths 530, 752 may have BH parameters associated with DL or UL direction that may favor a first BH path for DL access traffic and a second BH path for UL access traffic. For example DSL CT may be asymmetric and favor DL access traffic. For example the access DL WCT resources may be oversubscribed relative to UL WCT resources favoring selection of BH WCT UL.

Figure 8:
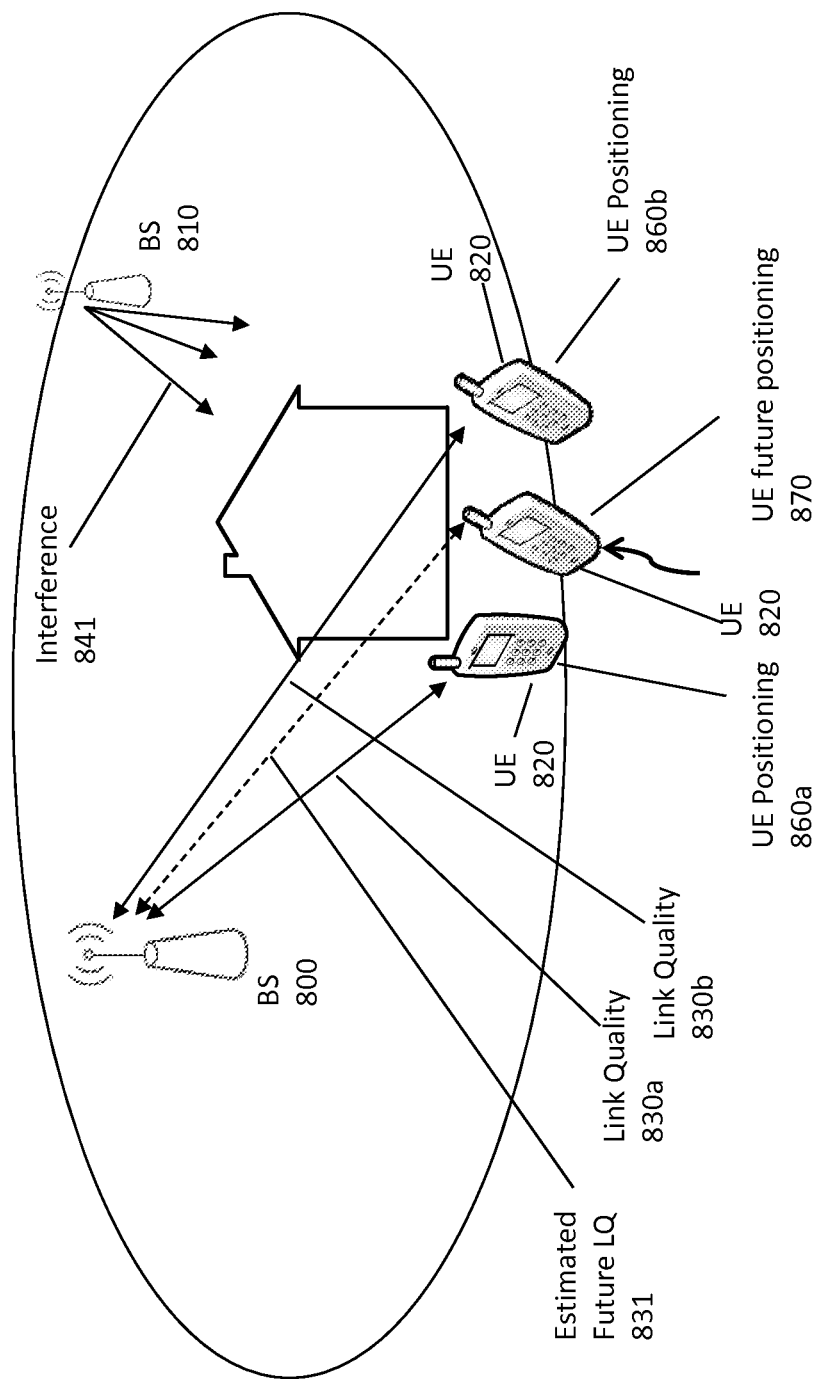
FIG. 8 shows a system for estimating a future link quality of a user equipment (UE) device at a future positioning, according to an embodiment.

FIG. 8 shows a system for estimating a future link quality of a user equipment (UE) at a future positioning, according to an embodiment. This embodiment includes a base station 800 and a UE device (or alternatively a user device or end user device or wireless end user device) 820, wherein the UE device 820 wirelessly communicates with the base station 800. According to at least some embodiments, at least one of a controller of the base station 800, a controller of the UE device 820, a controller (not shown) associated with the system, or a combination of the listed controllers is operative to determine a plurality of link qualities (LQs) 830a, 830b, of the UE device 820 for a plurality of positionings 860a, 860b of the UE device 820, wherein at least one of the plurality of positionings 860a, 860b includes at least a location or an orientation of the UE device 820. The one or more controllers are further operative to store information associated with the plurality of LQs 830a, 830b, for the plurality of positionings 860a, 860b, estimate at least one future positioning 870 of the UE device 820, and estimate a future link quality (LQ) 831 of the UE device 820 at the at least one future positioning 870 of the UE device 820 based on the stored information associated with the plurality of LQs 830a, 830b at the plurality of positionings of the UE device 820. For at least one embodiment the plurality of LQs are one or more of obtained, communicated, received, sent, transmitted, computed, post-processed, extrapolated, interpolated, derived in addition to or instead off stored. For at least one embodiment the estimated future LQ are one or more of obtained, communicated, received, computed, post-processed, extrapolated, interpolated, derived in addition to or instead off estimated.

As shown, a neighboring base station (BS) 810 generates interference 841 which can be received by the UE device 820. For at least one embodiment one or more LQ 830a, 830b includes information associated with interference 841.

For at least one embodiment UE device 820 wirelessly communicates with a first BS (for example BS 800) at a first UE positioning (for example UE positioning 860a) and wirelessly communicates with a second BS (for example BS 810) at a second positioning (for example positioning 860b). For this embodiment a handoff between the first BS 800 and the second BS 810 may occur when the UE device 820 moves from the first UE positioning 860a to the second positioning 860b.

For at least one embodiment a scheduler (for example a scheduler within BS 800 for DL or UL) assigns resources (for example resource allocation of frequency channels, resource blocks, time slots to one of a plurality of UE device) or transmission modes (for example transmit power, modulation and coding scheme (MCS), transmit diversity or pre-coding or MIMO or BF) based on information associated with a link quality between the UE device 820 and a link partner wirelessly communicating with the UE device 820. For at least one embodiment a scheduler assigns resources (for example a plurality of time-frequency RBs) to a plurality of UE devices at a plurality of future time slots. The information associated with the LQ of at least one of the plurality of UE devices at the plurality of future time slots may improve one or more of the link efficiency, link robustness, PER, spectral efficiency, latency, of the wireless communication directed by scheduler. For at least one embodiment a scheduler assigns resources or transmission mode based on a UE device future positioning LQ. For at least one embodiment the future LQ is based on a future positioning of the UE device. For at least one embodiment the future positioning of the UE device 820 is based on a future time. For at least one embodiment the future LQ is based on positioning. For example a UE device may be located (stationary or mobile) within a home or office building and the path loss (or short/long term fading) of the desired signal and interfering signals may change based on the location due to shadowing of windows or walls or reflections of objects surrounding the UE device. For example a UE device may be located (stationary or mobile) within a home or office building and the path loss (or short and/or long term fading) of the desired signal and interfering signals may change based on the orientation due shadowing of windows or walls or reflections of objects surrounding the UE device or polarization of the transmit or receive antennas. For example the LQ of a UE device may be further based on a transmit mode selection (for example transmit power or transmit BF, etc.). For at least one embodiment it may be beneficial to account for transmit mode selecting when storing or estimating LQs. For at least one embodiment the stored or estimated future LQ is based on a carrier (or frequency channel) between the UE device and the link partner. For at least one embodiment the stored or estimated future LQ is based on a link partner selection (for example if the UE device at a location where two serving BS may wirelessly communicate with the UE device). For at least one embodiment the stored or estimated future LQs may be based on surrounding objects. For example the positioning of at least a part of a user associated with the UE device (for example using sensors at the UE device—such as touch sensors, camera, etc.). For example the location of the user's hands or head relative to the UE device. For at least one embodiment the stored information associated with the plurality of LQs includes a number of parameters. For example the stored information could be a multidimensional table including Cartesian (x,y,z) location (for example relative to a home or office origin) and two angle coordinates (for example azimuth and elevation relative to North-South axis), user positioning (for example hand and head offset relative to a UE device origin), and interference level (for example max, min, typical). For at least one embodiment to reduce storage, the LQs information may be compressed (for example by decimating location or angle granularity, or by fitting the information to a function). For at least one embodiment the LQs information may be reduced by applying interpolation or extrapolation operations on the stored LQs for estimating the future LQ. For at least one embodiment a correction factor is applied to some of the LQs information (for example the user hand and/or head information could be included as a correction factor that is independent of UE device location). For at least one embodiment the contributions of transmit mode in the estimated future LQ may be included as a correction factor.

For at least one embodiment the information associated with the plurality of LQs are stored at the UE device. For at least one embodiment the information associated with the plurality of LQs are stored at the UE device to improve the privacy of the UE device or a user associated with the UE device. For at least one embodiment the information associated with the plurality of LQs are stored at the UE device to reduce control overhead to the wireless communication link. For at least one embodiment a user may select if the information associated with the LQs may be shared with the link partner. For at least one embodiment the information associated with the plurality of LQs of a first UE device are stored at an associated BS (for example one of more of a link partner BS or a neighbor BS or a interfering BS). For at least one embodiment the information associated with the plurality of LQs of a first UE device are stored at a second UE device. For at least one embodiment the information associated with the plurality of LQs of a first UE device are stored at one or more controllers associated with the first UE device, an associated BS, a BS aggregator or cluster or a cloud element (for example a cloud RAN or cloud BS).

For at least one embodiment a BS (for example BS 800) is communicating with a plurality of UE device (including UE device 820). For at least one embodiment the BS includes a scheduler for jointly scheduling the plurality of UE device. For at least one embodiment the BS obtains a plurality of estimated future LQs of the plurality of UE devices and the scheduler assigns resources to each of the plurality of UE devices based on the plurality of estimated future LQs (for example if a first UE SNR is estimated to increase and a second UE SNR is estimated to decrease), the second UE device may be scheduled before the first UE device. For at least one embodiment the BS obtains a plurality of estimated future LQs of the plurality of UE devices and the scheduler assigns transmit modes to each of the plurality of UE devices based on the plurality of estimated future LQs (for example the scheduler may assign joint resources to two UE devices using MU-MIMO or BF transmission).

For at least one embodiment, the at least one of the future LQ or the plurality of LQs 830a, 830b includes one or more of a path loss (PL), S, I, SNR, SINR, SIR, CQI, CSI, PER. For at least one embodiment, the at least one of the future LQ or the plurality of LQs 830a, 830b is associated with an uplink or downlink transmission. For at least one embodiment, the at least one of the future LQ or the plurality of LQs 830*a*, 830*b* is associated with a frequency band or a frequency channel. A non-exhaustive list of exemplary frequency bands includes a 850 MHz GSM band (824-849 MHz and 869-894 MHz) and a PCS band (1,850-1,910 MHz and 1,930-1,990 MHz) cellular frequency bands. A non-exhaustive list of exemplary frequency channels include a 1.4 MHz, 3 MHz, 5 MHz, 10 MHz, 15 MHz, and 20 MHz used for 4G or LTE. For at least one embodiment one or more channels may be used at each frequency band. For at least one embodiment, at least one of the future LQ or the plurality of LQs 830*a*, 830*b* is associated with a wireless communication technology. A non-exhaustive list of exemplary a wireless communication technologies include GSM, CDMA, HSPA, LTE. For at least one embodiment, at least one of the future LQ or the plurality of LQs 830*a*, 830*b* is associated with a link partner of the UE device 820.

For at least one embodiment, a link quality positioning information includes at least one of the determined plurality of LQs 830*a*, 830*b*, the stored information, the estimated future positioning 870 or the estimated future LQ 831. For at least one embodiment, the UE device 820 obtains at least a portion of the link quality positioning information from a link partner. More specifically, for at least one embodiment, the UE device 820 communicates at least a portion of the link quality positioning information to a link partner.

At least one embodiment further includes allocating a resource to a UE link, wherein the allocation of the resource to the UE link is based on the estimated future LQ 831. For at least one embodiment, the allocating can be performed by a controller, wherein the controller can be located within a base station or equivalent—such as, a combination of base stations, a base station controller, or cloud (for example a cloud RAN or cloud BS). More specifically, for at least one embodiment, the resource is one or more of a carrier, a frequency channel, a resource block, a time slot, a frequency band, a code.

At least one embodiment, further includes selecting a transmission mode for a UE link, wherein the selecting the transmission mode for the UE link is based on the estimated future LQ 831. Again, for at least some embodiments, the selecting can be performed by a controller, wherein the controller can be located within a base station or equivalent—such as, a combination of base stations, a base station controller, or cloud. For at least one embodiment, the transmission mode includes one or more of a modulation, a code, a modulation and coding scheme (MCS), a MIMO mode, a beamforming parameter, a transmit power.

At least some embodiments further include obtaining at least one future time, and wherein the estimating the at least one future positioning 870 is based on the at least one future time. For at least one embodiment a scheduler assigns resources (for example time-frequency RB or time slots—either DL or UL) to a UE device at a particular time slot or particular time-frequency block or a particular time-code or a particular time-frequency-code blocks. For at least one embodiment the estimated future LQ (at one or more future times) may be used by the scheduler for improving the wireless communication between the UE device and the link partner (for example one or more BS) by assigning the particular resource or a particular resource at a particular transmission mode.

At least some embodiments further include a second plurality of positionings wherein the second plurality of positionings includes the at least one future positioning 870, and further includes estimating a second plurality of LQs based on the second plurality of positionings. More specifically, for at least one embodiment, the second plurality of positionings includes a current positioning. More specifically, at least one embodiment further includes allocating a resource block (RB) to a UE device 820 link based on the estimated second plurality of LQs.

For at least some embodiments, the plurality of positionings is constrained to a physical area. More specifically, for at least some embodiments, the constrained physical area includes one or more of at least a portion of a home, an office, or an office building.

For at least some embodiments, at least one of the plurality of positionings or the estimated at least one future positioning 870 of the UE device 820 further includes at least one of an error, an accuracy, a deformation, a velocity, an acceleration. For at least one embodiment a velocity and/or acceleration (for example a current or past one or more of location or velocity or acceleration may be used to estimate a future position, for example using motion equations) may be used to obtain the estimated at least one future positioning. For at least one embodiment a positioning error or a positioning accuracy may be used to assign a quality measure or a confidence interval or a statistic measure to the positioning or the associated LQ. For example if the positioning error is below a first threshold, the associated plurality of LQ of future estimated LQ error may be below a second threshold. For at least one embodiment if an error (or alternatively accuracy) of at least one of a plurality of LQ or estimated future LQ are below a first threshold, the associated wireless communication PER may be below a second threshold. For at least one embodiment a data communication over wireless communication between UE device 820 and BS 800 requires a low PER and the estimated future positioning error must be below a threshold or the transmission mode must have additional margin (above a threshold) or robustness.

At least some embodiments further include determining a UE device 820 usage information, wherein at least a portion of the link quality positioning information is based on the UE device 820 usage information. More specifically, for at least some embodiments, the UE device 820 usage information includes UE device 820 information indicating one or more of a user handheld mode, a hands-free mode, a speaker phone mode, a car Bluetooth mode, a headset Bluetooth mode. For at least one embodiment the UE device 820 being in handheld mode results in additional signal loss or attenuation from the users' hand (and/or head). For at least one embodiment the UE device 820 being in car Bluetooth mode results in additional signal loss from car walls/exterior but typically less attenuation from not being indoors and typically additional channel fluctuations from car mobility. For at least one embodiment the UE device 820 being in speaker phone mode results in lower loss from head attenuation.

At least some embodiments further include determining a UE device 820 environment information, wherein at least a portion of the link quality positioning information is based on the UE device 820 environment information. More specifically, for at least some embodiments, the UE device 820 environment information includes information associated to one or more of a traffic load, a network load, an interference. For at least some embodiments, the UE device 820 environment information includes one or more time of day, whether information (for example, temperature, wind, or humidity), day of year, or season. For at least some embodiments, the UE device 820 environment information includes information associated with surrounding objects. For at least some embodiments, the UE device 820 environment information includes information associated with a user of the UE device.

For at least some embodiments, the information associated with the user of the UE device includes positioning of the user of the UE device 820. For at least some embodiments, the information associated with the user of the UE device includes positioning of the user of the UE device 820 relative to the UE device 820. At least some embodiments further include assisting determining the UE device 820 environment information using sensors of the UE device 820. The sensors include, for example, a camera a touchscreen and/or gyroscope.

Figure 9:
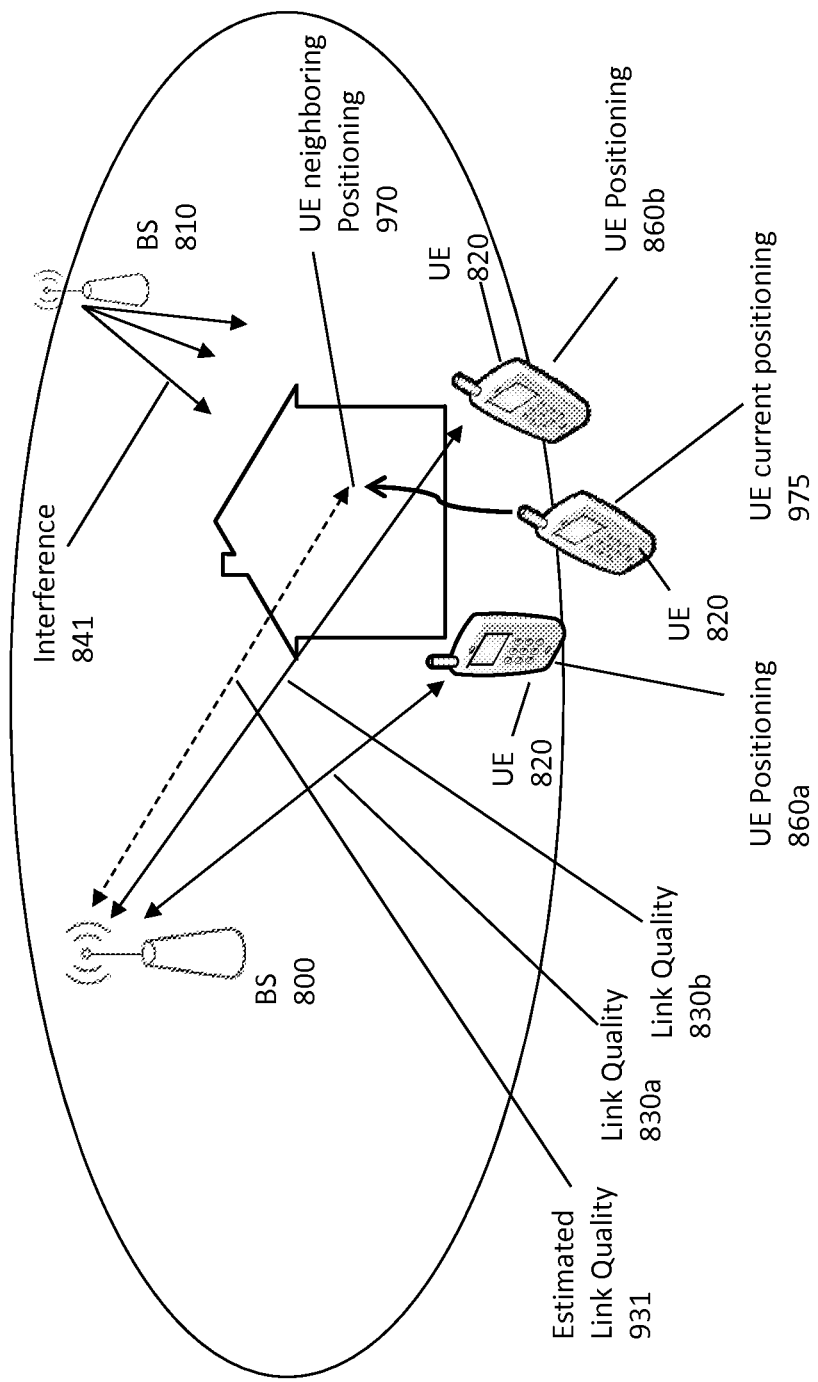
FIG. 9 shows another system for estimating a link quality of a UE device at a neighboring positioning, according to an embodiment.

FIG. 9 shows another system for estimating a link quality of a UE device at a neighboring positioning, according to an embodiment. It is to be understood that the embodiments of FIG. 8 can be applied to the embodiments of FIG. 9.

For at least one embodiment it is desirable to estimate (or alternatively derive or obtain or predict or interpolate or extrapolate) a link quality at one or more positionings that are within a positioning threshold of a current positioning of a UE device. For example, the link quality from one or more possible changes of positioning may be estimated for attempting to improve the link quality (for example if the current LQ is not adequate). For at least one embodiment moving to a neighboring positioning may include rotating the UE device from a vertical to a horizontal positioning, or moving from the left side to the right side of a user's head, or walking the UE device to a different location in a room or a building.

The embodiment of FIG. 9 includes a base station 800 and user equipment 820 (UE), wherein the UE device 820 wirelessly communicates with the base station 800. According to at least some embodiments, at least one of a controller of the base station 800, a controller of the UE device 820, a controller (not shown) associated with the system, or a combination of the listed controllers is operative to determine a plurality of link qualities (LQs) 830*a*, 830*b*, of the UE device 820 for a plurality of positionings 860*a*, 860*b* of the UE device 820, wherein at least one of the plurality of positionings 860*a*, 860*b* includes at least a location or an orientation of the UE device 820. The controller(s) are further operative to store information associated with the plurality of LQs 830*a*, 830*b* for the plurality of positionings 860*a*, 860*b*, estimate at least a positioning of the UE device, determine at least one neighboring positioning 970 of the positioning of the UE device 820, and estimate a link quality (LQ) 931 of the UE device 820 at the at least one neighboring positioning 970 of the UE device 820 based on the stored information associated with the plurality of LQs 830*a*, 830*b* at the plurality of positionings 860*a*, 860*b* of the UE device 820.

At least some embodiments further include adjusting or changing a configuration of the UE device 820 based on the estimated LQ 931. At least some embodiments further include presenting the estimated LQ 931 of the UE device 820 at the at least one neighboring positioning 970. That is, present estimated LQ 931 of the UE device 820 at the at least one neighboring positioning 970 to a user of the UE device 820. At least some embodiments further include selecting a candidate positioning from the at least one neighboring positioning 970 based on the estimated LQ 931. At least some embodiments further include presenting the selected candidate positioning to a user of the UE device 820. For at least some embodiments a link quality neighboring positioning information includes at least one of the determined plurality of LQs 830*a*, 830*b*, the stored information, the estimated at least a positioning of the UE device 820, the determined at least one neighboring positioning 970, or the estimated LQ. At least some embodiments further include determining a UE device 820 environment information, wherein at least a portion of the link quality neighboring positioning information is based on the UE device 820 environment information. For at least some embodiments the UE device 820 environment information includes information associated with a user of the UE device 820. At least some embodiments further include selecting a joint candidate positioning of the UE device 820 and a user of the UE device 820, wherein the joint candidate positioning includes a combination of a UE device 820 positioning and a user positioning relative to the UE device 820. At least some embodiments further include presenting the selected joint candidate positioning.

For at least one embodiment it may be beneficial to estimate a LQ at a neighboring positioning based on a first positioning. For at least one embodiment the first UE positioning may be a UE current positioning 975. For at least one embodiment it may be beneficial to estimate a LQ at a plurality of neighboring positioning based on a first positioning. The estimated future LQ at the plurality of neighboring positioning may be presented to a user of the UE device (for example in a color coded map of a first positioning and a plurality of neighboring positioning). For at least one embodiment the plurality of estimated future LQ at the plurality of neighboring positioning may be used to select a desired neighboring positioning. For at least one embodiment the plurality of estimated future LQ at the plurality of neighboring positioning may be used to select a desired neighboring positioning with improved wireless communication parameters (lower PER, higher data rates, higher spectral efficiency, lower transmit power, lower received or generated interference, better coverage, etc.). For at least one embodiment the selected neighboring positioning may be presented to a user of the UE device (for example by voice command or in a color coded map or diagram of a first positioning and one or more selected positioning). For example a UE device may determine that moving the UE device by a given amount in a given direction improves LQ (for example due to wall shadowing loss). For example the UE device may determine that rotating the UE device around a horizontal axis improves LQ (for example due to antenna polarization gain). For at least one embodiment the plurality of estimated future LQ at the plurality of neighboring positioning may be used to select a desired neighboring positioning for a user. For example moving the UE device user's hand relative to a phone or tablet or a user rotating relative to a vertical axis to reduce head or body attenuation (combined effects of hands and head are known to reduce path loss by 5-10 dB). For at least one embodiment the selection of neighboring positioning for estimating LQ is based on a user selection (for example only evaluate neighboring positioning within 5 ft). For at least one embodiment a neighboring positioning is selected if the future LQ improves by a given threshold (for example a neighboring candidate position is only presented if the path loss improved by 3 dB). For at least one embodiment the threshold is provided by a user of the UE device.

Figure 10:
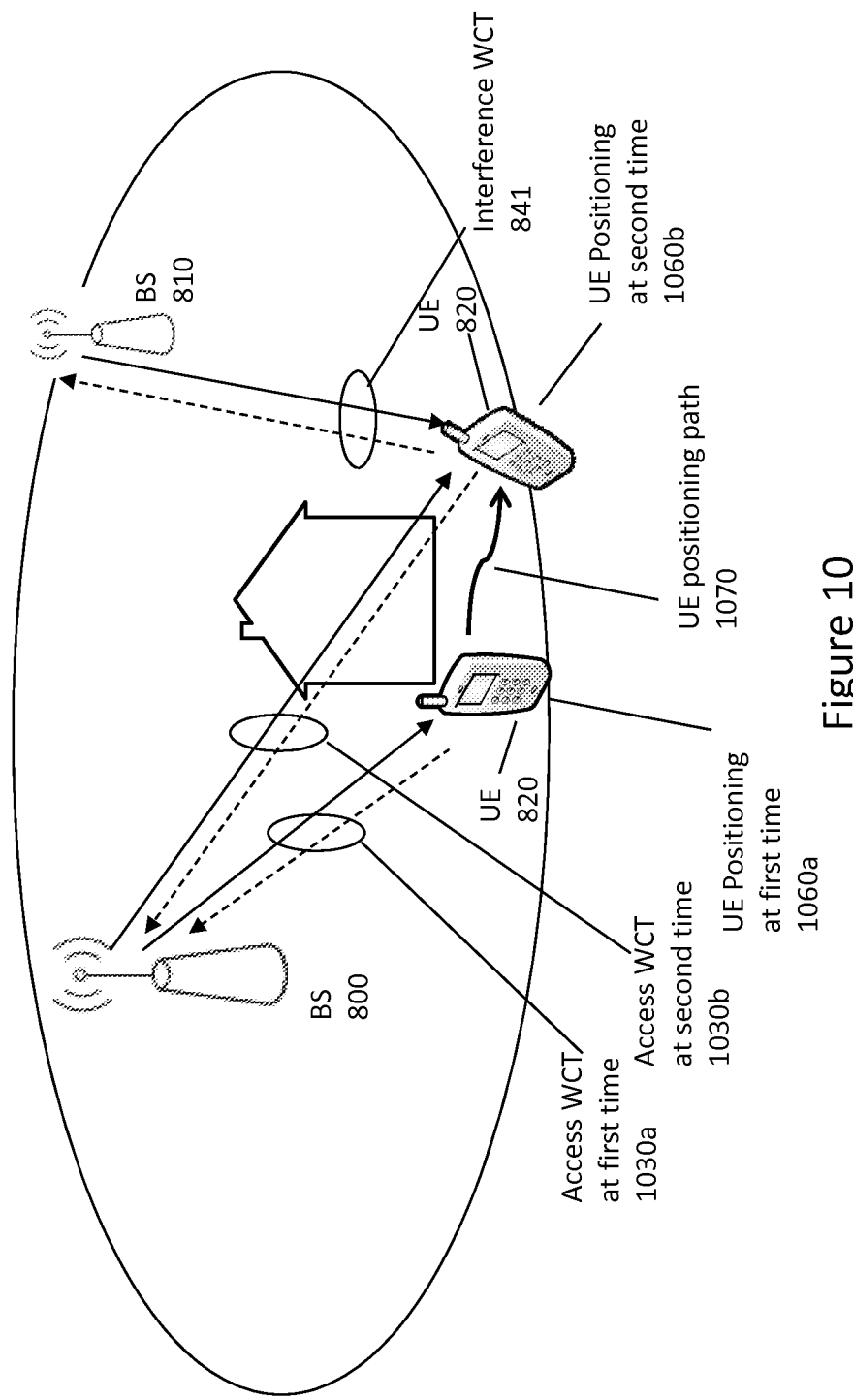
FIG. 10 shows another system for estimating a future link quality of a UE device at a future time based on a future positioning, according to an embodiment.

FIG. 10 shows another system for estimating a future link quality of a UE device at a future time based on a future positioning (for example UE positioning at second time 1060*b*), according to an embodiment. It is to be understood that the embodiments of FIG. 8 can be applied to the embodiments of FIG. 10.

For at least one embodiment the estimated future LQ at a future time is based on a UE positioning history (for example the UE positioning at first time 1060*a* over access WCT at a first time 1030*a*), wherein the UE positioning history includes at least one UE positioning prior to the future positioning (for example at the future time). For at least one embodiment the estimated future LQ at a future time is based on a UE positioning path (for example UE positioning path 1070), wherein a positioning path may include a plurality of UE positioning (for example UE positioning at two or more times or time instances) or a UE positioning trajectory or UE positioning function of time (for example derived from equations of motion based on a first positioning and/or first velocity and/or first acceleration). For at least one embodiment FIG. 10 shows a system for estimating a plurality of LQ based on one or more of a UE positioning at first time 1060a, UE positioning path 1070 or UE positioning at a second time 1060b (over access WCT at a second time 1030b), for example based on one or more of positioning and positioning motion (for example velocity, acceleration, etc.).

Figure 11:
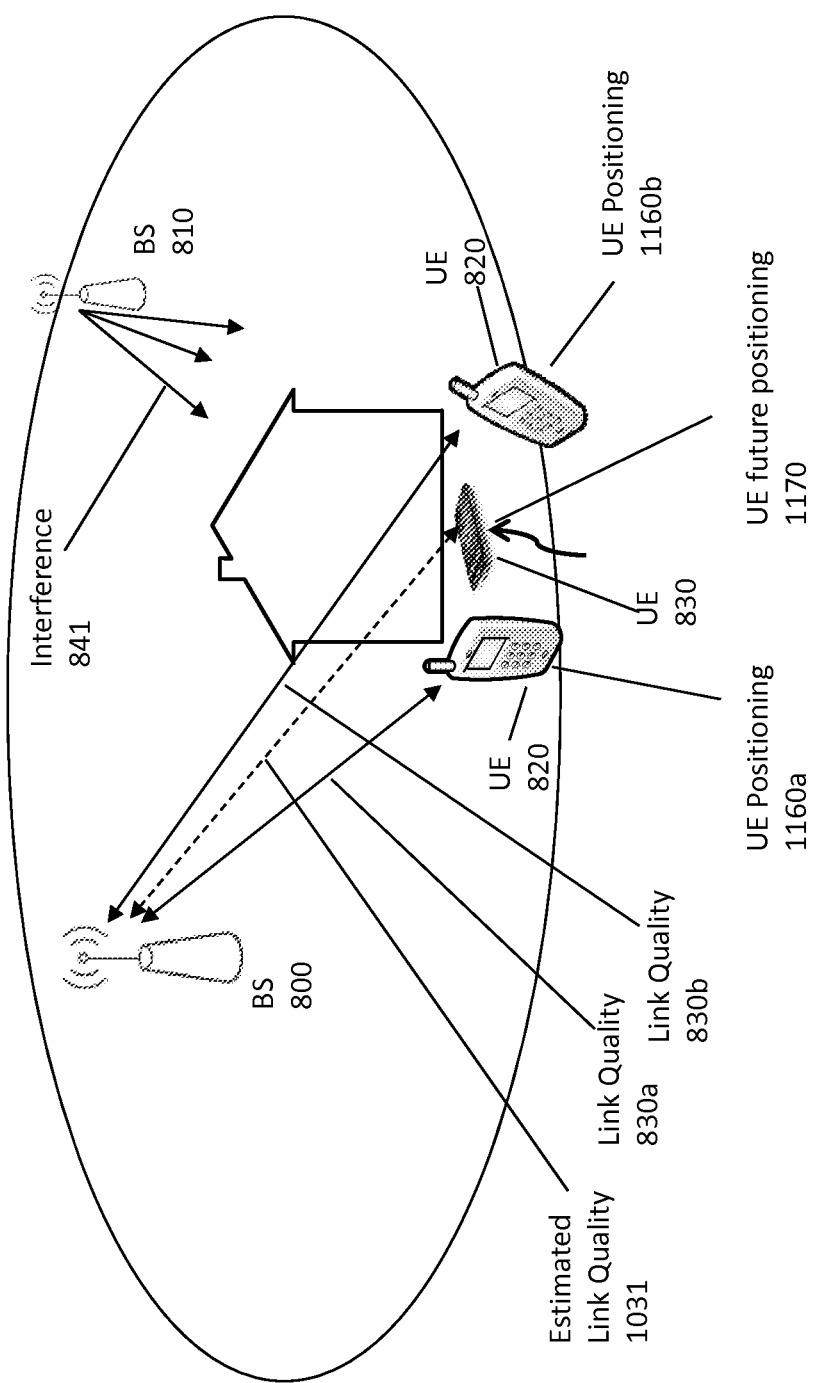
FIG. 11 shows another system for estimating a future link quality of a second UE device at a future positioning based on link qualities, based on a plurality of positionings of a first UE device, according to an embodiment.

FIG. 11 shows another system for estimating a future link quality 1031 of a second UE device 830 at a future positioning 1170 based on link qualities 830a, 830b based on a plurality of positionings 1160a, 1160b of a first UE device 820, at according to an embodiment. It is to be understood that the embodiments of FIG. 8 can be applied to the embodiments of FIG. 11.

For at least one embodiment one or more parameters associated with UE device 820 or UE device 830 (for example device type—smartphone, tablet—transmit power, number of antennas, receiver processing, receiver noise figure, etc.) are included in the estimation of the LQ of UE device 830 based on the LQ 830a, 830b associated with UE device 820. For at least one embodiment information associated with the plurality of LQs for a plurality of positioning of UE device 820 are combined with information associated with the plurality of LQs for a plurality of positioning of UE device 830 for improving the stored information for estimating a future link quality. For example an office building with multiple UE devices and users may combine the plurality of LQs (for example by device type) for improving the estimated future LQ. In contrast with the embodiment of FIG. 8, the UE device 820 does not need to estimate its own future link quality. However, the link quality of the UE device 830 is estimated.

Figure 12:
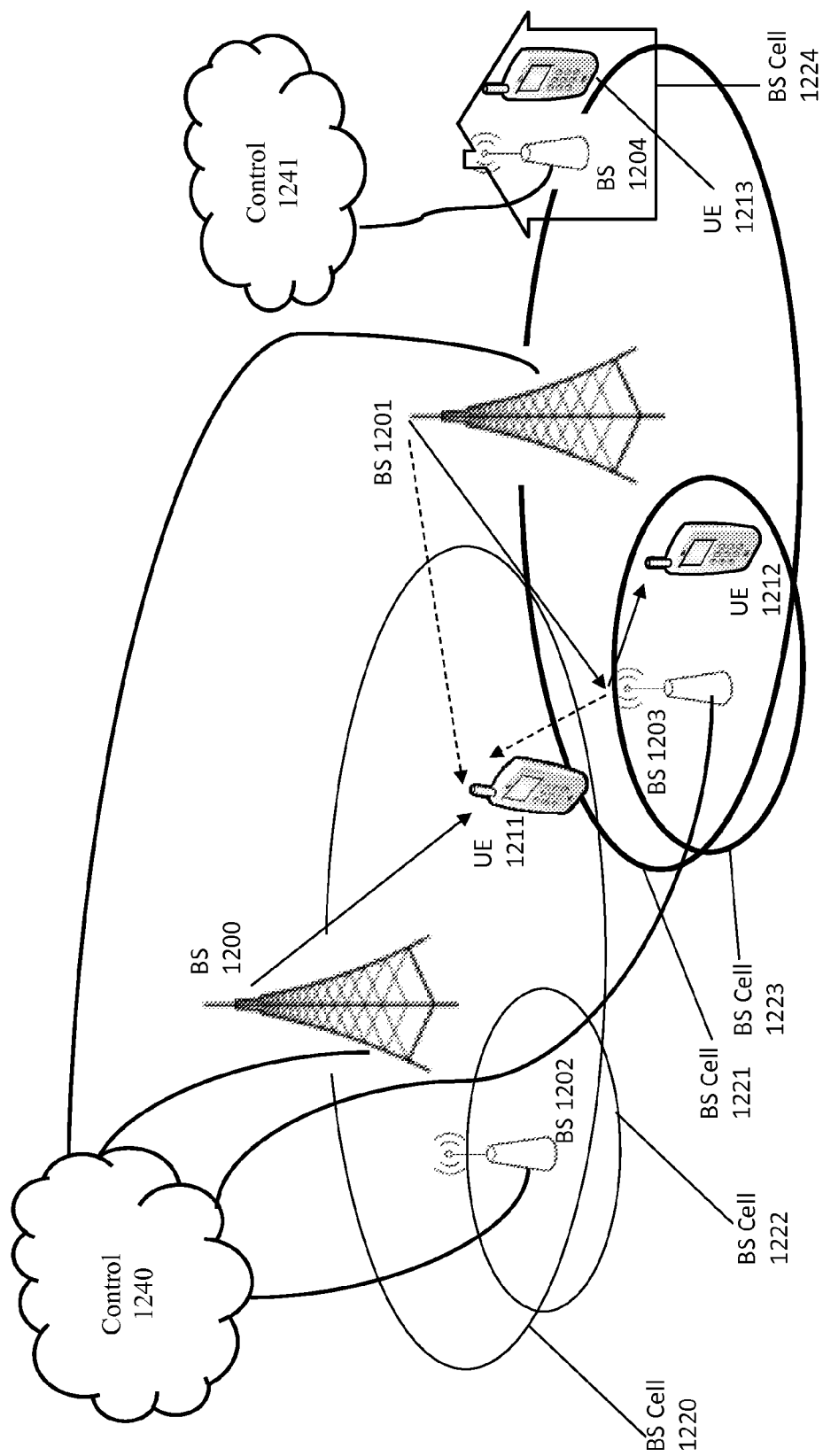
FIG. 12 shows a wireless system that includes characterizing of interference at a user equipment, according to an embodiment.

FIG. 12 shows a wireless system that includes characterizing of interference at a user equipment, according to an embodiment. The system includes a base station (BS) 1200 (for example with coverage shown as BS cell 1220), wherein the BS 1200 is operative to wirelessly communicate with a plurality of user equipment (UE) (such as, UE device 1211 as shown by the solid arrow between BS 1200 and UE device 1211). The system includes one or more controllers operative to select one or more base stations (BSs) 1201, 1203 (as shown by a thicker cell boundaries for BS cell 1221 and BS cell 1223) associated with base station 1200. For example BS 1203 may communicate with UE device 1212. It is to be noted, for example, that BS 1202 is associated with BS 1200 based on control 1240, but has not been selected as shown by standard thickness for BS cell 1222. Further, the same or different or a combination of same a different controllers are operative to schedule the selected one or more BSs 1201, 1203 associated with the BS 1200 to transmit according to at least one transmission mode during a scheduled transmission (in some embodiments the transmission generates interference at UE device 1211 as represented by the dashed-arrows between BS 1201 and UE device 1211 and BS 1203 and UE device 1211). Further, at least one of the plurality of UE devices (such as UE device 1211) are operative to characterize interference at the at least one of the plurality of UE devices (such as UE device 1211) during the scheduled transmission.

The characterized interference includes, for example, one or more of co-channel interference, adjacent channel interference, intersector interference, intercell interference, intrasystem interference, intersystem interference.

For at least some embodiments, the wireless system includes at least one of a WiFi system, a WiMAX system, a cellular system, a 3G system, a 4G system, a HSPA system, an LTE system. Further, for at least some embodiments, the BS 1200 includes at least one of an AP, a NodeB, a eNodeB, a macrocell BS, a microcell BS, a relay node, a femtocell, a Distributed Antenna System (DAS) BS, a Remote Radio Head (RRH) BS, a small cell BS.

For at least some embodiments, the BS 1200 and one or more BSs (for example a subset of 1201, 1202, 1203, 1204) are part of a heterogeneous network. For an embodiment, the BS 1200 includes one or more sectors or cells. For an embodiment, the BS 1200 includes a coverage area or a cell. As shown, BS 1204 is connected to a separate control 1241, and communicating with UE device 1213 within BS cell 1224 (shown as a house). For example this is a femtocell which is part of the heterogeneous network.

For at least some embodiments, the at least one UE device includes one or more of an mobile terminal (MT), an access terminal (AT), a customer premises equipment (CPE).

For at least some embodiments, selecting the one or more BSs (for example a subset of BS 1201, 1202, 1203, 1204) associated with the BS 1200 is based on physical proximity. More specifically, for an embodiment the selecting of the one or more BSs (for example a subset of BSs 1201, 1202, 1203, 1204) associated with the BS 1200 is based on the one or more BSs (for example a subset of BSs 1201, 1202, 1203, 1204) being located within a threshold distance from the BS. For an embodiment, at least one of the selected one or more BSs (for example a subset of BSs 1201, 1202, 1203, 1204) associated with the BS 1200 is a neighboring BS. For an embodiment, the BS 1200 includes a coverage area or a cell, and wherein at least one of the selected one or more BSs (for example a subset of BSs 1201, 1202, 1203, 1204) associated with the BS 1200 is within the coverage area of the BS.

For an embodiment, the BS 1200 and at least one of the one or more BSs (for example a subset of BSs 1201, 1202, 1203, 1204) are classified, and wherein the selecting of the one or more BSs (for example a subset of BSs 1201, 1202, 1203, 1204) is based on the classification. For an embodiment, the classification is based on one or more BSs (for example a subset of BSs 1201, 1202, 1203, 1204) parameters. A non-exhaustive list of exemplary parameters include at least one of BS 1200 height, BS 1200 coverage area, BS 1200 transmit power, BS 1200 antenna configuration, and/or BS 1200 type (macro, micro, relay node, femto).

For an embodiment, the BS 1200 and the one or more BSs (for example a subset of BSs 1201, 1202, 1203, 1204) are a subset of a plurality of BSs from a cellular wireless system, and wherein the plurality of BS from the cellular system are grouped into one or more clusters, and wherein the BS 1200 and the one or more BSs (for example a subset of BSs 1201, 1202, 1203, 1204) are part of a same cluster.

For at least some embodiments, selecting at least one of the one or more BSs (for example a subset of BSs 1201, 1202, 1203, 1204) associated with the BS 1200 is based on an interference estimate. For an embodiment, the interference estimate is based on at least one of a distance between at least one of the selected one or more BSs (for example a subset of BSs 1201, 1202, 1203, 1204) and the at least one of the plurality of UE devices, a path loss model applied to at least one of the selected one or more BSs (for example a subset of BSs 1201, 1202, 1203, 1204) and the plurality of UE devices, a propagation loss application, an interference measurement data, or an interference estimate by the at least one of the plurality of UE devices.

For at least some embodiments, the BS 1200 and the one or more BSs (for example a subset of BSs 1201, 1202, 1203, 1204) are synchronized. For an embodiment, the synchronization includes one or more of time, timing phase, timing frequency, carrier phase or carrier frequency synchronization. For an embodiment, the synchronization further includes transmitting the at least one transmission mode with a time offset associated with a wireless communication propagation time. For at least one embodiment synchronizing the BS 1200 with one or more BSs simplifies the interference characterization and/or improves the time and/or frequency alignment of the desired and interfering transmission modes. For at least one embodiment transmitting the at least one transmission mode with a time offset associated with a wireless communication propagation time improves the time alignment of a the at least one transmission mode signal and a one or more second transmission mode signal as received by one or more UE devices (for example a desired and interfering signal may be better aligned at a UE device receiver or a interfering signal and a Null transmission signal may be better aligned simplifying an interference measurement).

For at least some embodiments, the at least one transmission mode includes an active transmission mode. For at least one embodiment the active transmission mode includes one or more of a training mode, control mode or data mode. For at least one embodiment the active transmission mode is a non-zero or non-null transmission mode. For an embodiment, the at least one transmission mode includes a data transmission mode. For an embodiment, the data transmission mode includes a data or a data payload. For an embodiment, the data transmission mode includes data intended to be received by at least one UE device wirelessly communicating with the one or more BSs (for example a subset of BSs 1201, 1202, 1203, 1204). For an embodiment, the data transmission mode includes data intended to be transmitted to a virtual UE device wirelessly communicating with the one or more BSs (for example a subset of BSs 1201, 1202, 1203, 1204) or data without a target destination. For at least one embodiment at least one of the one or more BSs is scheduled to send a transmission mode but no (link partner) UE device is expecting a data communication at the scheduled transmission. In such an embodiment the at least one BS may send a data transmission to a virtual UE device (for example a special or ghost or imaginary or out of range UE device). This embodiment allows for transmission of data without requiring a UE device communicating with the BS at the scheduled transmission.

For an embodiment, the data transmission mode includes random data or pseudo-random data or scrambled data. For at least one embodiment, if the BS does not have data to transmit at the scheduled transmission it may transmit filler data, for example random or pseudo-random or stuffed data.

For an embodiment, the at least one transmission mode includes one or more of a transmission power, a MIMO mode, a beamforming parameter, a PMI, a MCS, a selected transmit antenna.

For an embodiment, the at least one transmission mode includes a high interference mode, low interference mode or typical interference mode. For at least one embodiment the at least one transmission mode includes a high interference mode to assist at least one of the plurality of UE device (such as UE device 1211) to characterize high interference levels, for example to improve the estimation accuracy or to characterize an upper range of possible interference levels (for example if an inferring BS has transmit power control, or SFR (soft frequency reuse). For at least one embodiment the at least one transmission mode of a first BS includes a low interference mode to assist at least one of the plurality of UE device (such as UE device 1211) to characterize low interference levels, for example to improve the estimation accuracy of a second BS or to characterize a lower range of possible interference levels (for example if an inferring BS has transmit power control, or SFR).

For an embodiment, the scheduled at least one transmission mode includes a periodic schedule. For at least one embodiment the transmission mode includes the periodic schedule to reduce a control of the scheduled transmissions or to reduce the complexity of at least one of the plurality of UE devices to characterize the interference (for example reducing a search time or control message decoding).

For an embodiment, the scheduled at least one transmission mode includes a wireless communication resource. For an embodiment, the wireless communication resource includes one or more of a resource block, a code, a time slot, a frequency band.

For an embodiment, the wirelessly communicating includes a frame structure, the frame structure including a control signal having a placement relative to the frame structure, wherein the scheduled transmission is scheduled relative (for example a time or frequency offset) to the control signal. For an embodiment, the placement is fixed and/or known. For an embodiment, the frame structure is for transmission. For an embodiment, the wirelessly communicating includes a frame structure, the frame structure including a control signal having a placement relative to the frame structure, wherein the scheduled transmission is directed or enabled by the control signal. For an embodiment, the placement includes a timing and/or frequency offset. For an embodiment, the wirelessly communicating includes a periodic frame structure, including a periodic control signal having a placement relative to the periodic frame structure, wherein the scheduled transmission is scheduled relative to the periodic control signal. For an embodiment, the placement is fixed and/or known. For an embodiment, the frame structure is for transmission. For an embodiment, the scheduled transmission is scheduled at a fixed time or frequency offset relative to a known placement of the periodic control signal. For an embodiment, the scheduled transmission is scheduled at a structured known time or frequency offset relative a known placement of the periodic control signal.

For at least some embodiments, scheduling the selected one or more BSs (for example a subset of BSs 1201, 1202, 1203, 1204) associated with the BS 1200 includes transmitting according to the at least one transmission mode during a plurality of scheduled transmissions. For an embodiment, the plurality of scheduled transmissions have a duty cycle relative to the wireless communication below a threshold. For an embodiment, the plurality of scheduled transmissions occupy a fraction (for example below a threshold, typically <10%) of wireless communication resources. For an embodiment, the plurality of scheduled transmissions are periodically or quasi-periodically scheduled relative to a wireless communication frame control signal. For an embodiment, the plurality of scheduled transmissions are dynamically allocated by a wireless communication frame control signal. For an embodiment, each of the plurality of scheduled transmissions includes at least one of a plurality of transmission modes. For an embodiment, selecting at least one of the plurality of transmission modes for each of the plurality of scheduled transmissions is based on a regular pattern. For an embodiment, the regular pattern is dynamically modified by a frame control signal. For at least one embodiment a regular pattern simplifies the control for transmission of the plurality of transmission modes. For at least one embodiment a regular pattern simplifies at least one of the plurality of UE devices (such as UE device 1211) are operative to characterize interference at the at least one of the plurality of UE devices (such as UE device 1211) during the scheduled transmission by reducing complexity for decoding of control signals or complexity to remove desired signals or other interfering signals from the received signals. For at least one embodiment the regular pattern is dynamically modified based on data traffic transmission parameters associated with the BS (for example based on BS data traffic load—highly loaded vs lightly loaded, or based on distribution of data traffic transmission modes—for example SISO vs. MIMO vs. BF or SFR). For at least one embodiment a regular pattern is dynamically modified based on a BS becoming active or inactive (for example a femto cell).

For at least some embodiments, the one or more BSs (for example a subset of BSs 1201, 1202, 1203, 1204) associated with the BS 1200 dynamically changes.

At least some embodiments further include a plurality of scheduled transmissions, and further including dynamically selecting the one or more BSs (for example a subset of BSs 1201, 1202, 1203, 1204) associated with the BS. For an embodiment, a fifth UE device of the plurality of UE devices is configured to characterize interference during the plurality of scheduled transmission and dynamic selection of the one or more BSs (for example a subset of BSs 1201, 1202, 1203, 1204). For an embodiment, the fifth UE device is configured to characterize interference of the dynamic selection of one or more BSs (for example a subset of BSs 1201, 1202, 1203, 1204), enables estimation of an interference contribution from at least one of the one or more BSs (for example a subset of BSs 1201, 1202, 1203, 1204).

For at least some embodiment, the wirelessly communicating includes a frame structure, the frame structure including at least a control subframe and a data subframe, wherein the data subframe includes the scheduled transmission.

Figure 13:
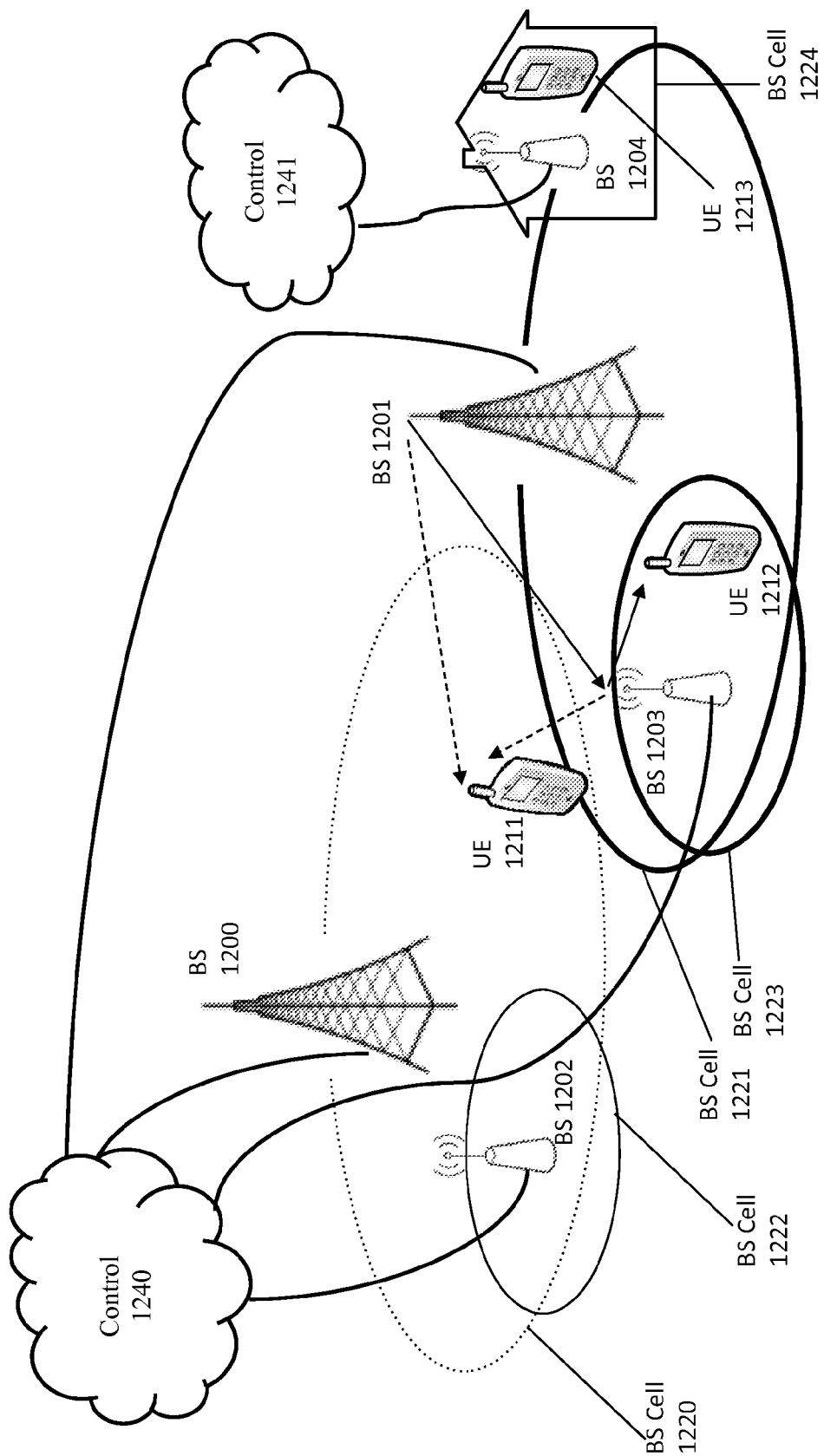
FIG. 13 shows another wireless system that includes characterizing of interference at a UE device, according to an embodiment.

FIG. 13 shows another wireless system that includes characterizing of interference at a user equipment, according to an embodiment. The system includes a base station (BS) 1200, wherein the BS 1200 is operative to wirelessly communicate with a plurality of user equipment (UE) (such as, UE device 1211). The system includes one or more controllers operative to control BS 1200 to transmit a null transmission mode (shown as the dotted BS cell 1220) during at least a portion of the scheduled transmission of BS 1201 or BS 1203 (shown as thicker cell boundaries of BS cell 1221 and BS cell 1223).

More specifically, for at least some embodiments further include scheduling the BS 1200 to transmit a null transmission mode during at least a portion of the scheduled transmission. For an embodiment, the null transmission includes a non-active transmission, wherein an active transmission is one or more of a training transmission mode, a control transmission mode and a data mode. For at least one embodiment the null transmission includes a BS transmission signal (or power) level below a threshold. For at least one embodiment the null transmission is a constant transmission or contains mostly noise or other non-desired transmission due to imperfections of a transmitter. For at least one embodiment the null transmission is intended to be a zero transmission but may include some spurious or undesired signals or noise.

At least some embodiment further include characterizing, by at least a second UE device of the plurality of UE devices, interference during the null transmission mode at the at least a portion of the scheduled transmission.

Figure 14:
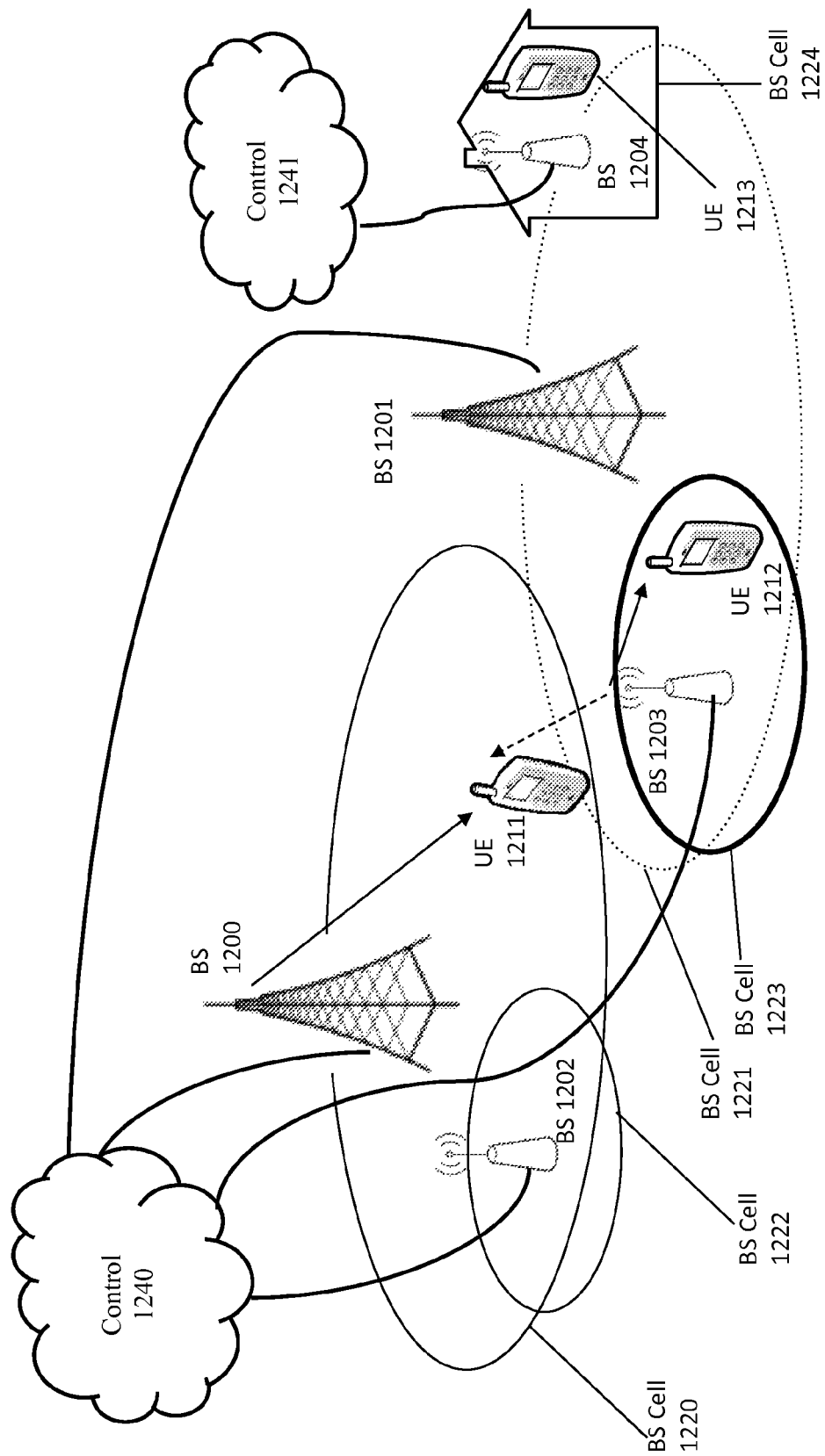
FIG. 14 shows another wireless system that includes characterizing of interference at a UE device, according to an embodiment.

FIG. 14 shows another wireless system that includes characterizing of interference at a user equipment, according to an embodiment. The system includes a base station (BS) 1200, wherein the BS 1200 is operative to wirelessly communicate with a plurality of user equipment (UE) (such as, UE device 1211). The system includes one or more controllers operative to selecting a BS 1201 to schedule the selected BS 1201 to transmit a null transmission mode (shown as the dotted BS cell 1221) during at least a portion of the scheduled transmission of BS 1203 (shown as thicker cell boundary of BS cell 1223).

Figure 16:
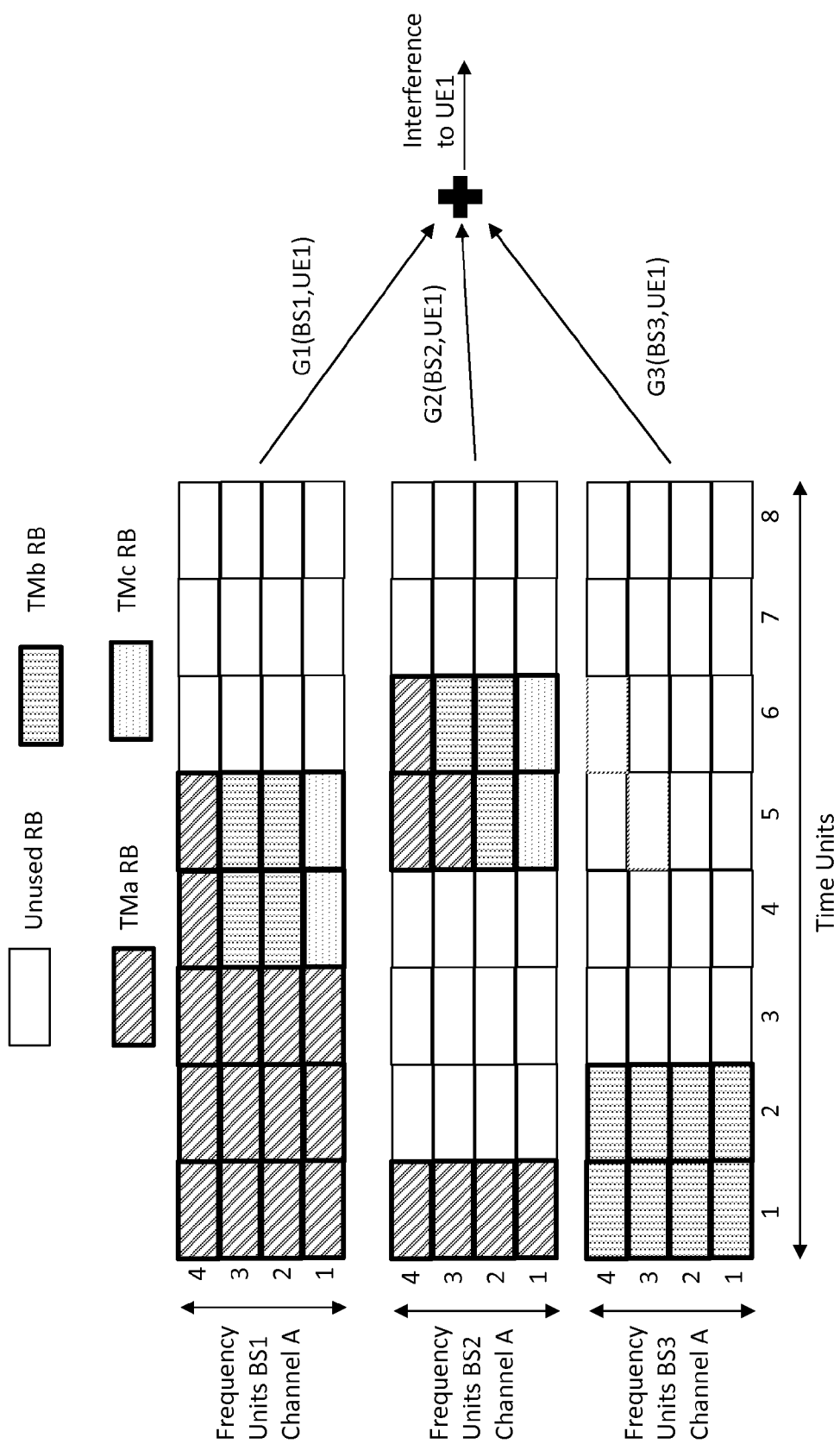
FIG. 16 shows an example of three base stations scheduling resource blocks on the same frequency channel (or carrier) A (represented by rectangular blocks with x-axis in time units and y-axis in frequency units), according to an embodiment.

At least embodiments, further include selecting a second BS, and scheduling the selected second BS 1201 (selected BS) to transmit a null transmission mode during at least a second portion of the scheduled transmission. For an embodiment, the selection of the second BS 1201 is based on one or more of a physical proximity of the second BS 1201 relative to the BS 1200, being a designated as a neighbor of the BS 1200, being within a coverage area of the BS 1200, a classification of the second BS 1201 and the BS 1200. For an embodiment, the second BS 1201 is selected based on an estimate of its generated interference to one or more of the plurality of UE devices being above a threshold. For an embodiment, selecting the second BS 1201 is based on an interference estimate. For an embodiment, the interference estimate is based on at least one of a distance between the second BS 1201 and at least one of the plurality of UE device, a path loss model applied to the second BS 1201 and the plurality of UE devices, a propagation loss application, an interference measurement data, an interference estimate by at least one of the plurality of UE devices. An embodiment further includes characterizing, by at least a third UE device of the plurality of UE devices, interference during the null transmission mode of the at least the second portion of the scheduled transmission. For an embodiment, the characterizing of the interference occurs during null transmission of second BS 1201. At least some embodiments further include characterizing, by at least a fourth UE device of the plurality of UE devices, an interference contribution of the second BS and the one or more BSs during the null transmission mode of the at least the second portion of the scheduled transmission. For an embodiment, the characterizing of the interference occurs during null transmission of second BS 1201. FIG. 16 shows an example of three BS, BS1, BS2, BS3 scheduling resource blocks on the same frequency channel (or carrier) A (represented by rectangular blocks with x-axis in time units and y-axis in frequency units), according to an embodiment. In the example of FIG. 16, the unused RB are represented as blank rectangles, and the active scheduled RB are represented as three different angles of hatching: horizontal hatching for transmit mode (TM) c, vertical hatching for TMb and diagonal hatching for TMa (for example the angles of hatching may represent a transmit power level). In the example of FIG. 16 all BS are active during time slot 1 (including all frequency bands), which may represent control or reference signals simultaneously transmitted from all three BS. For example BS1 allocates contiguous RB between time units 1 to 5. For example BS2 allocates time unit 1 and has a gap until units 5-6. BS3 allocated time units 1-2. A receiver (for example UE1) may receive a linear combination of all three BS transmissions, attenuated by respective gains G1, G2 and G3. From this example the interference will be worst at time unit (or slot) 1, since all three BS are active and interference would be minimum at time units 7 and 8. Other time units 2 through 6 would have intermediate interference levels. From this example the measured interference is a function of the resource block that is selected for measuring interference and is dependent on scheduling decisions (and traffic load) of the interfering BS. For at least one embodiment it may be advantageous to schedule a resource block and a transmit mode so that the interference measurement at UE1 has less variability. For at least one embodiment improved interference measurements results in one or more of improved resource allocation and improved MCS selection, lower PER, reduced retransmissions for UE1.

Figure 17:
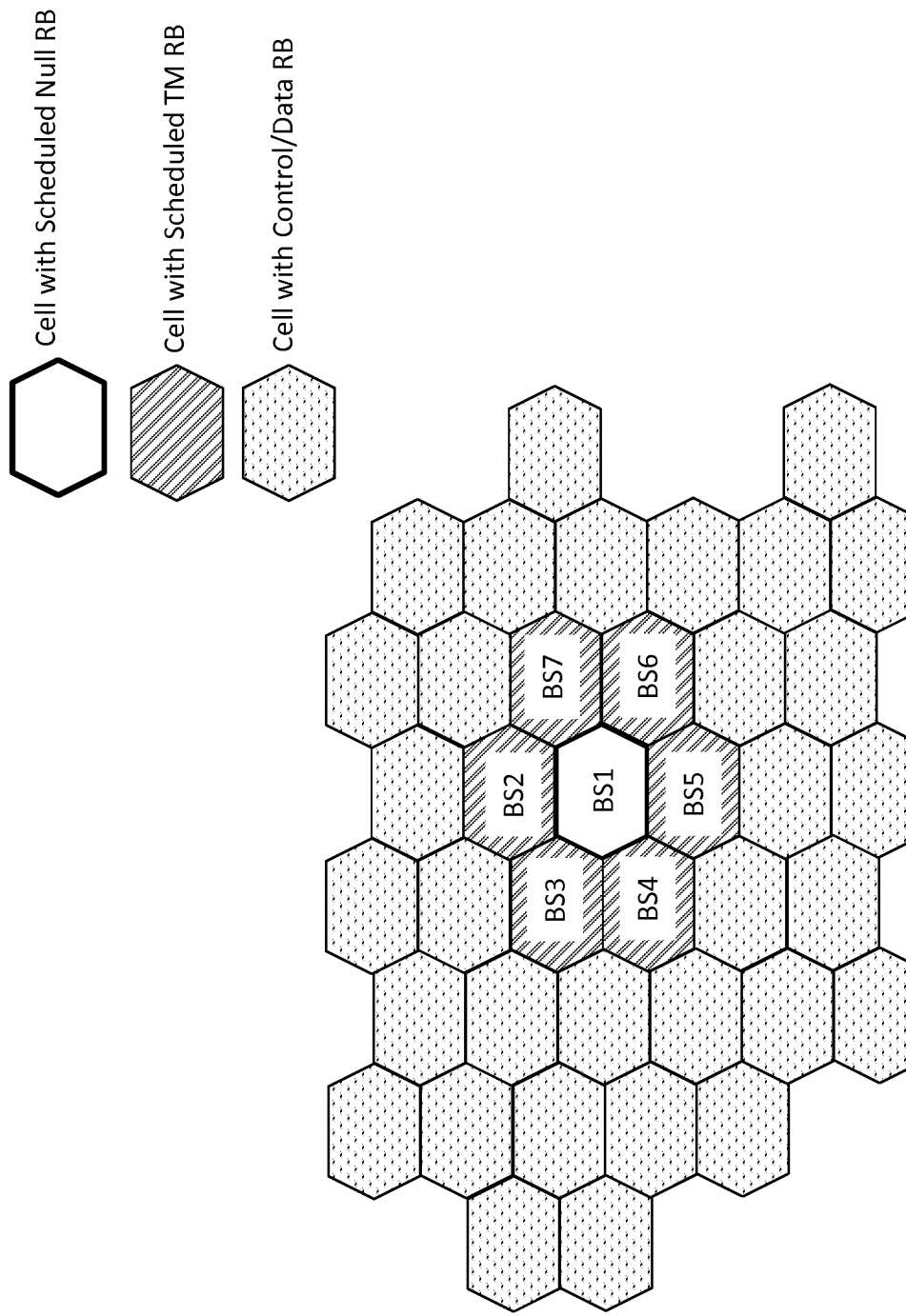
FIG. 17 shows a plurality of base station cells, according to an embodiment.

FIG. 17 shows a plurality of BS cells, according to an embodiment. In this example (and following figures) all cells are homogenous hexagons for simplicity of representation. In practice BS cells may be heterogeneous (for example different sizes and shapes) and a smaller BS cell (for example micro, pico, femto, or relay node) may be within the coverage area of a larger cell (for example macro or micro). In this example (and several following figures) a cell with a scheduled null transmission is represented as a blank (or white) hexagon. In this example (and several following figures) a cell with a scheduled transmission mode is represented as a diagonally hatched hexagon. In this example (and several following figures) a cell that is not constrained to a transmission mode or a null transmission is represented as a horizontally hatched hexagon. In the example of FIG. 17, a receiver in BS1 (UL) or a receiver of a plurality of UE devices (DL) wirelessly communicating with BS1 may measure joint interference from all six nearest neighboring BS: BS2-BS7 which have all been scheduled to follow a transmission mode. For at least one embodiment all remaining farther neighbors are unrestricted and may transmit (or not) based on local traffic requirements. In the example of FIG. 17 BS1 (or all the UE devices associated with BS1 for UL measurements at BS1) is scheduled to transmit a null transmission. For at least one embodiment a null transmission reduced the complexity of estimating interference. For at least one embodiment BS1 (or a selected UE device) may transmit and the interference may be estimated after subtracting the contribution of the desired signal.

Figure 18:
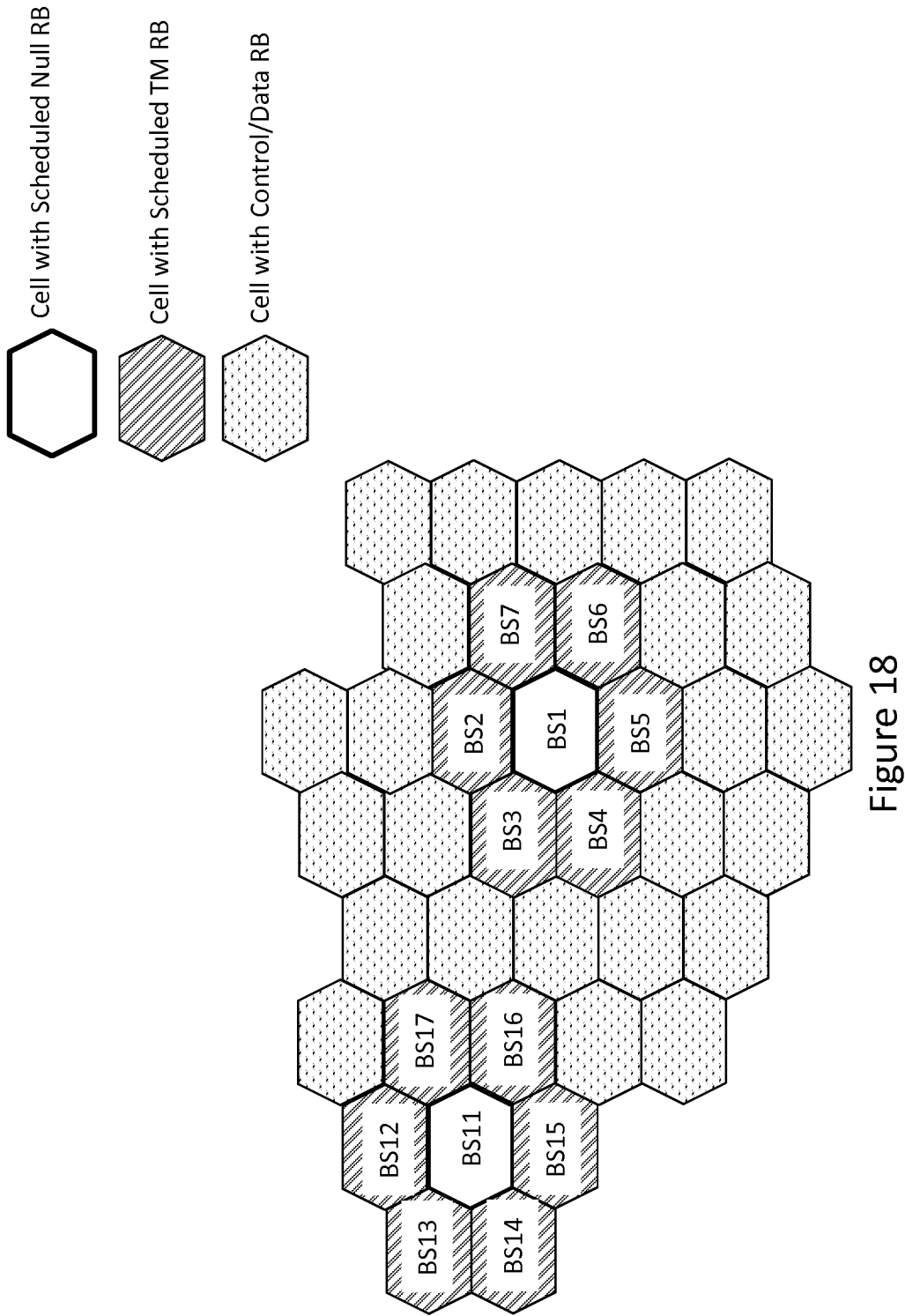
FIG. 18 shows two BS clusters (BS1-BS7 and BS11-BS17) simultaneously scheduling transmission modes or null transmissions or characterizing interference in parallel, according to an embodiment.

FIG. 18 shows an example where two BS clusters (BS1-BS7 and BS11-BS17) may be simultaneously scheduling transmission modes or null transmissions or characterizing interference in parallel, according to an embodiment. For at least one embodiment if the two BS clusters are sufficiently separated the interference coupling between the two clusters may be negligible. For at least one embodiment simultaneous scheduling of transmission active and null modes with a reuse factor (or minimum separation or cluster size) increases interference measurement rate or transmission efficiencies.

Figure 19B:
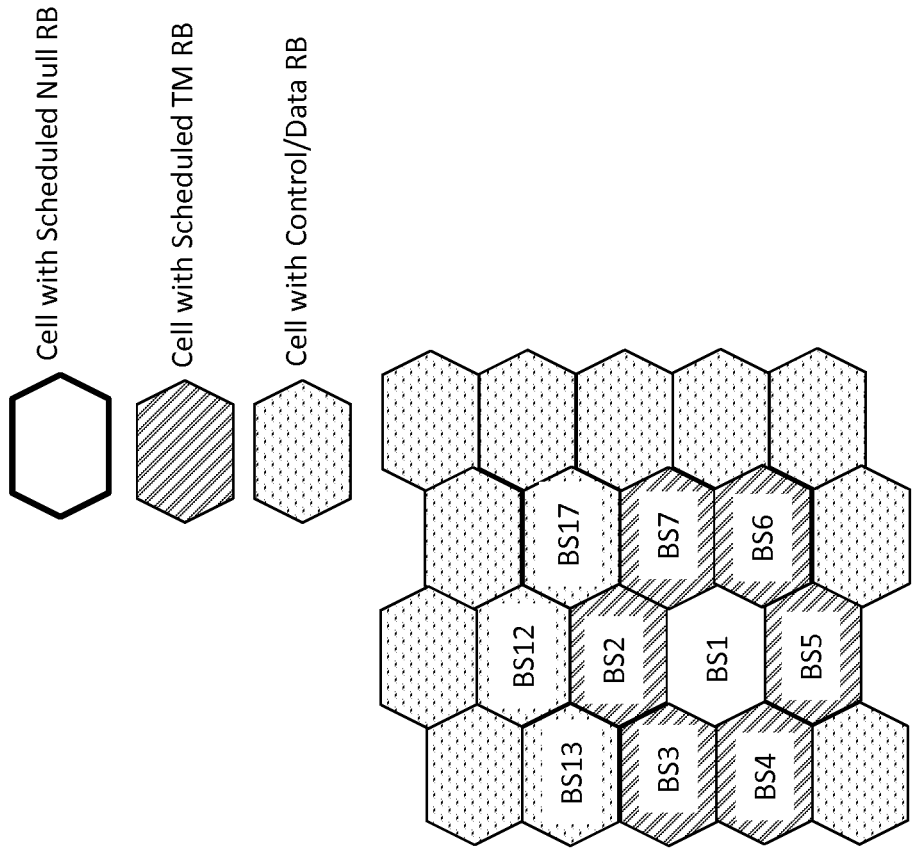
FIGS. 19a and 19b show examples of a pattern of a BS simultaneously scheduling transmission modes or null transmissions or characterizing interference in parallel, dynamically moving from a first cluster of BS to a second cluster of BS, according to one or more embodiments.
Figure 19A:
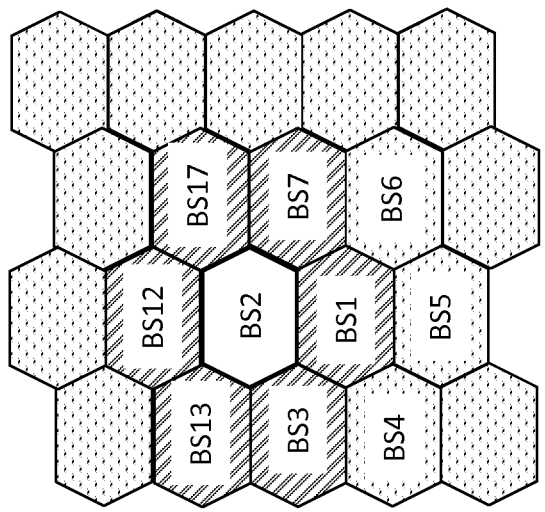

FIGS. 19a and 19b show an example of a pattern (for example regular) of BS simultaneously scheduling transmission modes or null transmissions or characterizing interference in parallel, dynamically moving from a first cluster of BS (BS2, BS1, BS7, BS17, BS12, BS13, BS3) to a second (for example partially overlapping) cluster: BS1, BS5, BS6, BS7, BS2, BS3, BS4) cluster of BS, according to an embodiment.

Figure 20:
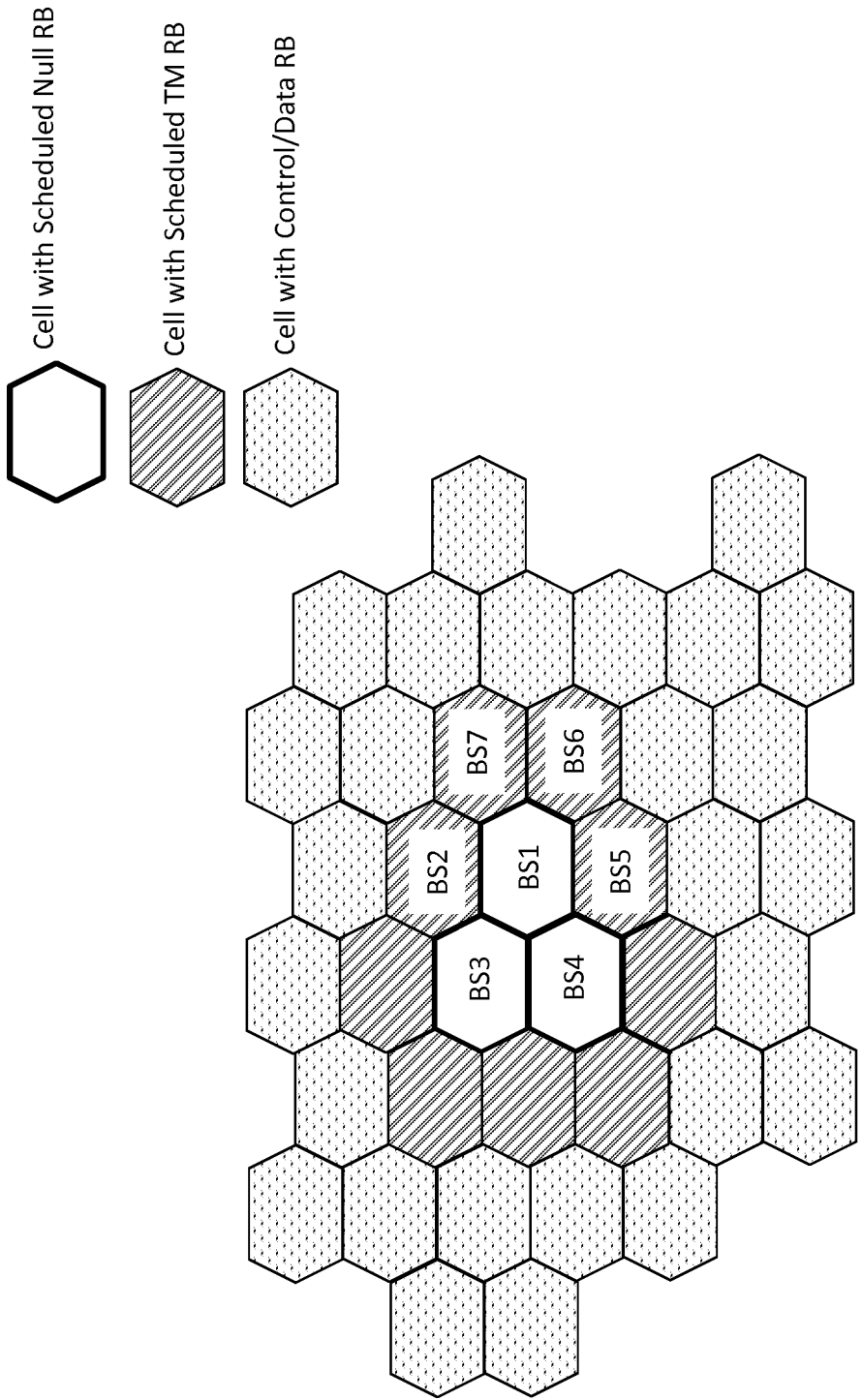
FIG. 20 shows an example of a cluster of a BS simultaneously scheduling transmission modes or null transmissions or characterizing interference in parallel, with a plurality of null transmission BS, according to an embodiment.

FIG. 20 shows an example of a cluster of BS simultaneously scheduling transmission modes or null transmissions or characterizing interference in parallel, with a plurality of null transmission BS (for example neighboring cluster BS1, BS3, BS4), such as a hand-off associated list of BS, according to an embodiment.

Figure 21:
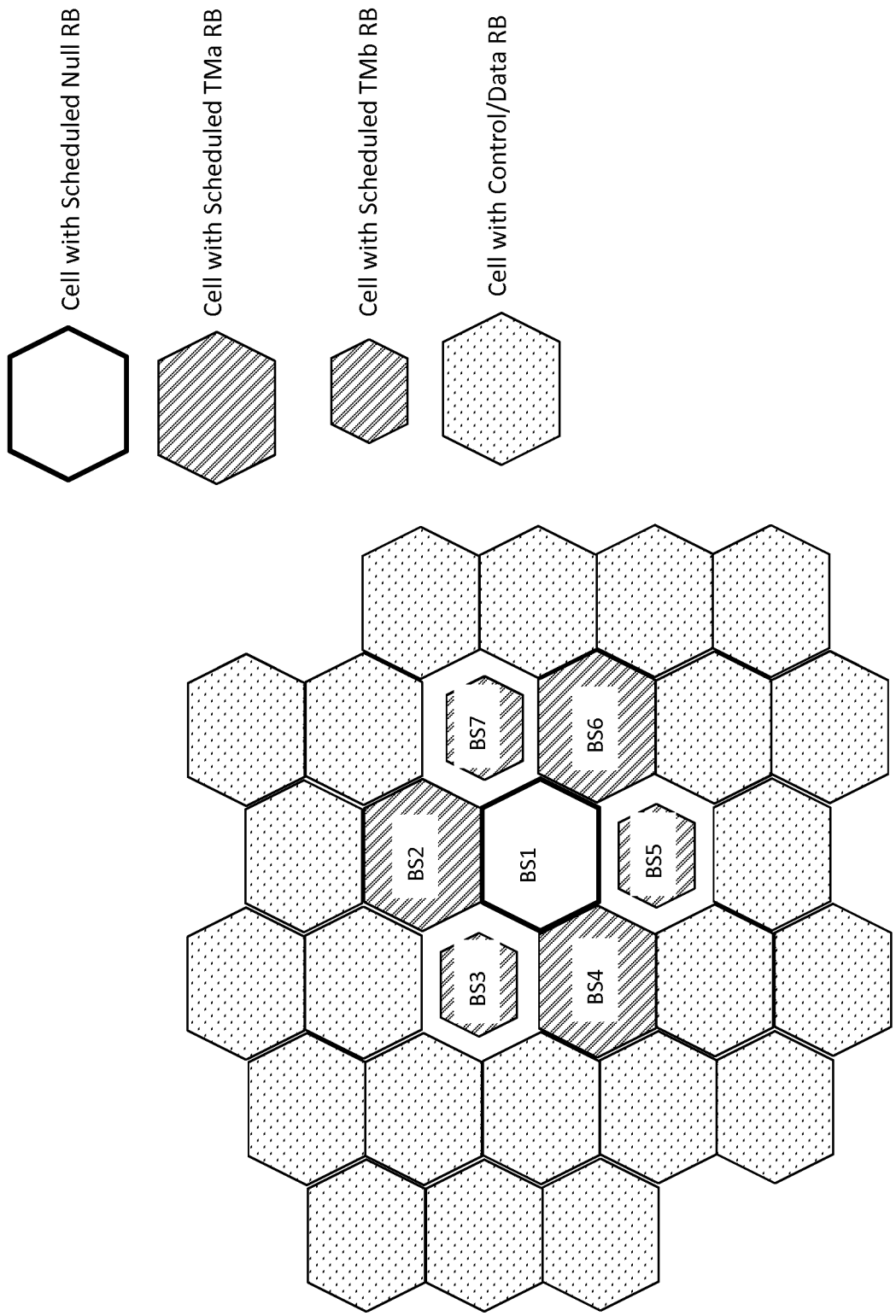
FIG. 21 shows an example of a cluster of a BS simultaneously scheduling transmission modes or null transmissions or characterizing interference in parallel to assist FFR or SFR, according to an embodiment.

FIG. 21 shows an example of a cluster of BS simultaneously scheduling transmission modes or null transmissions or characterizing interference in parallel to assist FFR or SFR including at least a high transmit power and/or a low transmit power plurality of BS (for example BS3, BS5, BS7 transmitting at lower transmit power TMb represented by a smaller cell), according to an embodiment.

Figure 15:
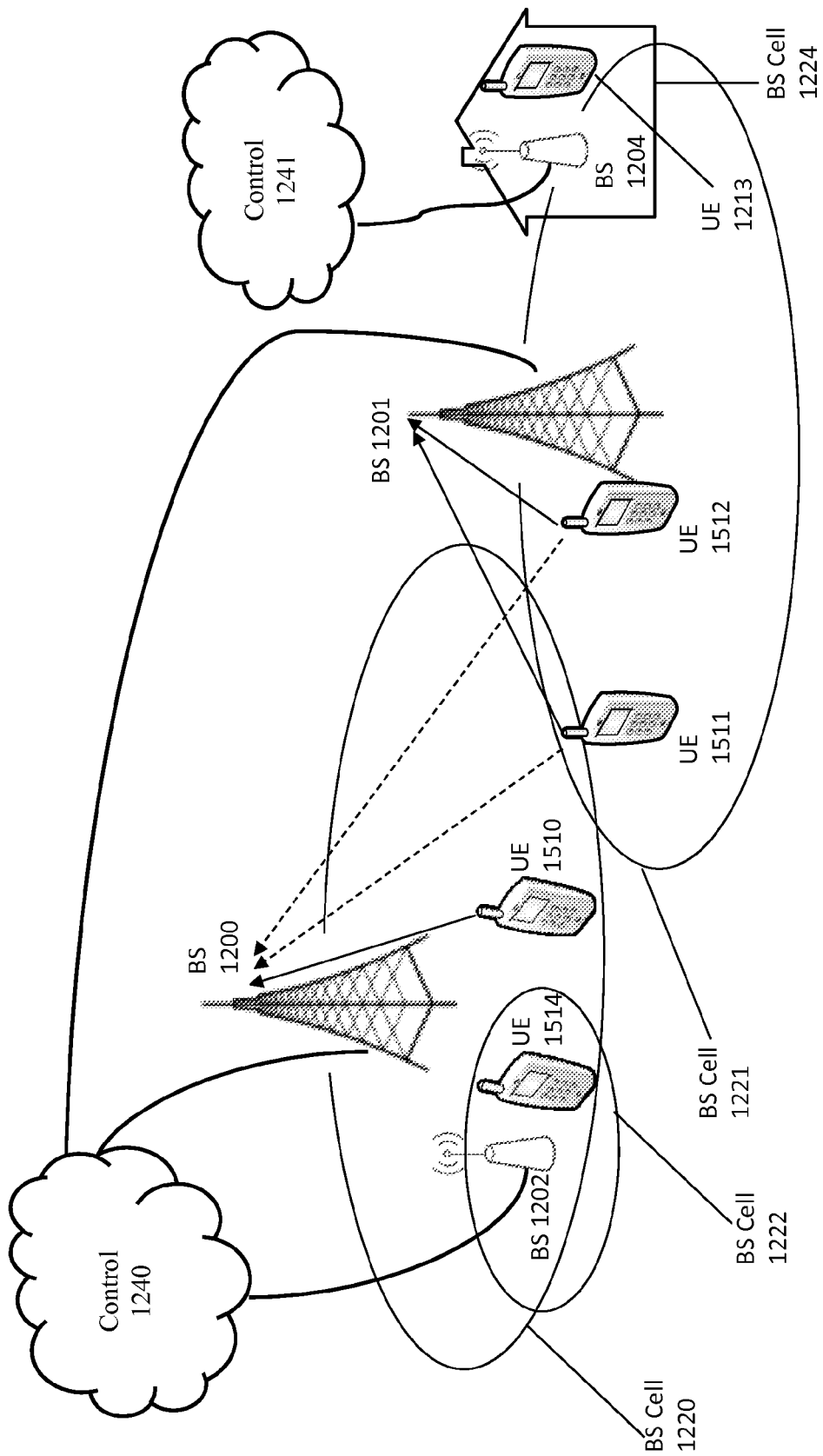
FIG. 15 shows a wireless system that includes characterization of interference at a base station, according to an embodiment.

FIG. 15 shows a wireless system that includes characterizing of interference at a base station, according to an embodiment. The wireless system includes a first base station (BS) 1200, wherein the first BS 1200 is operative to wirelessly communicate with a first plurality of user equipment (UE) (such as UE device 1510). One or more controllers (associated with the control 1240, associated with at least the first or second base stations 1200, 1201, or an combination of) are operative to select a second BS 1201 associated with first BS 1200. The second BS 1201 is operative to wirelessly communicate with a second plurality of UE devices (such as UE devices 1511, 1512). Further, the one or more controllers (which can be a different, same or combination of the prior controller) are operative to select a UE device 1511 from the second plurality of UE devices 1511, 1512. Further, the one or more controllers (which can be a different, same or combination of the prior controller) are operative to schedule the selected UE device 1511 to transmit according to a transmission mode during a scheduled transmission. Further, the first BS 1200 is operative to characterize interference at a least a portion of the scheduled transmission.

It is to be understood that the embodiments of FIG. 12, FIG. 13, FIG. 14 can be modified from DL transmission mode to UL transmission mode and applied to the embodiments of FIG. 15.

The characterized interference includes, for example, one or more of co-channel interference, adjacent channel interference, intersector interference, intercell interference, intrasystem interference, intersystem interference.

For at least some embodiments, the wireless system includes at least one of a WiFi system, a WiMAX system, a cellular system, a 3G system, a 4G system, a HSPA system, an LTE system. Further, for at least some embodiments, the BS 1200 includes at least one of an AP, a NodeB, a eNodeB, a macrocell BS, a microcell BS, a relay node, a femtocell, a Distributed Antenna System (DAS) BS, a Remote Radio Head (RRH) BS, a small cell BS.

For at least some embodiments, the BS 1200 and one or more BSs 1201, 1202 are part of a heterogeneous network. For an embodiment, the BS 1200 includes one or more sectors or cells. For an embodiment, the BS 1200 includes a coverage area or a cell (such as BS cell 1220).

For at least some embodiments, the at least one of the first or second plurality of UE devices (such as, UE devices 1511, 1512) includes one or more of an MT, an AT, a CPE.

For at least some embodiments, the selected second BS 1201 associated with the first BS 1200 is a neighboring BS.

For at least some embodiments, the first BS 1200 includes a coverage area or a cell (such as BS Cell 1220), and wherein the selected second BS 1202 associated with the first BS 1200 or the selected UE device from the second plurality of UE devices (such as, UE device 1514) is within the coverage area of the first BS 1200.

For at least some embodiments, the first BS 1200 and the second BS 1201 are classified, and wherein the selecting of the second BS 1201 is based on the classification. For at least some embodiments, the classification is based on one or more BS parameters. A non-exhaustive list of exemplary BS parameters include at least one of BS height, BS coverage area, BS transmit power, BS antenna configuration, BS type (macro, micro, relay node, femto).

For at least some embodiments, the second plurality of UE devices (such as, UE devices 1511, 1512) are classified, and wherein the selecting the UE device is based on the classification. A non-exhaustive list of exemplary UE device classifications include at least one of UE device height, UE device transmit power, UE device antenna configuration, UE device type (macro, micro, relay node, femto), UE device mobility, UE device data/resource usage.

For at least some embodiments, the first BS 1200 and the second BS 1201 are a subset of a plurality of BSs from a cellular wireless system, and wherein the plurality of BS from the cellular system are grouped into one or more clusters, and wherein the first BS 1200 and the second BS 1201 are part of a same cluster.

For at least some embodiments, selecting the second BS 1201 associated with the first BS 1200 or the UE device from the second plurality of UE devices (such as, UE devices 1511, 1512) is based on an interference estimate. For an embodiment, the interference estimate is based on at least one of a distance between the selected UE device and the first BS 1200, a path loss model applied to the selected UE device and the first BS 1200, a propagation loss application, an interference measurement data, an interference estimate by the first BS 1200.

For at least some embodiments, the first BS 1200 and the second BS 1201 are synchronized. For an embodiment, the synchronization includes one or more of time, timing phase, timing frequency, carrier phase or carrier frequency synchronization. For an embodiment, the synchronization further includes transmitting the transmission mode with a time offset associated with a wireless communication propagation time.

For at least some embodiments, the transmission mode includes an active transmission mode. For an embodiment, the transmission mode includes a data transmission mode. For an embodiment, the data transmission mode includes a data carrying or a data payload. For an embodiment, the data transmission mode includes data intended to be received by the second BS 1201. For an embodiment, the data transmission mode includes virtual data or data without a target destination. For an embodiment, the data transmission mode includes random data or pseudo-random data or scrambled data.

For at least some embodiments, the transmission mode includes one or more of a transmission power, a MIMO mode, a beamforming parameter, a PMI, a MCS, a selected transmit antenna. For an embodiment, the transmission mode includes a high interference mode, low interference mode or typical interference mode.

For at least some embodiments, the scheduled transmission mode includes a periodic schedule. For an embodiment, the scheduled transmission mode includes a wireless communication resource. For an embodiment, the wireless communication resource includes one or more of a resource block, a code, a time slot, a frequency band.

For at least some embodiments, the wirelessly communicating includes a frame structure, the frame structure including a control signal having a placement (for example one or more of a time slot, frequency or time offset) relative to the frame structure, wherein the scheduled transmission is scheduled relative to the control signal. For an embodiment, the scheduled transmission placement is fixed and/or known. For an embodiment, the frame structure is for transmission. For an embodiment, the frame structure includes a DL subframe and an UL subframe and wherein the DL subframe includes the control signal (for example one or more of a frame boundary, synch, RS, etc.) and the UL subframe includes the scheduled transmission.

For at least some embodiments the wirelessly communicating includes a frame structure, the frame structure including a control signal having a placement relative to the frame structure, wherein the scheduled transmission is directed or enabled by the control signal. For an embodiment, the wirelessly communicating includes a periodic frame structure, including a periodic control signal having a placement relative to the periodic frame structure, wherein the scheduled transmission is scheduled relative to the periodic control signal. For an embodiment, the placement is fixed and/or known. For an embodiment, the frame structure is for transmit. For an embodiment, the scheduled transmission is scheduled at a fixed time or frequency offset relative to a known placement of the periodic control signal. For an embodiment, the scheduled transmission is scheduled at a structured known time or frequency offset relative a known placement of the periodic control signal.

For at least one embodiment, scheduling the selected UE device includes transmitting according to at least one transmission mode during a plurality of scheduled transmissions.

At least one embodiment further includes selecting at least two UE devices from the second plurality of UE devices (such as, UE devices 1511, 1512) including the selected UE device, wherein scheduling the at least two UE devices includes transmitting according to at least one transmission mode for each of the selected at least two UE devices during a plurality of scheduled transmissions. For an embodiment, the plurality of scheduled transmissions have a duty cycle relative to the wireless communication below a threshold. For at least one embodiment, the plurality of scheduled transmissions occupy a fraction (for many embodiments the fraction will be low, for example <10%) of wireless communication resources. For an embodiment, the plurality of scheduled transmissions are periodically or quasi-periodically scheduled relative to a wireless communication frame control signal. For an embodiment, the plurality of scheduled transmissions are dynamically allocated by a wireless communication frame control signal. For an embodiment, each of the plurality of scheduled transmissions includes at least one of a plurality of transmission modes. For an embodiment, selecting at least one of the plurality of transmission modes for each of the plurality of scheduled transmissions is based on a regular pattern. For an embodiment, the regular pattern is dynamically modified by a frame control signal.

For at least one embodiment, the selected second BS 1201 associated with the first BS 1200 or the selected UE device from the second plurality of UE devices (such as, UE devices 1511, 1512) wirelessly communicating with the second BS 1201 dynamically changes. At least one embodiment further includes a plurality of scheduled transmissions, and further includes dynamically selecting the second BS 1201 associated with the first BS 1200 or the selected UE device from the second plurality of UE devices (such as, UE devices 1511, 1512) wirelessly communicating with the second BS 1201. For an embodiment, first BS 1200 is configured to characterize interference of the selected UE device during the plurality of scheduled transmission and dynamic selection of the second BS 1201 or the selected UE device from the second plurality of UE devices (such as, UE devices 1511, 1512) wirelessly communicating with the second BS 1201. For an embodiment, the first BS 1200 is configured to characterize interference of the dynamic selection of the second BS 1201 and the selected UE device, enables estimation of an interference contribution from at least one of the second plurality of UE devices (such as, UE devices 1511, 1512) wirelessly communicating with the second BS 1201.

At least some embodiment include the wirelessly communicating includes a frame structure, the frame structure including at least a control subframe and a data subframe, wherein the data subframe includes the scheduled transmission.

In at least one embodiment, one or more controllers are operative to scheduling the first plurality of UE device (such as UE device 1510) to transmit a null transmission mode during at least a portion of the scheduled transmission. Further, the first BS 1200 is operative to characterize interference at a least a portion of the scheduled null transmission.

At least one embodiment further includes characterizing, by the first BS 1200, interference during the null transmission mode at the at least a portion of the scheduled transmission.

In at least one embodiment, one or more controllers (associated with the control 1240, associated with the first or second or third base stations 1200, 1201, 1202 or an combination of) are operative to select a third BS 1202 associated with first BS 1200. The third BS 1202 is operative to wirelessly communicate with a third plurality of UE devices (such as UE device 1514 within BS cell 1222). Further, the one or more controllers (which can be a different, same or combination of the prior controller) are operative to schedule the third plurality of UE devices (such as UE device 1514) to transmit according to a null transmission mode during at least a portion of a second BS 1201 scheduled transmission. Further, the first BS 1200 is operative to characterize interference at a least a portion of the null scheduled transmission. For an embodiment, a null transmission mode includes not assigning any of the third plurality of UE devices any transmission resources.

For at least some embodiments, the selecting of the third BS is based on one or more of a physical proximity (for example a physical proximity below a threshold distance) of the third BS or the third plurality of UE devices relative to the first BS 1200, being a designated as a neighbor of the first BS 1200, being within a coverage area of the first BS 1200, a classification of the third BS and the first BS 1200. For an embodiment, the third BS is selected based on an estimate of interference generated from one or more of the third plurality of UE devices to the first BS 1200 being above a threshold. For an embodiment, selecting the third BS is based on an interference estimate. For an embodiment, the interference estimate is based on at least one of a distance between at least one of the third plurality of UE devices and first BS 1200, a path loss model applied to at least one of the third plurality of UE devices and the plurality of UE devices, a propagation loss application, an interference measurement data, an interference estimate by first BS 1200. An embodiment further includes characterizing, by the first BS 1200, interference during the null transmission mode at the at least the second portion of the scheduled transmission. For an embodiment, the characterizing occurs during null transmission of at least one of the third plurality of UE devices. For an embodiment, the first BS 1200 is configured to jointly characterize an interference contribution of at least one of the third plurality of UE devices and at least one of the second plurality of UE devices (such as, UE devices 1511, 1512) during the null transmission mode of the at least the second portion of the scheduled transmission.

For at least one embodiment a BS (such as BS 201) includes a plurality of sectors wherein the plurality of bUE devices (such as, bUE devices 210, 211) are distributed over the plurality of sectors and access traffic from a UE device (such as, UE device 212) associated with the BS is wirelessly communicated over one or more of the plurality of bUE devices. For an embodiment the BS may include three sectors and the plurality of bUE devices may include two bUE devices located within the coverage area of a first sector of the three sectors and access traffic from a UE device located within the coverage area of a second sector of the three sectors may be wirelessly communicated over the at least one of the two bUE devices located within the coverage area of the first sector.

For an embodiment a BS may include three sectors and the plurality of bUE devices may include two bUE devices located within the coverage area of a first sector and a second sector of the three sectors and access traffic from a UE device located within the coverage area of one of the three sectors may be wirelessly communicated over the at least one of the two bUE devices located within the coverage area of the first sector and second sectors. Clearly other embodiments are possible wherein the access traffic of a UE device may be wirelessly communicated over two or more bUE devices that are within the same sector as the UE device, a different sector than the UE device or both the same sector and a different sector as the UE device.

For at least one embodiment a BS (such as BS 201) includes a plurality of channels wherein the plurality of bUE devices are distributed over the plurality of channels and access traffic from a UE device associated with the BS is wirelessly communicated over one or more of the plurality of bUE devices. For an embodiment a BS may include three channels and the plurality of bUE devices may include two bUE devices located within the first channel of the three channels and access traffic from a UE device associated with the second channel of the three channels may be wirelessly communicated over the at least one of the two bUE devices associated with the first channel. For an embodiment a BS may include three channels and the plurality of bUE devices may include two bUE devices associated with a first channel and a second channel of the three channels and access traffic from a UE device associated with of one of the three channels may be wirelessly communicating over the at least one of the two bUE devices associated with the first channel and the second channel. Clearly other embodiments are possible wherein the access traffic of a UE device may be wirelessly communicating over two or more bUE devices that are within the same channel as the UE device, a different channel than the UE device or both the same channel and a different channel as the UE device.

For at least one embodiment a BS includes a plurality of sectors and a plurality of channels and the plurality of bUE devices are assigned resources from the plurality of sectors and a plurality of channels and the plurality of bUE devices and a particular UE device of the one or more UE devices is assigned one or more bUE devices for the plurality of bUE devices that could be in the same sector and/or channel or a different sector and/or channel.

For at least one embodiment (for example embodiments associated with FIG. 3) the bUE device (such as bUE device 210) may be selected to wirelessly communicate troubleshooting or fault isolation information. For at least one embodiment the backhaul WCT 220 wireless communication path is used to transmit access traffic when backhaul CT 332 path is not operating correctly or to detect if backhaul CT 332 path is operating correctly. For at least one embodiment the backhaul WCT 220 wireless communication path is used to transmit control information to help isolate a source of a backhaul communication to Data network 340 over backhaul CT 332 is operating within a threshold or to isolate which of the one or more of the BS (such as 301) or the access WCT 222 or the data network 340 are operating with a threshold of performance. For at least one embodiment, the bUE device is used to diagnose a BS (such as BS 301) remotely. For example one or more control information may be sent over backhaul WCT and backhaul CT 220 and diagnosed at one or more data network locations. For example the bUE device (for example a smartphone) may be a UE device with cellular and WiFi connectivity and the WiFi backhaul path wirelessly communicating to data network 241 may be used to verify a performance parameter (or alternatively a fault) of the cellular access WCT 222.

For at least one embodiment a first backhaul path including a backhaul CT (such as 332) includes circuit switched connectivity (for example TDM, T1) and a second backhaul path including backhaul CT (such as 230) includes packet switched (for example IP, Ethernet) connectivity. For at least one embodiment access traffic associated with a UE device 212 is used to select a first backhaul path or a second backhaul path based on circuit switched or packet switched backhaul.

For at least one embodiment a first backhaul path (such as 332) includes legacy backhaul CT (for example T1) and a second backhaul path (such as 230) includes subsequent generation based backhaul CT (for example VDSL). For at least one embodiment, access traffic associated with a UE device 212 is used to select a first backhaul path or a second backhaul path based on legacy or subsequent generation based backhaul.

For at least one embodiment a first backhaul path (such as 332) parameters are suited for legacy access traffic (for example 2G voice traffic) and a second backhaul path (such as 230) parameters are suited for subsequent generation access traffic (for example 4G data). For at least one embodiment, access traffic associated with a UE device 212 is used to select a first backhaul path or a second backhaul path based on legacy or subsequent generation access traffic.

For at least one embodiment backhaul CT 230 over bUE device 210 is selected for improving resilience (or alternatively as a backup) for the primary backhaul CT 332 to data network 340 or as an alternative route for BH. For at least one embodiment backhaul CT 230 over bUE device 210 is selected as a temporary or interim deployment during the upgrade or ramp up or installation of backhaul CT 332 to data network 340.

For at least one embodiment one or more of a first access WCT includes one or more first QoS parameters, a first backhaul WCT includes one or more second QoS parameters and a first backhaul CT includes one or more third QoS parameters and a mapping (or alternatively a conversion or best fit) between at least two out of the first, second or third QoS parameters is required.

For at least one embodiment (for example FIG. 5) a handoff between a first BS and a second BS is based on a bUE device. For example UE device 520 is wirelessly communicating to Data network 550 over BS 500 and backhaul 540. For at least one embodiment based on one or more parameters associated with BS 510 to data network 551 (such as a parameter associated with backhaul WCT 531 or backhaul CT 541) a UE device 520 could be handoff from BS 500 to BS 510 (for example if UE device 520 requests a data communication that could be better handled by the backhaul path to data network 551). For at least one embodiment one or more of a network entity (for example cloud or BS controller) or BS or UE device is aware of a backhaul parameter prior to (or during) one or more of associating a UE device to a BS, handover or handoff of UE device to a BS. For at least one embodiment the backhaul parameter includes one or more of a carrier core network backhaul or a carrier partner core network backhaul or a roaming backhaul core network. For at least one embodiment the handover or handoff of a UE device to a BS wirelessly communicating backhaul traffic over a bUE device is based on a backhaul CT ownership (for example carrier owned or partner carrier owned or owned by a roaming network carrier).

For at least one embodiment (for example embodiments associated with FIG. 3 or FIG. 2) the backhaul WCT 220 includes a wireless communication mode that could be differentiated from the access WCT 222. For at least one embodiment the mode could be a differentiated MCS (for example a higher modulation and/or code rate and/or bits/sec/Hz) or a differentiated MIMO or SIC or beamforming mode (for example additional MIMO streams, additional number of transmit or receive antennas for bUE device) or differentiated ARQ scheme (for example larger buffers, block ARQ, intermediate MAC termination point) or differentiated control message or differentiated control code or a differentiated scheduling (for example reserved or special RB). For at least one embodiment the mode could enable simultaneous or joint access and backhaul WCT transmission (for example with differentiated frame control indicators). For at least one embodiment the mode includes a more robust modulation and coding for overcoming channel impairments and/or interference or allocating high priority queues to improve on mean access delay (for example reducing backhaul traffic latency below a threshold). For at least one embodiment the mode includes a transmit power level (for example a lower transmit power to reduce backhaul WCT interference to access WCT links).

For at least one embodiment the mode may enable MU-MIMO or beamforming simultaneously from (to) a BS to (from) a UE device and bUE device on the same BS resource. For at least one embodiment the mode includes specialized symbols (for example training, reference symbols, control) for the backhaul CT. For at least one embodiment the mode includes differentiated link adaptation, resource allocation or scheduling of wireless communication resources to the backhaul WCT (for example due to differentiated channel characteristics—better LoS or K-factor or better antennas). For at least one embodiment backhaul WCT has differentiated capabilities/features/modes for interference generation (transmission) or interference characterization (for example estimation) or interference suppression (for example reception cancellation algorithms). For at least one embodiment the (transmission/reception) mode enables scheduling of superposition frames wherein access and BH traffic overlap on one or more time, frequency, code resources (for example using single or multiple antennas).

For at least one embodiment (for example embodiments of FIG. 2) two or more backhaul paths (for example over bUE device 210 and bUE device 211) may be used for backhaul diversity (for example for traffic load balancing, channel or interference diversity). For at least one embodiment (for example embodiments of FIG. 2) two or more backhaul paths (over bUE device 210 and bUE device 211) may include, more than one WCT (for example WiFi and cellular, 3G and 4G).

For at least one embodiment channel and/or interference information associated with bUE device embodiments (for example embodiments of FIG. 2) are communicated to a cloud or network entity (for example cloud RAN or cloud BS or multi-BS control) based interference monitoring and/or mitigation in order to select one or more of frequency channel, resource allocation, scheduling for backhaul traffic. For at least one embodiment one or more bUE devices include better interference monitoring and/or cancellation and/or mitigation than the UE device. For at least one embodiment wireless communications resource (for example channels, resource allocation, transmit power level) monitoring and/or assignment algorithms for backhaul WCT are centralized. For at least one embodiment wireless communications resource (for example channels, resource allocation, transmit power level) monitoring and/or assignment algorithms for backhaul WCT are distributed.

For at least one embodiment a resource allocation (for example one or more of a frequency channel allocation, a frequency channel reuse, a SFR, a FFR) of a wireless communication resource is based on one or more bUE devices or one or more bUE parameters, which are differentiated relative to at least a subset of the plurality UE device or plurality of UE device parameters. For example the bUE device may include additional transmit or receiver analog (such as number of antennas, antenna gain) or baseband capability (such as transmit precoding, interference cancelling) that allow for more aggressive use of wireless communication resources. For at least one embodiment the resource allocation jointly assigns resources to backhaul and access traffic with differentiated parameters used in the assignments. For at least one embodiment a backhaul traffic to a bUE device has preferential treatment (for example higher priority) relative to access traffic in a scheduling assignment. For at least one embodiment a backhaul traffic has differentiated QoS parameters relative to access traffic QoS parameters wherein one or more of the resource allocation, scheduling and link adaptation are based on differentiated QoS parameters. For at least one embodiment the backhaul traffic QoS parameters are based on the associated access traffic QoS parameters. For at least one embodiment the backhaul QoS parameters are consistent and/or coordinated between the UE device and the associated BS or the associated bUE device. For at least one embodiment the interference characterization includes (or alternatively accounts for) transmit or receive interference processing capability (for example a transmit precoding or dirty paper coding or a receiver nulling or successive interference cancelling). For at least one embodiment resource allocation (or scheduling or link adaptation) is based on the interference characterization including transmit or receive interference processing capability. For at least one embodiment interference characterization matrices associated to a plurality of transmit nodes (for example BS in the DL or UE device in the UL) and a plurality of receiver nodes are based on transmit or received interference mitigation capability. For at least one embodiment the resource allocation (or alternatively scheduling) of one or more of access traffic or backhaul traffic associated with the access traffic is based at least in part on a revenue (or alternatively one or more of a cost or a profit or a service plan or a data plan) obtained from the access traffic data communication. For at least one embodiment the resource allocation (or scheduler) is based at least in part of on information obtained from DPI of the access or backhaul traffic (for example based on the content or the application or the service). For at least one embodiment the resource allocation (or alternatively scheduling) of one or more of access traffic or backhaul traffic associated with the access traffic is based at least in part on a sponsored service or application (or alternatively a revenue share or a special or a coupon or a zero-rated or a good customer status) obtained from the access traffic data communication.

For at least one embodiment (for example embodiments associated with FIG. 3), access traffic associated with UE device 212 is backhauled over a bUE device 210 to data network 241 or backhaul CT 332 to data network 340 based on energy efficiency of one or more elements of the system (for example battery state or energy consumption of bUE device 210 or BS 301, etc.).

For at least one embodiment a receiver (for example a UE device) stores interference information (for example raw samples or post-processed received signal and/or noise symbols) from one or more of reference symbols (RS), control symbols and data symbols, and receives from a link partner (for example a BS) interference activity scheduling information (for example active transmission mode RB, on/off tables, null intervals), and refines interference characterization based on stored interference information and (delayed) interference activity scheduling information. For at least one embodiment the interference activity scheduling information may be delayed.

For at least one embodiment a receiver storing interference information reduces a requirement (such as latency, BW) on the backhaul for exchange of control messages between one or more of a BS or one or more UE device. For example control messages may be compressed (for example one or more of on/off, power control, BF, MIMO parameters). For at least one embodiment a receiver stored interference information includes a first covariance matrix, and based on an interference activity scheduling information including information based on a interference source configuration, the receiver refines the first covariance matrix to a second covariance matrix. For at least one embodiment a receiver computes a plurality of covariance matrix (for example a first covariance matrix based on the leading 25% of received frame, and a second covariance matrix based on the leading 75% of received frame) and based on interference activity scheduling information from neighbor BS may obtain a new covariance matrix based on the plurality of covariance matrices.

For at least one embodiment a resource allocation or scheduler agent (for example executed by a BS controller) clusters (for example allocates contiguous frequency and/or time resource blocks) transmission modes within a transmission frame (for example DL or UL frames or sub-frames). For example a first set (or alternatively group or cluster or classification) of transmission time slots (or alternatively time and/or frequency RBs) may be assigned a beamforming transmission mode, followed by a second set of transmission time slots assigned a MIMO (multiple input, multiple output) transmission mode, followed by a third set of transmission time slots assigned a SISO (single input, single output) transmission mode, followed by empty slots. In at least a second embodiment a first set of RB may include transmission at a maximum transmit power level, followed by a median transmit power level, followed by a minimum transmit power level. Other group classifications criteria may be based on one or more of path loss (for example for UL), MCS, transmit power, number of transmit antennas, SFR, FFR. For at least one embodiment a plurality of UE device (or bUE device) may be classified into sets based on path loss, for example with high path loss UL UE (which typically will transmit higher power) transmitting the first cluster of RB, followed by typical path loss UE, followed by low path loss UE.

For at least one embodiment a plurality of UE devices (or bUE devices) may be classified into sets based on distance to a BS (or location relative to two neighboring BS), for example cell edge UL UE (which typically will transmit higher power and/or often interfere with a neighboring BS) transmitting the first cluster of RB, followed by median cell UE device, followed by close-in UE device.

For at least one embodiment classifying transmission mode into clusters reduces the variation of interference generated or received over time or enables more predictable interference levels versus frame location (for example time and/or frequency RB relative to frame boundaries) making scheduling or link adaptation more robust based on frame location interference characterization information. For at least one embodiment reduced interference variation based on transmission mode clustering enables resource allocation (for example frequency channel assignments, SFR, FFR) to be allocated at larger time intervals (for example higher latency feedback, more accurate estimators, larger time constant assignments—for example at central or distributed controller at a cloud node). For at least one embodiment a resource allocation or schedulers is based on an inner and outer loop control. For example outer loop (typically resource allocation agent) based on longer term S and/or I statistics, and inner loop (typically scheduler) based on instantaneous channel or queue status.

For at least one embodiment a bUE device is managed (or alternatively controlled) at least in part by a user (for example a cellular subscriber). For at least one embodiment a user may one or more of allow, block, restrict, a bUE device functionality. For example a bUE device user (or subscriber) may limit the amount of backhaul traffic communicating over the bUE device. For at least one embodiment the bUE device may restrict the amount of backhaul traffic based on bUE device state (for example battery state or a data plan associated with the bUE WCT or CT). For at least one embodiment the bUE device includes a user policy. For example a UI for user notification of bUE device information (status, usage, battery usage or projections, etc.), user control (for example one or more of request for permission, approval, block, restrict, allow, throttle, shape) or offers to the user, such as a data plan sponsor. For at least one embodiment the user-managed bUE device is sponsored or awards credits and/or points to the user.

For at least one embodiment a wireless access provider (or WCT provider) pays (or alternatively compensates or is billed by) a second CT provider (for example a cellular carrier may compensate a DSL and/or cable service provider backhauling data through the bUE device). For at least one embodiment, revenue generated from access traffic over backhaul CT is revenue-shared between the WCT provider and one or more backhaul CT provider or some other partnership.

It should be understood that any of the embodiments of the described embodiments can be implemented in the form of control logic using hardware and/or using computer software in a modular or integrated manner. Based on the disclosure and teachings provided herein, a person of ordinary skill in the art will know and appreciate other ways and/or methods to implement embodiments of the described embodiments using hardware or a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the described embodiments may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed:

1. A method for determining interference of a wireless system, comprising:
    a first base station (BS) wirelessly communicating with a first plurality of user equipment (UE);
    selecting a second BS associated with the first BS, the second BS wirelessly communicating with a second plurality of UE;
    selecting a UE from the second plurality of UE;
    scheduling the selected UE to transmit according to a transmission mode during a scheduled transmission;
    scheduling the first plurality of UE to transmit a null transmission mode during at least a portion of the scheduled transmission of the selected UE; and
    characterizing, by the first BS, interference of the selected UE at the first BS based on interference received by the first BS during the null transmission mode of the first plurality of UE during the at least the portion of the scheduled transmission.

2. The method of claim 1, wherein the interference received by the first BS comprises one or more of co-channel interference, adjacent channel interference, intersector interference, intercell interference, intrasystem interference, intersystem interference.

3. The method of claim 1, wherein the first BS and the second BS are part of a heterogeneous network.

4. The method of claim 1, wherein selecting the second BS associated with the first BS or selecting the UE from the second plurality of UE is based on physical proximity.

5. The method of claim 1, wherein the selected second BS associated with the first BS is a neighboring BS.

6. The method of claim 1, wherein the first BS comprises a coverage area or a cell, and wherein the selected second BS associated with the first BS or the selected UE from the second plurality of UE is within the coverage area of the first BS.

7. The method of claim 1, wherein the second plurality of UE are classified, and wherein the selecting the UE is based on the classification.

8. The method of claim 1, wherein the first BS and the second BS are a subset of a plurality of BSs from a cellular wireless system, and wherein the plurality of BS from the cellular system are grouped into one or more clusters, and wherein the first BS and the second BS are part of a same cluster.

9. The method of claim 1, wherein selecting the second BS associated with the first BS or the UE from the second plurality of UE is based on an interference estimate.

10. The method of claim 9, wherein the interference estimate is based on at least one of a distance between the selected UE and the first BS, a path loss model applied to the selected UE and the first BS, a propagation loss application, an interference measurement data, an interference estimate by the first BS.

11. The method of claim 1, further comprising:
selecting a third BS associated with the first BS, the third BS wirelessly communicating with a third plurality of UE; and
scheduling the third plurality of UE to transmit a null transmission mode during at least a second portion of the scheduled transmission.

12. The method of claim 11, wherein the selecting of the third BS is based on one or more of a physical proximity of the third BS or the third plurality of UE relative to the first BS, being a designated as a neighbor of the first BS, being within a coverage area of the first BS, a classification of the third BS and the first BS, or an estimate of interference generated from one or more of the third plurality of UE to the first BS being above a threshold.

13. The method of claim 1, wherein the first BS and the second BS are synchronized, wherein the synchronization comprises one or more of time, timing phase, timing frequency, carrier phase or carrier frequency synchronization.

14. The method of claim 1, wherein the transmission mode comprises an active transmission mode.

15. The method of claim 1, wherein the transmission mode comprises a data transmission mode.

16. The method of claim 15, wherein the data transmission mode comprises data intended to be received by the second BS.

17. The method of claim 15, wherein the data transmission mode comprises virtual data or data without a target destination.

18. The method of claim 1, wherein the at least one transmission mode comprises one or more of a transmission power, a multiple input multiple output (MIMO) mode, a beamforming parameter, a precoding matrix indicator (PMI), a modulation and coding (MCS), a selected transmit antenna.

19. The method of claim 1, wherein the transmission mode comprises a high interference mode, low interference mode or typical interference mode.

20. The method of claim 1, wherein the scheduled transmission mode comprises a periodic schedule.

21. The method of claim 1, wherein the scheduled transmission mode comprises a wireless communication resource.

22. The method of claim 1, wherein the wirelessly communicating comprises a frame structure, the frame structure comprising a control signal having a placement relative to the frame structure, wherein the scheduled transmission is scheduled relative to the control signal.

23. The method of claim 1, wherein the wirelessly communicating comprises a frame structure, the frame structure comprising a control signal having a placement relative to the frame structure, wherein the scheduled transmission is directed or enabled by the control signal.

24. The method of claim 1, wherein the wirelessly communicating comprises a periodic frame structure, comprising a periodic control signal having a placement relative to the periodic frame structure, wherein the scheduled transmission is scheduled relative to the periodic control signal.

25. The method of claim 1, wherein scheduling the selected UE comprises transmitting according to at least one transmission mode during a plurality of scheduled transmissions.

26. The method of claim 1, further comprising selecting at least two UE from the second plurality of UE including the selected UE, wherein scheduling the at least two UE comprises transmitting according to at least one transmission mode for each of the selected at least two UE during a plurality of scheduled transmissions.

27. The method of claim 26, wherein the plurality of scheduled transmissions have a duty cycle relative to the wireless communication below a threshold.

28. The method of claim 26, wherein the plurality of scheduled transmissions are periodically or quasi-periodically scheduled relative to a wireless communication frame control signal.

29. The method of claim 26, wherein the plurality of scheduled transmissions are dynamically allocated by a wireless communication frame control signal.

30. The method of claim 26, wherein each of the plurality of scheduled transmissions comprises at least one of a plurality of transmission modes.

31. The method of claim 30, wherein selecting at least one of the plurality of transmission modes for each of the plurality of scheduled transmissions is based on a regular pattern.

32. The method of claim 1, wherein the selected second BS associated with the first BS or the selected UE from the second plurality of UE wirelessly communicating with the second BS dynamically changes.

33. The method of claim 1, further comprising a plurality of scheduled transmissions, and further comprising dynamically selecting the second BS associated with the first BS or the selected UE from the second plurality of UE wirelessly communicating with the second BS.

34. The method of claim 33, wherein first BS is configured to characterize interference of the selected UE during the plurality of scheduled transmission and dynamic selection of the second BS or the selected UE from the second plurality of UE wirelessly communicating with the second BS.

35. The method of claim 1, wherein the wirelessly communicating comprises a frame structure, the frame structure comprising at least a control subframe and a data subframe, wherein the data subframe comprises the scheduled transmission.

36. A wireless system, comprising:
a first base station (BS), the first BS operative to wirelessly communicate with a first plurality of user equipment (UE);
one or more controllers operative to select a second BS associated with first BS, the second BS operative to wirelessly communicate with a second plurality of UE;
one or more controllers operative to select a UE from the second plurality of UE;
one or more controllers operative to schedule the selected UE to transmit according to a transmission mode during a scheduled transmission;

one or more controllers operative to schedule the first plurality of UE to transmit a null transmission mode during at least a portion of the scheduled transmission of the selected UE;
and
the first BS operative to characterize interference at the scheduled transmission based on interference received by the first BS during the null transmission mode of the first plurality of UE during the at least the portion of the scheduled transmission.

* * * * *